(12) United States Patent
Barton et al.

(10) Patent No.: US 12,534,710 B2
(45) Date of Patent: Jan. 27, 2026

(54) METHANOL DEHYDROGENASE FUSION PROTEINS

(71) Applicant: Genomatica, Inc., San Diego, CA (US)

(72) Inventors: Nelson R. Barton, San Diego, CA (US); Jingyi Li, San Diego, CA (US); Joseph R. Warner, San Diego, CA (US); Priti Pharkya, San Diego, CA (US)

(73) Assignee: Genomatica, Inc., San Diego, CA (US)

( * ) Notice: Subject to any disclaimer, the term of this patent is extended or adjusted under 35 U.S.C. 154(b) by 442 days.

(21) Appl. No.: 17/943,482

(22) Filed: Sep. 13, 2022

(65) Prior Publication Data

US 2023/0265397 A1    Aug. 24, 2023

Related U.S. Application Data

(63) Continuation of application No. 15/771,973, filed as application No. PCT/US2016/059096 on Oct. 27, 2016, now Pat. No. 11,441,128.

(60) Provisional application No. 62/260,189, filed on Nov. 25, 2015, provisional application No. 62/249,032, filed on Oct. 30, 2015.

(51) Int. Cl.
| | | |
|---|---|---|
| *C12N 9/00* | (2006.01) | |
| *C12N 9/04* | (2006.01) | |
| *C12N 9/10* | (2006.01) | |
| *C12N 9/88* | (2006.01) | |
| *C12N 9/90* | (2006.01) | |
| *C12N 9/92* | (2006.01) | |
| *C12N 15/52* | (2006.01) | |
| *C12N 15/62* | (2006.01) | |
| *C12P 7/24* | (2006.01) | |

(52) U.S. Cl.
CPC .......... *C12N 9/0006* (2013.01); *C12N 9/1029* (2013.01); *C12N 9/88* (2013.01); *C12N 9/90* (2013.01); *C12N 15/52* (2013.01); *C12P 7/24* (2013.01); *C12Y 101/02007* (2013.01); *C12Y 203/01085* (2013.01); *C12Y 401/02013* (2013.01); *C12Y 401/02043* (2013.01); *C12Y 503/01027* (2013.01); *C07K 2319/00* (2013.01)

(58) Field of Classification Search
CPC ...... C12N 9/0006; C12N 9/1029; C12N 9/88; C12N 9/90; C12N 15/52; C12Y 101/02007; C12Y 203/01085; C12Y 401/02043; C12Y 503/01027
See application file for complete search history.

(56) References Cited

U.S. PATENT DOCUMENTS

| | | | |
|---|---|---|---|
| 6,280,972 B1 | 8/2001 | Yaseuda | |
| 6,440,711 B1 | 8/2002 | Dave | |
| 6,558,933 B2 | 5/2003 | Donald et al. | |
| 7,163,810 B2 | 1/2007 | Yasueda et al. | |
| 9,346,902 B2 | 5/2016 | Burgard et al. | |
| 9,518,278 B2 | 12/2016 | Liao et al. | |
| 11,441,128 B2 | 9/2022 | Barton et al. | |
| 2011/0201089 A1 | 8/2011 | Burgard et al. | |
| 2013/0109064 A1 | 5/2013 | Osterhout et al. | |
| 2014/0058056 A1 | 2/2014 | Burgard et al. | |
| 2014/0288254 A1 | 9/2014 | Burgard et al. | |
| 2014/0302575 A1 | 10/2014 | Burgard et al. | |
| 2014/0329916 A1 | 11/2014 | Burgard et al. | |
| 2015/0050708 A1 | 2/2015 | Burgard et al. | |
| 2015/0104854 A1 | 4/2015 | Singh et al. | |
| 2016/0060635 A1 | 3/2016 | Liao et al. | |

FOREIGN PATENT DOCUMENTS

| | | |
|---|---|---|
| CN | 1690208 A | 11/2005 |
| CN | 105255804 A | 1/2016 |
| WO | 2007/030830 A2 | 3/2007 |

(Continued)

OTHER PUBLICATIONS

Anthony, C. (1991) "Assimilation of Carbon by Methylotrophs", Biology of Methylotrophs, 18:79-109.

(Continued)

*Primary Examiner* — Maryam Monshipouri
(74) *Attorney, Agent, or Firm* — Kagan Binder, PLLC

(57) ABSTRACT

Described herein are fusion proteins including methanol dehydrogenase (MeDH) and at least one other polypeptide such as 3-hexulose-6-phosphate dehydrogenase (HPS) or 6-phospho-3-hexuloisomerase (PHI), such as DHAS synthase or fructose-6-Phosphate aldolase or such as DHA synthase or DHA kinase. In a localized manner, the fusion protein can promote the conversion of methanol to formaldehyde and then to a ketose phosphate such as hexulose 6-phosphate or then to DHA and G3P. When expressed in cells, the fusion proteins can promote methanol uptake and rapid conversion to the ketose phosphate or to the DHA and D3P, which in turn can be used in a pathway for the production of a desired bioproduct. Beneficially, the rapid conversion to the ketose phosphate or to the DHA and G3P can avoid the undesirable accumulation of formaldehyde in the cell. Also described are engineered cells expressing the fusion protein, optionally include one or more additional metabolic pathway transgene(s), methanol metabolic pathway genes, target product pathway genes, cell culture compositions including the cells, methods for promoting production of the target product or intermediate thereof from the cells, compositions including the target product or intermediate, and products made from the target product or intermediate.

12 Claims, 10 Drawing Sheets

Specification includes a Sequence Listing.

(56) References Cited

FOREIGN PATENT DOCUMENTS

| | | |
|---|---|---|
| WO | 2008/115840 A2 | 9/2008 |
| WO | 2009/023493 A1 | 2/2009 |
| WO | 2009/094485 A1 | 7/2009 |
| WO | 2009/111672 A1 | 9/2009 |
| WO | 2009/135074 A2 | 11/2009 |
| WO | 2009/141607 A1 | 11/2009 |
| WO | 2010/030711 A2 | 3/2010 |
| WO | 2010/071697 A1 | 6/2010 |
| WO | 2010/127319 A2 | 11/2010 |
| WO | 2010/129936 A1 | 11/2010 |
| WO | 2010/141780 A1 | 12/2010 |
| WO | 2010/141920 A2 | 12/2010 |
| WO | 2011/031897 A1 | 3/2011 |
| WO | 2011/071682 A1 | 6/2011 |
| WO | 2011/140171 A2 | 11/2011 |
| WO | 2012/018624 A2 | 2/2012 |
| WO | 2012/0999621 A1 | 7/2012 |
| WO | 2012/106516 A1 | 8/2012 |
| WO | 2012/135789 A2 | 10/2012 |
| WO | 2012/177599 A2 | 12/2012 |
| WO | 2012/177619 A2 | 12/2012 |
| WO | 2012/177710 A1 | 12/2012 |
| WO | 2012/177721 A1 | 12/2012 |
| WO | 2013/012975 A1 | 1/2013 |
| WO | 2013/028519 A1 | 2/2013 |
| WO | 2013/036764 A1 | 3/2013 |
| WO | 2013/040383 A1 | 3/2013 |
| WO | 2013/071226 A1 | 5/2013 |
| WO | 2013/110797 A1 | 8/2013 |
| WO | 2014/035925 A1 | 3/2014 |
| WO | 2014/152434 A2 | 9/2014 |
| WO | 2015/051298 A2 | 4/2015 |
| WO | 2015/108777 A1 | 7/2015 |

OTHER PUBLICATIONS

Brautaset, et al. (2004) "Plasmid-Dependent Methylotrophy in Thermotolerant Bacillus methanolicus", Journal of Bacteriology, 186:1229-1238.
Culpepper, et al. (2014) "Structure and Protein-Protein Interactions of Methanol Dehydrogenase from Methylococcus capsulatus (Bath)", Biochemistry, 53:6211-6219.
Elleuche, et al. (2015) "Bringing functions together with fusion enzymes-from nature's inventions to biotechnological applications", Appl. Microbiol. Biotechnol., 99:1545-1556.
Fan, et al. (2018) "Engineering Artificial Fusion Proteins for Enhanced Methanol Bioconversion," ChemBioChem, vol. 19:2465-2471.
Hektor, H.J., et al. (2002) "Identification of a Magnesium-dependent NAD(P)(H)-binding Domain in the Nicotinoprotein Methanol Dehydrogenase from Bacillus methanolicus", Journal of Biological Chemistry, 277:46966-46973.
Hoffmeister, et al., (2005) "Mitochondrial trans-2-Enoyl-CoA Reductase of Wax Ester Fermentation from Euglena gracilis Defines a New Family of Enzymes Involved in Lipid Synthesis," Journal of Biological Chemistry, 280:4329-4338.
Kawaguchi, et al. (2011) "Yeast Methylotrophy and Autophagy in a Methanol-Oscillating Environment on Growing *Arabidopsis thaliana* Leaves," PLoS One, 6:e25257 (9 pp).
Kloosterman, et al. (2002) "Molecular, Biochemical, and Functional Characterization of a Nudix Hydrolase Protein That Stimulates the Activity of a Nicotinoprotein Alcohol Dehydrogenase", J. Biol. Chem. 277:34785-34792.
Krog, et al. (2013) "Methylotrophic Bacillus Methanolicus Encodes Two Chromosomal and One Plasmid Born NAD+ Dependent Methanol Dehydrogenase Paralogs with Different Catalytic and Biochemical Properties", Plos One, 8:1-11.
Lin, et al. (2005) "Fed-batch culture of a metabolically engineered *Escherichia coli* strain designed for high-level succinate production and yield under aerobic conditions," Biotechnology and Bioengineering, 90:775-779.
Müller, et al. (2015) "Engineering *Escherichia coli* for methanol conversion," Metabolic Engineering, 28:190-201.
Ochsner, et al. (2014) "In Vitro Activation of NAD-Dependent Alcohol Dehydrogenases by Nudix Hydrolases is more widespread than assumed", Federation of European Biochemcial Societies, 588:2993-2999.
Orita, et al. (2007) "Bifunctional enzyme fusion of 3-hexulose-6-phosphate synthase and 6-phospho-3-hexuloisomerase", Appl. Microbiol Biotechnol., 76:439-444.
Rice, et al. (2000) "EMBOSS: The European Molecular Biology Open Software Suite," Trends in Genetics, 16:276-277.
Song, et al. (2010) "Overexpression of an HPS/PHI fusion enzyme from Mycobacterium gastri in chloroplasts of geranium enhances its ability to assimilate and phytoremediate formaldehyde", Biotechnol Lett, 32:1541-1548.
NCBI GenBank Accession No. AAR39393.1, "6-phospho-3-hexuloisomerase [Bacillus methanolicus MGA3]," 184aa, Feb. 19, 2004, 2 pp.
NCBI GenBank Accession No. EIJ77596.1, "NAD-dependent methanol dehydrogenase (plasmid) [Bacillus methanolicus MGA3], " 382aa, May 14, 2012, 2 pp.

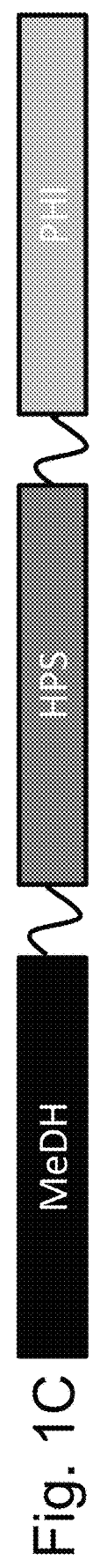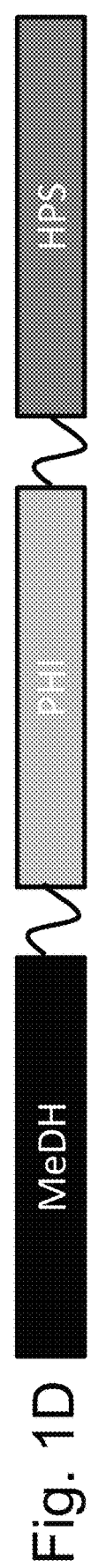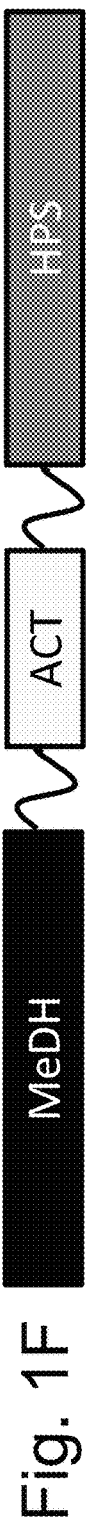

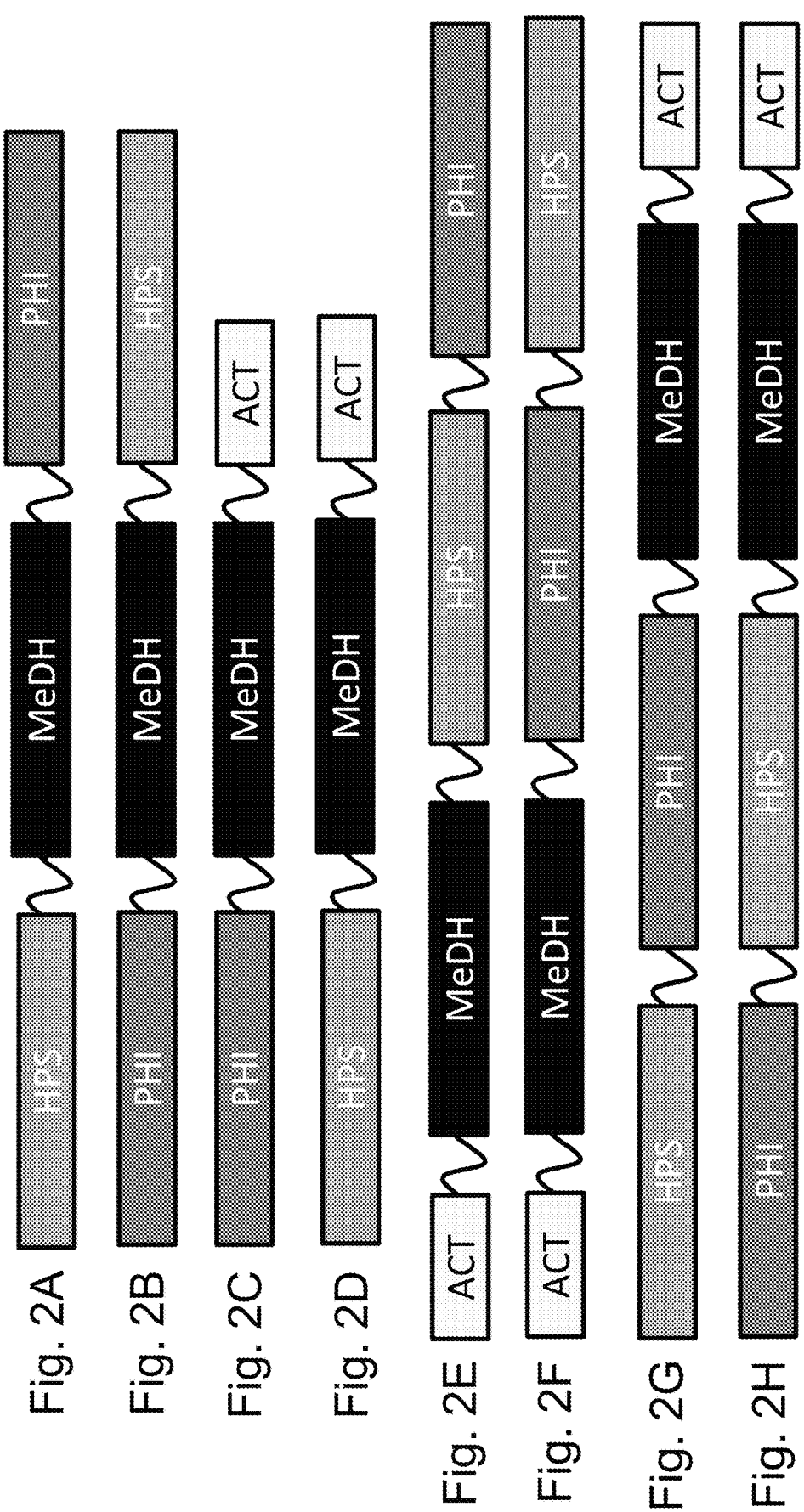

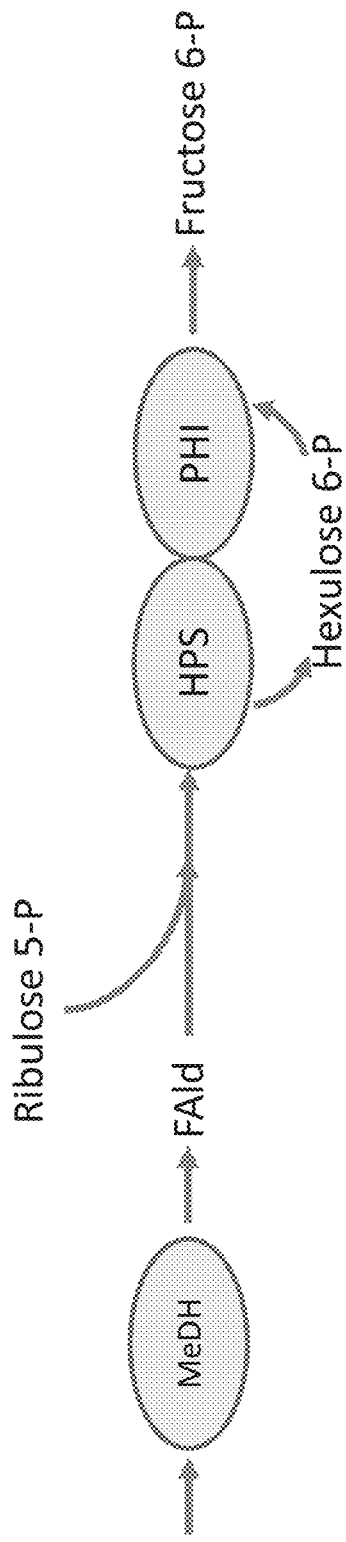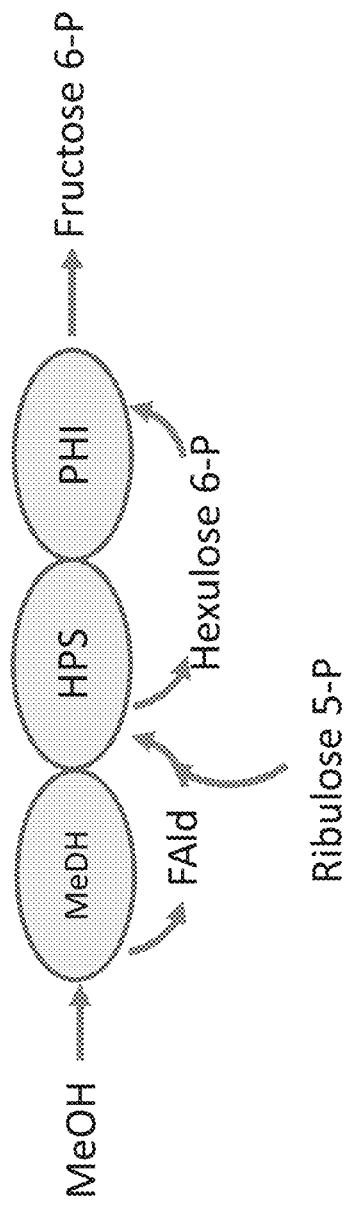

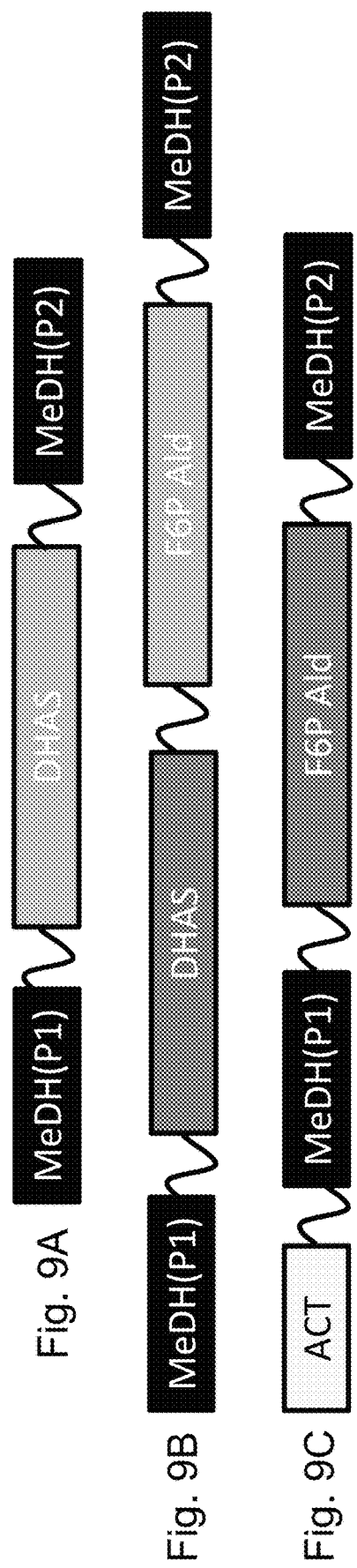

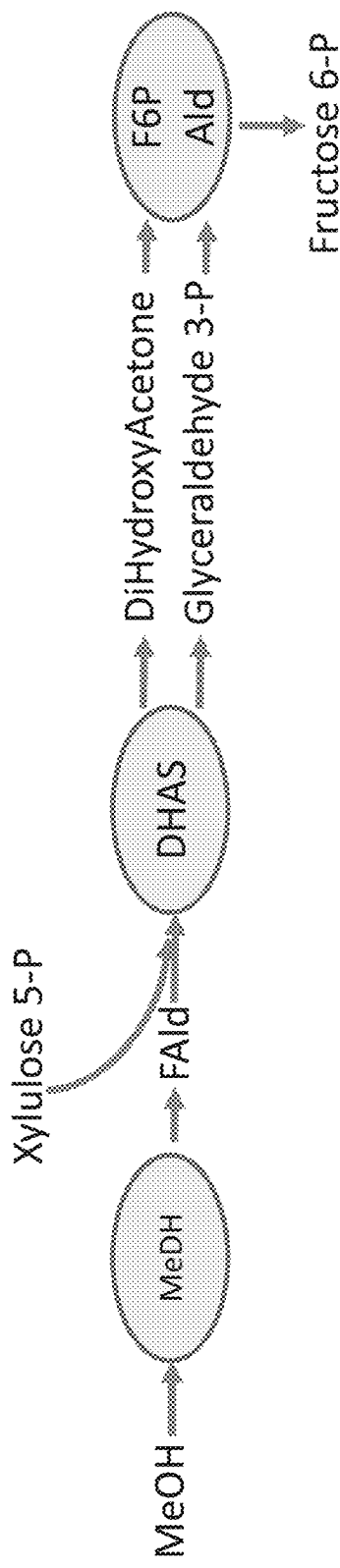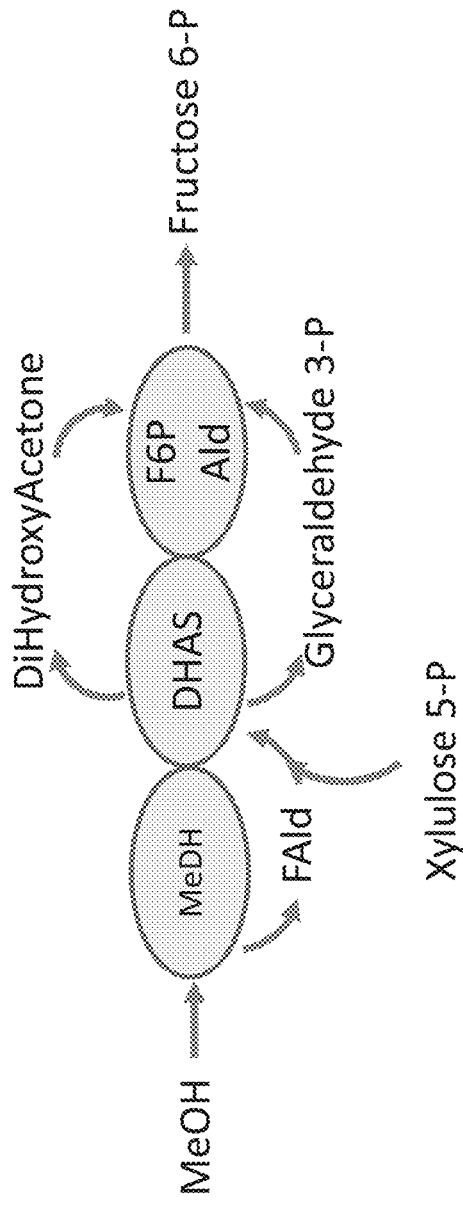
Figure 10A
Figure 10B

METHANOL DEHYDROGENASE FUSION PROTEINS

PRIORITY CLAIM

This application is a continuation of U.S. patent application Ser. No. 15/771,973, filed Apr. 27, 2018, now U.S. Pat. No. 11,441,128, which claims priority to International Application No. PCT/US2016/059096, filed Oct. 27, 2016, and titled "METHANOL DEHYDROGENASE FUSION PROTEINS", which claims the benefit of U.S. Provisional Patent Application Ser. No. 62/249,032, filed Oct. 30, 2015, and U.S. Provisional Patent Application Ser. No. 62/260,189, filed Nov. 25, 2015 the disclosures of which are incorporated in their entireties herein by reference.

CROSS REFERENCE TO RELATED SEQUENCE LISTING

This application contains a Sequence Listing submitted via EFS-Web. The entire contents of the text file entitled "GNO0027US2_Sequence_Listing_V2.XML" created on Mar. 22, 2023, having a size of 122 kilobytes, is incorporated herein by reference.

FIELD OF INVENTION

The disclosure is directed to fusion proteins containing methanol dehydrogenase and engineered cells expressing these fusions and methods for using methanol for production of a bioproduct.

BACKGROUND

In an intracellular metabolic pathway, metabolic intermediates are molecules which are the precursors of the pathway products, which are typically biologically significant molecules.

Various factors can affect the processing of metabolic intermediates in a product pathway. When there is a rate limiting event in the conversion of an intermediate into a subsequent metabolite, that intermediate may accumulate in the cell. In some cases the accumulation of an intermediate may adversely affect the cell. For example, accumulation of an intermediate may indirectly affect the cell by diverting intracellular energy resources, or by reducing the production of a biologically important product. In other cases, the accumulation of metabolic intermediates may have a direct adverse effect on the cell. For example, at elevated concentrations, small molecules such as methylglyoxal or formaldehyde can non-specifically modify intracellular proteins and have an adverse effect on cell health.

Alcohol dehydrogenases (ADHs; EC 1.1.1.1) promote the conversion of alcohols to and aldehydes or ketones, typically along with the reduction of nicotinamide adenine dinucleotide ($NAD^+$ to NADH). ADHs are instrumental in the generation of important compounds having aldehyde, ketone, and alcohol groups during biosynthesis of various metabolites. However, some of these compounds, such as aldehyde-containing compounds, include formaldehyde which, when accumulated in the cell, can be problematic.

One class of alcohol dehydrogenase is methanol dehydrogenases (MeDHs). MeDHs, converts methanol (MeOH) to formaldehyde (Fald), may be used in an enzymatic pathway engineered into a microbe to enable MeOH as a sole carbon source or as a co-carbon source with other feed stocks such as, for example, glucose, dextrose, plant biomass or syngas, to produce valuable products. Microorganisms have been that metabolize methanol, and in some instances do so via methanol dehydrogenase, and in even fewer instances produce valuable products. Increasing MeDH activity will enable improved use of MeOH, improving MeOH as a sole carbon source, decreasing production costs, decreasing amounts of any more expensive secondary or co-carbon source, e.g. glucose, increasing product yields, and providing faster rate of MeOH use.

SUMMARY

The current invention is directed towards fusion proteins that include methanol dehydrogenase activity and at least one other activity that promotes formaldehyde fixation. For example, the fusion can include activities which promote the conversion of methanol to formaldehyde and then from formaldehyde to a ketose phosphate such as hexulose 6-phosphate, or fructose-6-phosphate. Alternatively, for example, the fusion can include activities which promote the conversion of methanol to formaldehyde and then from formaldehyde to dihydroxyacetone (DHA) and glycerladehyde-3-phosphate (G3P), and then to fructose-6-phosphate. The current invention is also directed to engineered cells that express such fusion proteins, as well as engineered cells having a heterologous methanol dehydrogenase in combination with a fusion protein that promotes formaldehyde fixation. The engineered cells can display increased methanol uptake, through increased expression of the methanol dehydrogenase fusion and/or by using active variants, or through increased efficiency of fixation of formaldehyde into ketose phosphate compounds as a result of the fusion. And while this promotes increased formation of formaldehyde, the formaldehyde is more rapidly fixed into ketose phosphate compounds such as hexulose 6-phosphate, or fructose-6-phosphate, or to DHA and G3P, due to the localization of the enzymatic activities because of the fusion proteins. Therefore, undesirable levels of formaldehyde do not build up in the cell and cause adverse effects on growth.

Further, the increased flux and formation of ketose phosphate compounds, or to DHA and G3P, can provide precursors to the glycolysis pathway. In turn, increased glycolysis can provide increases in the pools of subsequent intermediate compounds such as glycerol 3-phosphate, pyruvate, and acetyl-CoA. These intermediate compounds can be used by product pathways for forming desired (target) bioproducts such as butanediols (BDOs) like 1,3-butanediol (1,3-BDO) and 1,4-butanediol (1,4-BDO), 4-hydroxybutyrate (4-HB), butadiene, 6-amino caproic acid (6ACA), hexamethylenediamine (HMDA), adipic acid, croytl alcohol, methyl vinyl carbinol, 3-buten-1-ol, 1,2-propanediol (propylene glycol), n-propanol, 1,3-propanediol, etc. Therefore, the fusions can be expressed in cells that naturally have such product pathways, or cells engineered to express the fusion proteins can further be engineered to include target product pathway enzymes that use the increased amounts of intermediate products available when the fusion proteins of the disclosure are expressed.

The fusion proteins of the invention improve the ability of a microorganism to grow on methanol as a carbon source. The improved growth on methanol using methanol pathway fusions is likely due to several benefits the fusions provide: 1) rapid conversion of formaldehyde, a potentially toxic product of the MeDH reaction, to hexulose-6-phosphate (or alternatively to DHA and G3P) due to the localized presence of fused HPS; 2) increased efficiency of the fusion protein(s) in the methanol pathway reduces the amount of total methanol pathway protein required for efficient methanol utilization; 3) the presence of methanol pathway fusion proteins pushes the reaction in the forward, desired direction with respect to methanol utilization.

In embodiments the invention provides a fusion protein comprising: (1a) a first region comprising methanol dehydrogenase or an enzymatically active portion thereof, and (1b) a second region comprising 3-hexulose-6-phosphate dehydrogenase or an enzymatically active portion thereof, (2a) a first region comprising methanol dehydrogenase or an enzymatically active portion thereof, (2b) a second region comprising 3-hexulose-6-phosphate dehydrogenase or an enzymatically active portion thereof, and (2c) a third region comprising methanol dehydrogenase activator or an enzymatically active portion thereof, (3a) a first region comprising methanol dehydrogenase or an enzymatically active portion thereof, and (3b) a second region comprising 6-phospho-3-hexuloisomerase or an enzymatically active portion thereof, (4a) a first region comprising methanol dehydrogenase or an enzymatically active portion thereof, (4b) a second region comprising 3-hexulose-6-phosphate dehydrogenase or an enzymatically active portion thereof, and (4c) a third region comprising methanol dehydrogenase activator or an enzymatically active portion thereof, (5a) a first region comprising methanol dehydrogenase or an enzymatically active portion thereof, (5b) a second region comprising 3-hexulose-6-phosphate dehydrogenase or an enzymatically active portion thereof, and (5c) a third region comprising 6-phospho-3-hexuloisomerase or an enzymatically active portion thereof, or (6a) a first region comprising methanol dehydrogenase or an enzymatically active portion thereof, (6b) a second region comprising 3-hexulose-6-phosphate dehydrogenase or an enzymatically active portion thereof, (6c) a third region comprising 6-phospho-3-hexuloisomerase or an enzymatically active portion thereof, and (6d) a fourth region comprising methanol dehydrogenase activator or an enzymatically active portion thereof, wherein the fusion protein optionally comprises one or more linker amino acid sequence(s) positioned between two or more of the first, second, and third regions of the fusion protein.

In an alternative embodiment directed to MeDH with one or more DHA pathway enzyme(s) fusion proteins, the invention provides a fusion protein comprising: (7a) a first region comprising methanol dehydrogenase or an enzymatically active portion thereof and (7b) a second region comprising DHA synthase or an enzymatically active portion thereof, (8a) a first region comprising methanol dehydrogenase or an enzymatically active portion thereof, (8b) a second region comprising DHA synthase or an enzymatically active portion thereof, and (8c) a third region comprising methanol dehydrogenase activator or an enzymatically active portion thereof, (9a) a first region comprising methanol dehydrogenase or an enzymatically active portion thereof, and (9b) a second region comprising a F6P aldolase or an enzymatically active portion thereof, (10a) a first region comprising methanol dehydrogenase or an enzymatically active portion thereof, (10b) a second region comprising DHA synthase or an enzymatically active portion thereof, and (10c) a third region comprising methanol dehydrogenase activator or an enzymatically active portion thereof, (11a) a first region comprising methanol dehydrogenase or an enzymatically active portion thereof, (11b) a second region comprising DHA synthase or an enzymatically active portion thereof, and (11c) a third region comprising F6P aldolase or an enzymatically active portion thereof, or (12a) a first region comprising methanol dehydrogenase or an enzymatically active portion thereof, (12b) a second region comprising DHA synthase or an enzymatically active portion thereof, (12c) a third region comprising F6P aldolase or an enzymatically active portion thereof, and (12d) a fourth region comprising methanol dehydrogenase activator or an enzymatically active portion thereof, wherein the fusion protein optionally comprises one or more linker amino acid sequence(s) positioned between two or more of the first, second, and third regions of the fusion protein.

Embodiments of the invention also include a nucleic acid encoding the MeDH-containing fusion protein (1-6) or (7-12), expression constructs comprising the nucleic acid, engineered cells comprising the MeDH-containing fusion protein (1-6) or (7-12), such as engineered cells comprising exogenous nucleic acids that express the fusion protein (1-6) or (7-12), and methods for producing a target product or an intermediate thereof comprising culturing the engineered cell comprising the MeDH-containing fusion protein (1-6) or (7-12).

The invention also provides fusion proteins where the methanol dehydrogenase is split into at least two portions separated by at least one regions of 3-hexulose-6-phosphate dehydrogenase, 6-phospho-3-hexuloisomerase, or/and methanol dehydrogenase activator, or alternatively separated by at least one region(s) of DHAS, F6P aldolase, or/and methanol dehydrogenase activator. In this embodiment the invention provides a fusion protein comprising first and second portions of a methanol dehydrogenase, and one or more of 3-hexulose-6-phosphate dehydrogenase or an enzymatically active portion thereof, 6-phospho-3-hexuloisomerase or an enzymatically active portion thereof, or methanol dehydrogenase activator or an enzymatically active portion thereof, positioned between the first and second portions of a methanol dehydrogenase; or alternatively in this embodiment the invention provides a fusion protein comprising first and second portions of a methanol dehydrogenase, and one or more of DHAS or an enzymatically active portion thereof, F6P aldolase or an enzymatically active portion thereof, or methanol dehydrogenase activator or an enzymatically active portion thereof, positioned between the first and second portions of a methanol dehydrogenase. Optionally, the fusion protein includes one or more linker amino acid sequence(s) positioned between two or more of the first, second, and third regions of the fusion protein Embodiments of the invention also include a nucleic acid encoding the fusion protein with a split MeDH sequence, expression constructs comprising the nucleic acid, engineered cells comprising the fusion protein with a split MeDH sequence, such as engineered cells comprising exogenous nucleic acids that express the fusion protein, and methods for producing a target product or an intermediate thereof comprising culturing the engineered cell comprising the fusion protein with a split MeDH sequence.

Other embodiments of the disclosure are directed to products made from the target product obtained from methods using the engineered cell with the fusion protein. Exemplary products include polymers made with a target bioproducts, such as polymers made from diol target products combined with diacids.

DESCRIPTION OF THE DRAWINGS

FIGS. 1A-1F are schematic diagrams of fusion proteins with a MeDH region that is at the N-terminal portion of the protein.

FIGS. 1G-1H are schematic diagrams of fusion proteins with a MeDH region that is at the C-terminal portion of the protein.

FIGS. 2A-2H are schematic diagrams of fusion proteins with a MeDH region that is between N- and C-terminal portions of the protein.

FIGS. 4A and 4B are schematic illustrations of HPS-PHI and MeDH-HPS-PHI fusion proteins in a methanol pathway for formation of fructose-6-phosphate.

FIGS. 9A-9C are schematic diagrams of fusion proteins of DHA (dihydroxyacetone) synthase (DHAS) and/or F6P (fructose-6-phosphate) aldolase with a MeDH region that is split into two portions in the fusion protein.

FIGS. 10A and 10B are schematic illustrations of a methanol pathway for formation of fructose-6-phosphate comparing a non-fusion (10A) and an exemplary fusion (10B) MeDH-DHAS-F6PALd proteins in which less diffusion of an intermediate (Fald, DHA, G3P) occurs.

DETAILED DESCRIPTION

The embodiments of the description described herein are not intended to be exhaustive or to limit the disclosure to the precise forms disclosed in the following detailed description. Rather, the embodiments are chosen and described so that others skilled in the art can appreciate and understand the principles and practices of the description.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

In methanotrophic bacteria formaldehyde made from methane and methanol oxidation is used to form metabolic intermediates in pathways leading to the formation of cellular products (Anthony, C. (1991) Biotechnology 18:79-109). The serine and D-ribulose 5-phosphate (RuMP) pathways use formaldehyde to produce carbon-containing intermediate compounds which are subsequently converted into other downstream products.

The RuMP pathway hexulose-6-phosphate synthase (HPS) enzymatically condenses formaldehyde and D-ribulose 5-phosphate (RuMP) to form hexulose 6-phosphate (HuMP). 6-phospho-3-hexuloisomerase (HPI) enzymatically converts HuMP to β-D-fructofuranose 6-phosphate (FMP). HPS and HPI are unique to natural organisms that have the RUMP pathway. For every one molecule of formaldehyde assimilated, one molecule of FMP is created.

FMP can then be cleaved to 3-carbon compounds by either of two routes. Enzymes of these other routes are not exclusive to those methanotrophic bacteria expressing HPS and HPI In one route 6-phosphofructokinase (EC 2.7.1.11) phosphorylates FMP to fructose 1,6-bisphosphate (FDP). Fructose-bisphosphate aldolase (EC 4.1.2.13) then cleaves FDP into dihydroxy acetone phosphate (DHAP) and glyceraldehyde 3-phosphate.

In another route glucose-6-phosphate isomerase (EC 5.3.1.9) isomerizes FMP to glucose 6-phosphate (GMP). Glucose-6-phosphate 1-dehydrogenase (EC 1.1.1.49) then dehydrogenates GMP to D-glucono-1,5-lactone 6-phosphate which is further dehydrogenated to 6-phospho-gluconate by 6-phosphogluconolactonase (EC 3.1.1.31). Phosphogluconate dehydratase (EC 4.2.1.12) then converts 6-phosphogluconate to 2-keto-3-deoxy-6-phospho-D-gluconate (KDPG). Subsequently, KDPG aldolase (EC 4.1.2.14) cleaves KDPG into glyceraldehyde 3-phosphate and pyruvate. Pyruvate and DHAP formed through this pathway can be used in cellular pathways for the synthesis of biomolecules.

Figure 5:
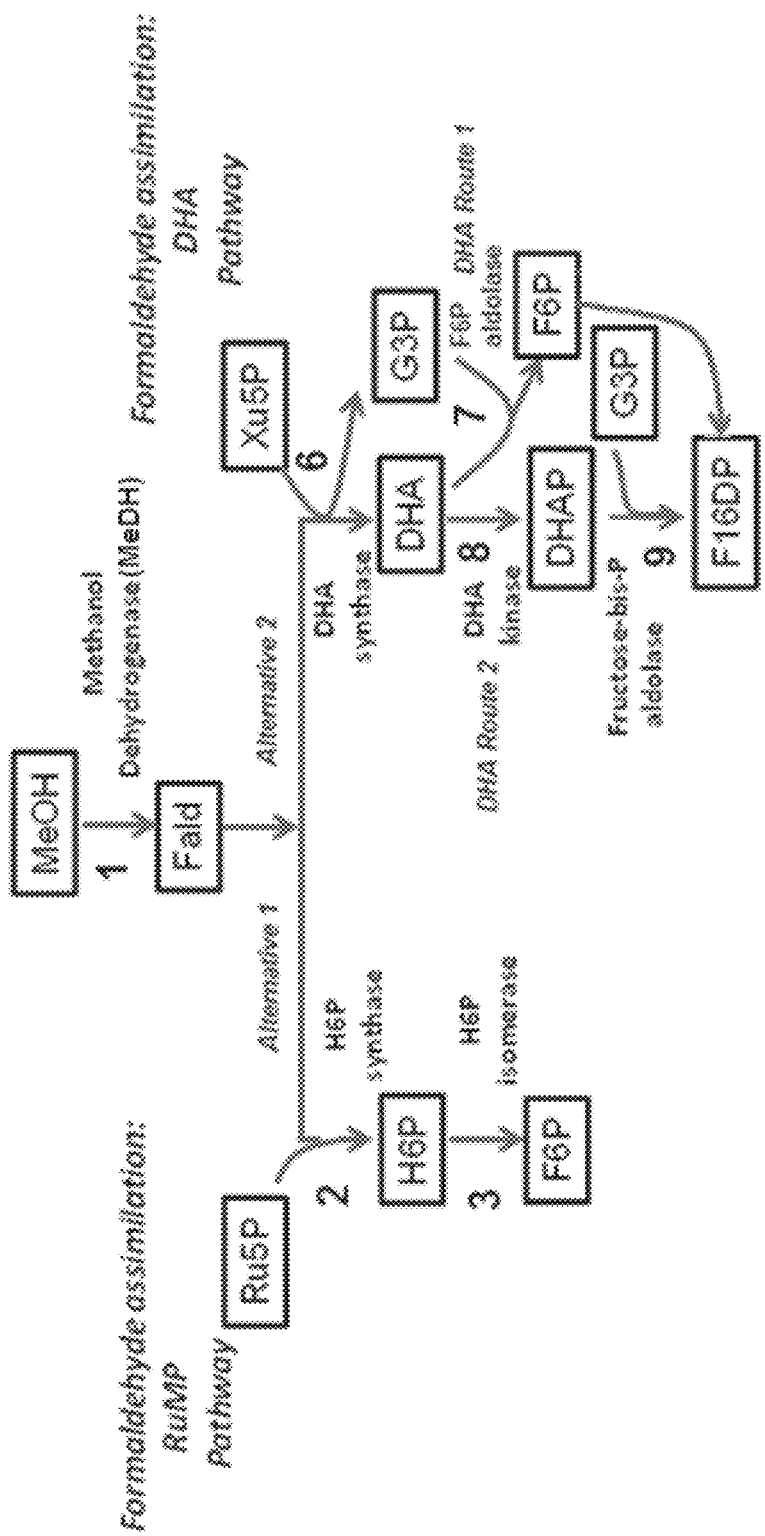
FIG. 5 illustrates alternative formaldehyde assimilation pathways (RuMP and DHA) and metabolic intermediates from each that can be used in a product pathway. Enzymes catalyzing the reactions are (1) methanol dehydrogenase, e.g. EC 1.1.1, (2) hexulose-6-phosphate synthase, e.g. EC 4.1.2.43, (3) 6-phospho-3-hexuloisomerase, e.g. EC 5.3.1.27, (6) DHA (dihydroxyacetone) synthase, e.g. EC 2.2.1.3, (7) F6P (fructose-6-phosphate) aldolase, e.g. EC 4.1.2, (8) DHA kinase, e.g. EC 2.7.1.121, (9) fructose-bisphosphate aldolase, e.g. EC 4.1.2.13. The fusions described herein can catalyze two or more of the reactions.

In engineered cells of the disclosure, methanol consumption minimally requires the heterologous expression of three genes: methanol dehydrogenase (MeDH), 3-hexulose-6-phosphate dehydrogenase (HPS or rmpA), and 6-phospho-3-hexuloisomerase (PHI or rmpB). In another embodiment the engineered cells of the disclosure, methanol consumption minimally requires the heterologous expression of three genes: methanol dehydrogenase (MeDH), DHA (dihydroxyacetone) synthase (DHAS) and F6P (fructose-6-phosphate) aldolase (F6P Ald) (e.g., see DHA Route of FIG. 5) or alternatively, less preferably, MeDH, DHA (dihydroxyacetone) synthase, and DHA kinase optionally with fructose-bisphosphate aldolase (FIG. 5, DHA Route 2). The MeDH protein catalyzes the inter-conversion of methanol and formaldehyde. As noted herein, the HPS protein catalyzes bond formation between formaldehyde and D-ribulose 5-phosphate, forming hexulose-6-phosphate and the PHI protein catalyzes isomerization of hexulose-6-phosphate to fructose-6-phosphate, which is an intermediate in glycolysis. In addition, the presence of an accessory protein, the MeDH Activator (ACT), may increase the activity of MeDH and improve methanol uptake. It is generally recognized that the activity of this heterologous pathway limits the ability of the non-native organism to consume methanol and grow on methanol as a carbon source. One of the issues associated with converting an organism to methylotrophy, is the potential toxic build-up of formaldehyde, the product of MeDH.

The fusion proteins of the disclosure provide approaches to avoid unwanted accumulation of formaldehyde by increasing the efficiency of the HPS reaction that uses formaldehyde and D-ribulose 5-phosphate as substrates, forming hexulose-6-phosphate. Increasing HPS efficiency could be accomplished such as by co-localization of the MeDH and HPS so HPS has easy access to higher local concentrations of formaldehyde. The fusion proteins of MeDH with a DHA Route 1 or Route 2 enzyme or enzymes avoid unwanted accumulation of formaldehyde by providing increased efficiency of the DHA synthase reaction that uses formaldehyde and xylulose-5-phosphate, forming DHA and G3P. Increased rate of MeOH use is also obtained.

Generally, the disclosure provides fusion proteins having at least (i) methanol dehydrogenase activity and (ii) 3-hexulose-6-phosphate dehydrogenase activity and/or 6-phospho-3-hexuloisomerase activity. Generally, in another embodiment the disclosure provides fusion proteins having at least (i) methanol dehydrogenase activity and (ii) DHA synthase activity and/or fructose-6-phosphate aldolase activity; or in yet another embodiment at least (i) methanol dehydrogenase activity and (ii) DHA synthase activity and/or DHA kinase activity. The fusion proteins can also include methanol dehydrogenase activator activity. Therefore, fusion proteins of the disclosure can include two, three, or four or more regions each providing a different activity. The regions can include the full (e.g., native) sequence of the enzyme, or can include an active portion thereof. Optionally, one or more linker sequences can bond one region to another in the fusion protein.

Methanol dehydrogenase activity, 3-hexulose-6-phosphate dehydrogenase activity, 6-phospho-3-hexuloisomerase activity, and methanol dehydrogenase activator activity can be provided by methanol dehydrogenase, 3-hexulose-6-phosphate dehydrogenase, 6-phospho-3-hexuloisomerase activity, and methanol dehydrogenase activator enzymes and active portions thereof, including those polypeptide sequence that are known in the art, as well as those described herein. Methanol dehydrogenase activity, DHA synthase, F6P aldolase, and DHA kinase activity and methanol dehydrogenase activator activity can be provided by methanol dehydrogenase, DHA synthase, F6P aldolase and DHA kinase and methanol dehydrogenase activator enzymes and active portions thereof, including those polypeptide sequence that are known in the art, as well as those described herein. In exemplary fusion protein diagrams the acronym "MeDH" can indicate a polypeptide region having methanol dehydrogenase activity; the acronym "HPS" can indicate a polypeptide region having 3-hexulose-6-phosphate dehydrogenase activity; the acronym "PHI" can indicate a polypeptide region having 6-phospho-3-hexuloisomerase activity; and the acronym "ACT" can indicate a polypeptide region having methanol dehydrogenase activator activity. The acronym "DHAS" can indicate a polypeptide region having DHA synthase activity; the acronym "F6P Ald" can indicate a polypeptide region having F6P aldolase activity; the acronym "DHAK" can indicate a polypeptide region having DHA kinase activity. The fusion proteins can include one or more polypeptide linkers, positions between polypeptide regions of the fusion proteins.

Nucleic acids encoding the fusion proteins, as well as expression constructs including the nucleic acids, are described.

Also described are engineered cells expressing the fusion proteins, optionally including one or more additional metabolic pathway transgene(s), methanol metabolic pathway genes, and/or target product pathway genes; cell culture compositions including the cells; methods for promoting production of the target product or intermediate thereof from the cells; compositions including the target product or intermediate; and products made from the target product or intermediate.

The term "non-naturally occurring", when used in reference to an organism (e.g., microbial) is intended to mean that the organism has at least one genetic alteration not normally found in a naturally occurring organism of the referenced species. Naturally-occurring organisms can be referred to as "wild-type" such as wild type strains of the referenced species. Likewise, a "non-natural" polypeptide or nucleic acid can include at least one genetic alteration not normally found in a naturally-occurring polypeptide or nucleic acid. Fusion proteins of the current disclosure are considered non-natural polypeptides. Naturally-occurring organisms, nucleic acids, and polypeptides can be referred to as "wild-type" or "original" such as wild type strains of the referenced species. Likewise, amino acids found in the wild type organism can be referred to as "original" with regards to any amino acid position.

A genetic alteration that makes an organism non-natural can include, for example, modifications introducing expressible nucleic acids encoding metabolic polypeptides, other nucleic acid additions, nucleic acid deletions and/or other functional disruption of the organism's genetic material. Such modifications include, for example, coding regions and functional fragments thereof, for heterologous, homologous, or both heterologous and homologous polypeptides for the referenced species. Additional modifications include, for example, non-coding regulatory regions in which the modifications alter expression of a gene or operon.

In the fusion protein, the location of regions having 3-hexulose-6-phosphate dehydrogenase activity (HPS), 6-phospho-3-hexuloisomerase activity (PHI), and methanol dehydrogenase activator activity (ACT) relative to the polypeptide having methanol dehydrogenase activity (MeDH) can be explained relative to the amino (N) and/or carboxyl (C) terminus of the fusion protein. In another embodiment the fusion protein, the location of regions having DHAS, F6P Ald (or DHAK), and methanol dehydrogenase activator activity (ACT) relative to the polypeptide having methanol dehydrogenase activity (MeDH) can be explained relative to the amino (N) and/or carboxyl (C) terminus of the fusion protein. For example, regions of the fusion proteins may be described relative to one another as "at the N-terminal portion of the protein" or "at the C-terminal portion of the protein" of the fusion protein if desired. Regions of the fusion proteins may also alternatively be described as "extending inwards from the N-terminus" or "extending inwards from the C-terminus" of the fusion protein if desired. Some regions of the fusion proteins may be described as "between one region and the N-terminal portion of the protein," "between one region and the C-terminal portion of the protein," or, "between the N-terminal portion of the protein and the C-terminal portion of the protein."

The N-terminal and C-terminal portions of the fusion proteins, which, in various embodiments, can include MeDH, HPS, PHI, or ACT regions, or alternatively MeDH, DHAS, F6P ALd (or DHAK) or ACT regions, can optionally be described in terms of the number of amino acid residues extending inward from either N- or C-terminus of the fusion protein. For example, the N-terminal and C-terminal portions of the fusion proteins may encompass up to 50, 75, 100, 125, 150, 175, 200, 225, 250, 275, 300, 325, 350, 375, 400, 425, 450, 475, or 500 amino acids inwards in the fusion protein from either N- or C-terminus, respectively. Likewise, one or more regions between the N-terminal and C-terminal portions which may encompass one or more of MeDH, HPS, PHI, or ACT regions, can be described in terms of an amount of amino acid residues. For example, a region of the fusion protein between the N-terminal and C-terminal portions may encompass up to 50, 75, 100, 125, 150, 175, 200, 225, 250, 275, 300, 325, 350, 375, 400, 425, 450, 475, or 500 amino acids.

Embodiments of the disclosure include, but are not limited to the following fusion protein arrangements: (a) a fusion protein having a MeDH region and PHI region, where the PHI region is between MeDH region and the C-terminus of the fusion protein; (b) a fusion protein having a MeDH region and HPS region, where the HPS region is between MeDH region and the C-terminus of the fusion protein; (c) a fusion protein having a MeDH region and PHI region, where the PHI region is between MeDH region and the N-terminus of the fusion protein; (d) a fusion protein having a MeDH region and HPS region, where the HPS region is between MeDH region and the N-terminus of the fusion protein; (e) a fusion protein having MeDH, HPS and PHI regions, where the MeDH region is between HSP and PHI regions, and where the PHI region is between the MeDH region and the N-terminus of the fusion protein and where the HPS region is between the MeDH region and the C-terminus of the fusion protein; (f) a fusion protein having MeDH, HPS and PHI regions, where the MeDH region is between HSP and PHI regions, and where the HPS region is between the MeDH region and the N-terminus of the fusion protein and where the PHI region is between the MeDH region and the C-terminus of the fusion protein; (g) a fusion protein having MeDH, HPS and PHI regions, where the HPS region is between MeDH and PHI regions, and where the MeDH region is between the HPS region and the N-terminus of the fusion protein and where the PHI region is between the HPS region and the C-terminus of the fusion protein; (h) a fusion protein having MeDH, HPS and PHI regions, where the HPS region is between MeDH and PHI regions, and where the PHI region is between the HPS region and the N-terminus of the fusion protein and where the MeDH region is between the HPS region and the C-terminus of the fusion protein; and (i) a fusion protein having ACT, MeDH, HPS and PHI regions, where the MeDH and HPS regions are between ACT and PHI regions, and where the ACT region is between the MeDH region and the N-terminus of the fusion protein and where the PHI region is between the HPS region and the C-terminus of the fusion protein. Linker sequences can be present between any one or more regions of the fusion proteins of (a)-(i).

For example, Figure TA is a schematic diagram of a fusion protein with MeDH region that extends from the N-terminus and a PHI region that extends from the C-terminus. Such a fusion protein can be designated MeDH-PHI. Optionally, if a polypeptide linker is between the two regions the fusion protein designated MeDH-$L^1$-PHI.

As another embodiment, FIG. 1B is a schematic diagram of a fusion protein with a MeDH region that is at the N-terminal portion of the protein and a HPS region that is at the C-terminal portion of the protein. Such a fusion protein can be designated MeDH-HPS. Optionally, if a polypeptide linker is between the two regions the fusion protein designated MeDH-$L^1$-HPS.

As another embodiment, FIG. 1C is a schematic diagram of a fusion protein with a MeDH region that is at the N-terminal portion of the protein and a PHI region that is at the C-terminal portion of the protein, and a HPS region that is between the MeDH and PHI regions. Such a fusion protein can be designated MeDH-HPS-PHI. Optionally, if polypeptide linker(s) is/are between the different region(s) the fusion protein can be designated MeDH-$L^1$-HPS-PHI, MeDH-HPS-$L^1$-PHI, or MeDH-$L^1$-HPS-$L^2$-PHI.

As another embodiment, FIG. 1D is a schematic diagram of a fusion protein with a MeDH region that is at the N-terminal portion of the protein and a HPS region that is at the C-terminal portion of the protein, and a PHI region that is between the MeDH and HPS regions. Such a fusion protein can be designated MeDH-PHI-HPS. Optionally, if polypeptide linker(s) is/are between the different region(s) the fusion protein can be designated MeDH-$L^1$-PHI-HPS, MeDH-PHI-$L^1$-HPS, or MeDH-$L^1$-PHI-$L^2$-HPS.

As another embodiment, FIG. 1E is a schematic diagram of a fusion protein with a MeDH region that is at the N-terminal portion of the protein and a PHI region that is at the C-terminal portion of the protein, and an ACT region that is between the MeDH and PHI regions. Such a fusion protein can be designated MeDH-ACT-PHI. Optionally, if polypeptide linker(s) is/are between the different region(s) the fusion protein can be designated MeDH-$L^1$-ACT-PHI, MeDH-ACT-$L^1$-PHI, or MeDH-$L^1$-ACT-$L^2$-PHI.

As another embodiment, FIG. 1F a is a schematic diagram of a fusion protein with a MeDH region that is at the N-terminal portion of the protein and a HPS region that is at the C-terminal portion of the protein, and an ACT region that is between the MeDH and HPS regions. Such a fusion protein can be designated MeDH-ACT-HPS. Optionally, if polypeptide linker(s) is/are between the different region(s) the fusion protein can be designated MeDH-$L^1$-ACT-HPS, MeDH-ACT-$L^1$-HPS, or MeDH-$L^1$-ACT-$L^2$-HPS.

As another embodiment, FIG. 1G is a schematic diagram of a fusion protein with MeDH region that is at the C-terminal portion of the protein and a HPS region that is at the N-terminal portion of the protein. Such a fusion protein can be designated HPS-MeDH. Optionally, if a polypeptide linker is between the two regions the fusion protein designated HPS-$L^1$-MeDH.

As another embodiment, FIG. 1H is a schematic diagram of a fusion protein with MeDH region that is at the C-terminal portion of the protein and a PHI region that is at the N-terminal portion of the protein. Such a fusion protein can be designated PHI-MeDH. Optionally, if a polypeptide linker is between the two regions the fusion protein designated PHI-$L^1$-MeDH.

In other embodiments MeDH is positioned between two other regions of amino acid sequence. As another embodiment, FIG. 2A is a schematic diagram of a fusion protein with HPS region that is at the N-terminal portion of the protein and a PHI region that is at the C-terminal portion of the protein, and a MeDH region between the HPS and PHI regions. Such a fusion protein can be designated HPS-MeDH-PHI. Optionally, if polypeptide linker(s) is/are between the different region(s) the fusion protein can be designated HPS-MeDH-$L^1$-PHI, HPS-$L^1$-MeDH-PHI, or HPS-$L^1$-MeDH-$L^2$-PHI.

As another embodiment, FIG. 2B is a schematic diagram of a fusion protein with PHI region that is at the N-terminal portion of the protein and a HPS region that is at the C-terminal portion of the protein, and a MeDH region between the PHI and HPS regions. Such a fusion protein can be designated PHI-MeDH-HPS. Optionally, if polypeptide linker(s) is/are between the different region(s) the fusion protein can be designated PHI-MeDH-$L^1$-HPS, PHI-$L^1$-MeDH-HPS, or PHI-$L^1$-MeDH-$L^2$-HPS.

As another embodiment, FIG. 2C is a schematic diagram of a fusion protein with PHI region that is at the N-terminal portion of the protein and an ACT region that is at the C-terminal portion of the protein, and a MeDH region between the PHI and ACT regions. Such a fusion protein can be designated PHI-MeDH-ACT. Optionally, if polypeptide linker(s) is/are between the different region(s) the fusion protein can be designated PHI-MeDH-L$^1$-ACT, PHI-L$^1$-MeDH-ACT, or PHI-L$^1$-MeDH-L$^2$-ACT.

As another embodiment, FIG. 2D is a schematic diagram of a fusion protein with HPS region that is at the N-terminal portion of the protein and an ACT region that is at the C-terminal portion of the protein, and a MeDH region between the HPS and ACT regions. Such a fusion protein can be designated HPS-MeDH-ACT. Optionally, if polypeptide linker(s) is/are between the different region(s) the fusion protein can be designated HPS-MeDH-L$^1$-ACT, HPS-L$^1$-MeDH-ACT, or HPS-L$^1$-MeDH-L$^2$-ACT.

As another embodiment, FIG. 2E is a schematic diagram of a fusion protein with ACT region that is at the N-terminal portion of the protein and a PHI region that is at the C-terminal portion of the protein, and MeDH and HPS regions being between the ACT and PHI regions, with MeDH being closer to the ACT region and HPS being closer to the PHI region. Such a fusion protein can be designated ACT-MeDH-HPS-PHI. Optionally, if polypeptide linker(s) is/are between the different region the fusion protein can be designated ACT-L$^1$-MeDH-HPS-PHI, ACT-MeDH-L$^1$-HPS-PHI, ACT-MeDH-HPS-L$^1$-PHI, ACT-L$^1$-MeDH-L$^2$-HPS-PHI, ACT-L$^1$-MeDH-HPS-L$^2$-PHI, ACT-MeDH-L$^1$-HPS-L$^2$-PHI, and ACT-L$^1$-MeDH-L$^2$-HPS-L$^3$-PHI.

As another embodiment, FIG. 2F is a schematic diagram of a fusion protein with ACT region that is at the N-terminal portion of the protein and a HPS region that is at the C-terminal portion of the protein, and MeDH and PHI regions between the ACT and HPS regions, with MeDH being closer to the ACT region and PHI being closer to the HPS region. Such a fusion protein can be designated ACT-MeDH-PHI-HPS. Optionally, if polypeptide linker(s) is/are between the different region the fusion protein can be designated ACT-L$^1$-MeDH-PHI-HPS, ACT-MeDH-L$^1$-PHI-HPS, ACT-MeDH-PHI-L$^1$-HPS, ACT-L$^1$-MeDH-L$^2$-PHI-HPS, ACT-L$^1$-MeDH-PHI-L$^2$-HPS, ACT-MeDH-L$^1$-PHI-L$^2$-HPS, and ACT-L$^1$-MeDH-L$^2$-PHI-L$^3$-HPS.

As another embodiment, FIG. 2G is a schematic diagram of a fusion protein with HPS region that is at the N-terminal portion of the protein and an ACT region that is at the C-terminal portion of the protein, and PHI and MeDH regions between the HPS and ACT regions, with PHI being closer to the HPS region and MeDH being closer to the ACT region. Such a fusion protein can be designated HPS-PHI-MeDH-ACT. Optionally, if polypeptide linker(s) is/are between the different region the fusion protein can be designated HPS-L$^1$-PHI-MeDH-ACT, HPS-PHI-L$^1$-MeDH-ACT, HPS-PHI-MeDH-L$^1$-ACT, HPS-L$^1$-PHI-L$^2$-MeDH-ACT, HPS-L$^1$-PHI-MeDH-L$^2$-ACT, HPS-PHI-L$^1$-MeDH-L$^2$-ACT, and HPS-L$^1$-PHI-L$^2$-MeDH-L$^3$-ACT.

As another embodiment, FIG. 2H is a schematic diagram of a fusion protein with PHI region that is at the N-terminal portion of the protein and an ACT region that is at the C-terminal portion of the protein, and HPS and MeDH regions between the PHI and ACT regions, with HPS being closer to the PHI region and MeDH being closer to the ACT region. Such a fusion protein can be designated PHI-HPS-MeDH-ACT. Optionally, if polypeptide linker(s) is/are between the different region the fusion protein can be designated PHI-L$^1$-HPS-MeDH-ACT, PHI-HPS-L$^1$-MeDH-ACT, PHI-HPS-MeDH-L$^1$-ACT, PHI-L$^1$-HPS-L$^2$-MeDH-ACT, PHI-L$^1$-HPS-MeDH-L$^2$-ACT, PHI-HPS-L$^1$-MeDH-L$^2$-ACT, and PHI-L$^1$-HPS-L$^2$-MeDH-L$^3$-ACT.

In other embodiments, in the fusion protein the methanol dehydrogenase is interrupted by at least one different region of amino acid sequence, such as a PHI or a HPS region. For example, the nucleic acid will encode, in frame, a polypeptide with a first portion of a MeDH, a PHI or a HPS region, and then a second portion of a MeDH. Although the MeDH sequence is interrupted, the fusion protein still maintains methanol dehydrogenase activity.

Figure 3A:
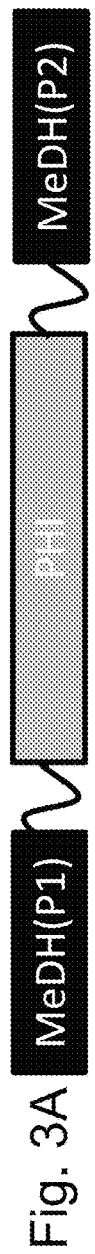
FIGS. 3A-3C are schematic diagrams of fusion proteins with a MeDH region that is split into two portions in the fusion protein.

For example, FIG. 3A is a schematic diagram of a fusion protein having a first portion of a MeDH that is at the N-terminal portion of the protein, a second portion of a MeDH that is at the C-terminal portion of the protein, and PHI region between the first and second methanol dehydrogenase portions. Such fusion proteins can be designated MeDH(P1)-PHI-MeDH(P2), Optionally, if polypeptide linker(s) is/are between the different portions and region(s) the fusion protein can be designated MeDH(P1)-L$^1$-PHI-MeDH(P2), MeDH(P1)-PHI-L$^1$-MeDH(P2), or MeDH(P1)-L$^1$-PHI-L$^2$-MeDH(P2).

Figure 3B:
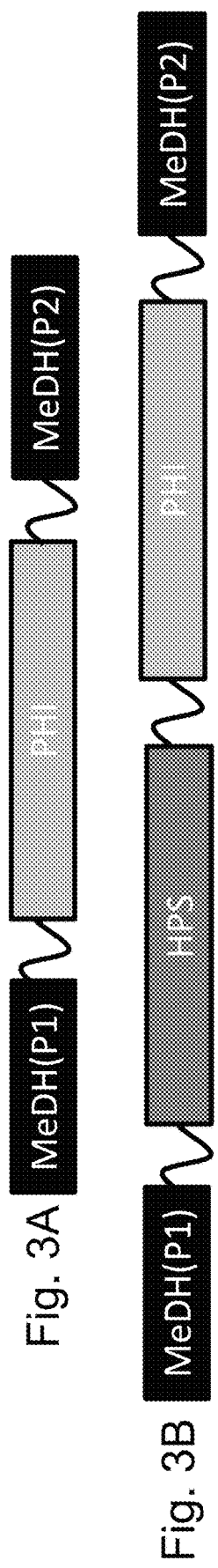

As another embodiment, FIG. 3B is a schematic diagram of a fusion protein having a first portion of a MeDH that is at the N-terminal portion of the protein, a second portion of a MeDH that is at the C-terminal portion of the protein, and HPS and PHI regions between the first and second MeDH portions, with HPS being closer to the first portion of the MeDH and PHI being closer to the second portion of the MeDH. Such a fusion protein can be designated MeDH(P1)-HPS-PHI-MeDH(P2). Optionally, if polypeptide linker(s) is/are between the different portions and region(s) the fusion protein can be designated MeDH(P1)-L$^1$-HPS-PHI-MeDH(P2), MeDH(P1)-HPS-L$^1$-PHI-MeDH(P2), MeDH(P1)-HPS-PHI-L$^1$-MeDH(P2), MeDH(P1)-L$^1$-HPS-L$^2$-PHI-MeDH(P2), MeDH(P1)-L$^1$-HPS-PHI-L$^2$-MeDH(P2), MeDH(P1)-HPS-L$^1$-PHI-L$^2$-MeDH(P2), or MeDH(P1)-L$^1$-HPS-L$^2$-PHI-L$^3$-MeDH(P2).

Figure 3C:

As another embodiment, FIG. 3C is a schematic diagram of a fusion protein having an ACT region that is at the N-terminal portion of the protein, a second portion of a MeDH that is at the C-terminal portion of the protein, a first portion of the MeDH and a HPS region between the ACT region and the second portion of a MeDH, with HPS being in between the first and second MeDH portions. Such a fusion protein can be designated ACT-MeDH(P1)-HPS-MeDH(P2). Optionally, if polypeptide linker(s) is/are between the different portions and region(s) the fusion protein can be designated ACT-L$^1$-MeDH(P1)-HPS-MeDH(P2), ACT-MeDH(P1)-L$^1$-HPS-MeDH(P2), ACT-MeDH(P1)-HPS-L$^1$-MeDH(P2), ACT-L$^1$-MeDH(P1)-L$^2$-HPS-MeDH(P2), ACT-MeDH(P1)-L$^1$-HPS-L$^2$-MeDH(P2), ACT-L$^1$-MeDH(P1)-HPS-L$^2$-MeDH(P2), or ACT-L$^1$-MeDH(P1)-L$^2$-HPS-L$^3$-MeDH(P2).

Additional embodiments of the disclosure include, but are not limited to the following fusion protein arrangements of MeDH with one or more DHA Pathway enzymes: (a) a fusion protein having a MeDH region and DHAS region, where the DHAS region is between MeDH region and the C-terminus of the fusion protein; (b) a fusion protein having a MeDH region and F6PALD region (alternatively written as "F6P Ald"), where the F6PALD region is between MeDH region and the C-terminus of the fusion protein; (c) a fusion protein having a MeDH region and DHAS region, where the DHAS region is between MeDH region and the N-terminus of the fusion protein; (d) a fusion protein having a MeDH region and F6PALD region, where the F6PALD region is between MeDH region and the N-terminus of the fusion protein; (e) a fusion protein having MeDH, F6PALD and DHAS regions, where the MeDH region is between DHAS and DHAS regions, and where the DHAS region is between the MeDH region and the N-terminus of the fusion protein and where the F6PALD region is between the MeDH region and the C-terminus of the fusion protein; (f) a fusion protein having MeDH, F6PALD and DHAS regions, where the MeDH region is between F6PALD and DHAS regions, and where the F6PALD region is between the MeDH region and the N-terminus of the fusion protein and where the DHAS region is between the MeDH region and the C-terminus of the fusion protein; (g) a fusion protein having MeDH, F6PALD and DHAS regions, where the F6PALD region is between MeDH and DHAS regions, and where the MeDH region is between the F6PALD region and the N-terminus of the fusion protein and where the DHAS region is between the F6PALD region and the C-terminus of the fusion protein; (h) a fusion protein having MeDH, F6PALD and DHAS regions, where the F6PALD region is between MeDH and DHAS regions, and where the DHAS region is between the F6PALD region and the N-terminus of the fusion protein and where the MeDH region is between the F6PALD region and the C-terminus of the fusion protein; and (i) a fusion protein having ACT, MeDH, F6PALD and DHAS regions, where the MeDH and F6PALD regions are between ACT and DHAS regions, and where the ACT region is between the MeDH region and the N-terminus of the fusion protein and where the DHAS region is between the F6PALD region and the C-terminus of the fusion protein. Linker sequences can be present between any one or more regions of the fusion proteins of (a)-(i).

Figure 7A:
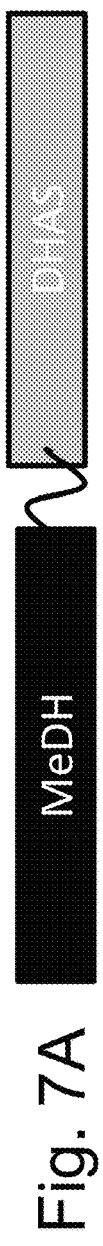
FIGS. 7A-7F are schematic diagrams of fusion proteins of DHA (dihydroxyacetone) synthase (DHAS) or F6P (fructose-6-phosphate) aldolase (F6P Ald) with a MeDH region that is at the N-terminal portion of the fusion protein.

For example, FIG. 7A is a schematic diagram of a fusion protein with MeDH region that extends from the N-terminus and a DHAS region that extends from the C-terminus. Such a fusion protein can be designated MeDH-DHAS. Optionally, if a polypeptide linker is between the two regions the fusion protein designated MeDH-L$^1$-DHAS.

Figure 7B:
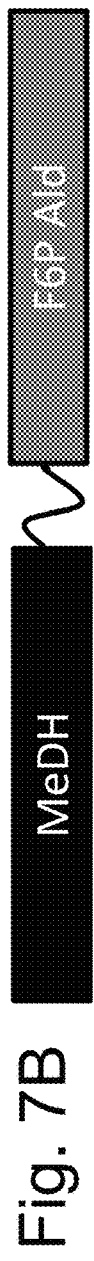

As another embodiment, FIG. 7B is a schematic diagram of a fusion protein with a MeDH region that is at the N-terminal portion of the protein and a F6PALD region that is at the C-terminal portion of the protein. Such a fusion protein can be designated MeDH-F6PALD. Optionally, if a polypeptide linker is between the two regions the fusion protein is designated MeDH-L$^1$-F6PALD.

Figure 7C:

As another embodiment, FIG. 7C is a schematic diagram of a fusion protein with a MeDH region that is at the N-terminal portion of the protein and a DHAS region that is at the C-terminal portion of the protein, and a F6PALD region that is between the MeDH and DHAS regions. Such a fusion protein can be designated MeDH-F6PALD-DHAS. Optionally, if polypeptide linker(s) is/are between the different region(s) the fusion protein can be designated MeDH-L$^1$-F6PALD-DHAS, MeDH-F6PALD-L$^1$-DHAS, or MeDH-L$^1$-F6PALD-L$^2$-DHAS.

Figure 7D:

As another embodiment, FIG. 7D is a schematic diagram of a fusion protein with a MeDH region that is at the N-terminal portion of the protein and a F6PALD region that is at the C-terminal portion of the protein, and a DHAS region that is between the MeDH and F6PALD regions. Such a fusion protein can be designated MeDH-DHAS-F6PALD. Optionally, if polypeptide linker(s) is/are between the different region(s) the fusion protein can be designated MeDH-L$^1$-DHAS-F6PALD, MeDH-DHAS-L$^1$-F6PALD, or MeDH-L$^1$-DHAS-L$^2$-F6PALD.

Figure 7E:

As another embodiment, FIG. 7E is a schematic diagram of a fusion protein with a MeDH region that is at the N-terminal portion of the protein and a DHAS region that is at the C-terminal portion of the protein, and an ACT region that is between the MeDH and DHAS regions. Such a fusion protein can be designated MeDH-ACT-DHAS. Optionally, if polypeptide linker(s) is/are between the different region(s) the fusion protein can be designated MeDH-L$^1$-ACT-DHAS, MeDH-ACT-L$^1$-DHAS, or MeDH-L$^1$-ACT-L$^2$-DHAS.

Figure 7F:

As another embodiment, FIG. 7F a is a schematic diagram of a fusion protein with a MeDH region that is at the N-terminal portion of the protein and a F6PALD region that is at the C-terminal portion of the protein, and an ACT region that is between the MeDH and F6PALD regions. Such a fusion protein can be designated MeDH-ACT-F6PALD. Optionally, if polypeptide linker(s) is/are between the different region(s) the fusion protein can be designated MeDH-L$^1$-ACT-F6PALD, MeDH-ACT-L$^1$-F6PALD, or MeDH-L$^1$-ACT-L$^2$-F6PALD.

Figure 7G:
FIGS. 7G-7H are schematic diagrams of fusion proteins with a MeDH region that is at the C-terminal portion of the fusion protein.

As another embodiment, FIG. 7G is a schematic diagram of a fusion protein with MeDH region that is at the C-terminal portion of the protein and a F6PALD region that is at the N-terminal portion of the protein. Such a fusion protein can be designated F6PALD-MeDH. Optionally, if a polypeptide linker is between the two regions the fusion protein designated F6PALD-L$^1$-MeDH.

Figure 7H:

As another embodiment, FIG. 7H is a schematic diagram of a fusion protein with MeDH region that is at the C-terminal portion of the protein and a DHAS region that is at the N-terminal portion of the protein. Such a fusion protein can be designated DHAS-MeDH. Optionally, if a polypeptide linker is between the two regions the fusion protein designated DHAS-L$^1$-MeDH.

Figure 8A:
FIGS. 8A-8H are schematic diagrams of fusion proteins of DHA (dihydroxyacetone) synthase and F6P (fructose-6-phosphate) aldolase with a MeDH region that is between N- and C-terminal portions of the protein.

In other embodiments MeDH is positioned between two other regions of amino acid sequence. As another embodiment, FIG. 8A is a schematic diagram of a fusion protein with F6PALD region that is at the N-terminal portion of the protein and a DHAS region that is at the C-terminal portion of the protein, and a MeDH region between the F6PALD and DHAS regions. Such a fusion protein can be designated F6PALD-MeDH-DHAS. Optionally, if polypeptide linker(s) is/are between the different region(s) the fusion protein can be designated F6PALD-MeDH-L$^1$-DHAS, F6PALD-L$^1$-MeDH-DHAS, or F6PALD-L$^1$-MeDH-L$^2$-DHAS.

Figure 8B:
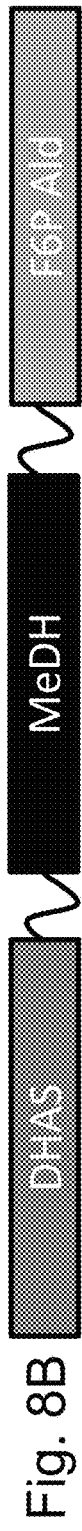

As another embodiment, FIG. 8B is a schematic diagram of a fusion protein with a DHAS region that is at the N-terminal portion of the protein and a F6PALD region that is at the C-terminal portion of the protein, and a MeDH region between the DHAS and F6PALD regions. Such a fusion protein can be designated DHAS-MeDH-F6PALD. Optionally, if polypeptide linker(s) is/are between the different region(s) the fusion protein can be designated DHAS-MeDH-L$^1$-F6PALD, DHAS-L$^1$-MeDH-F6PALD, or DHAS-L$^1$-MeDH-L$^2$-F6PALD.

Figure 8C:

As another embodiment, FIG. 8C is a schematic diagram of a fusion protein with DHAS region that is at the N-terminal portion of the protein and an ACT region that is at the C-terminal portion of the protein, and a MeDH region between the DHAS and ACT regions. Such a fusion protein can be designated DHAS-MeDH-ACT. Optionally, if polypeptide linker(s) is/are between the different region(s) the fusion protein can be designated DHAS-MeDH-L$^1$-ACT, DHAS-L$^1$-MeDH-ACT, or DHAS-L$^1$-MeDH-L$^2$-ACT.

Figure 8D:

As another embodiment, FIG. 8D is a schematic diagram of a fusion protein with F6PALD region that is at the N-terminal portion of the protein and an ACT region that is at the C-terminal portion of the protein, and a MeDH region between the F6PALD and ACT regions. Such a fusion protein can be designated F6PALD-MeDH-ACT. Optionally, if polypeptide linker(s) is/are between the different region(s) the fusion protein can be designated F6PALD-MeDH-L$^1$-ACT, F6PALD-L$^1$-MeDH-ACT, or F6PALD-L$^1$-MeDH-L$^2$-ACT.

Figure 8E:

As another embodiment, FIG. 8E is a schematic diagram of a fusion protein with ACT region that is at the N-terminal portion of the protein and a DHAS region that is at the C-terminal portion of the protein, and MeDH and F6PALD regions between the ACT and DHAS regions, with MeDH being closer to the ACT region and F6PALD being closer to the DHAS region. Such a fusion protein can be designated ACT-MeDH-F6PALD-DHAS. Optionally, if polypeptide linker(s) is/are between the different region the fusion protein can be designated ACT-L$^1$-MeDH-F6PALD-DHAS, ACT-MeDH-L$^1$-F6PALD-DHAS, ACT-MeDH-F6PALD-L$^1$-DHAS, ACT-L$^1$-MeDH-L$^2$-F6PALD-DHAS, ACT-L$^1$-MeDH-F6PALD-L$^2$-DHAS, ACT-MeDH-L$^1$-F6PALD-L$^2$-DHAS, and ACT-L$^1$-MeDH-L$^2$-F6PALD-L$^3$-DHAS.

Figure 8F:

As another embodiment, FIG. 8F is a schematic diagram of a fusion protein with ACT region that is at the N-terminal portion of the protein and a F6PALD region that is at the C-terminal portion of the protein, and MeDH and DHAS regions between the ACT and F6PALD regions, with MeDH being closer to the ACT region and DHAS being closer to the F6PALD region. Such a fusion protein can be designated ACT-MeDH-DHAS-F6PALD. Optionally, if polypeptide linker(s) is/are between the different region the fusion protein can be designated ACT-L$^1$-MeDH-DHAS-F6PALD, ACT-MeDH-L$^1$-DHAS-F6PALD, ACT-MeDH-DHAS-L$^1$-F6PALD, ACT-L$^1$-MeDH-L$^2$-DHAS-F6PALD, ACT-L$^1$-MeDH-DHAS-L$^2$-F6PALD, ACT-MeDH-L$^1$-DHAS-L$^2$-F6PALD, and ACT-L$^1$-MeDH-L$^2$-DHAS-L$^3$-F6PALD.

Figure 8G:

As another embodiment, FIG. 8G is a schematic diagram of a fusion protein with F6PALD region that is at the N-terminal portion of the protein and an ACT region that is at the C-terminal portion of the protein, and DHAS and MeDH regions between the F6PALD and ACT regions, with DHAS being closer to the F6PALD region and MeDH being closer to the ACT region. Such a fusion protein can be designated F6PALD-DHAS-MeDH-ACT. Optionally, if polypeptide linker(s) is/are between the different region the fusion protein can be designated F6PALD-L$^1$-DHAS-MeDH-ACT, F6PALD-DHAS-L$^1$-MeDH-ACT, F6PALD-DHAS-MeDH-L$^1$-ACT, F6PALD-L$^1$-DHAS-L$^2$-MeDH-ACT, F6PALD-L$^1$-DHAS-MeDH-L$^2$-ACT, F6PALD-DHAS-L$^1$-MeDH-L$^2$-ACT, and F6PALD-L$^1$-DHAS-L$^2$-MeDH-L$^3$-ACT.

Figure 8H:
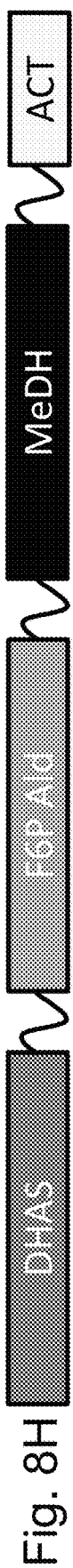

As another embodiment, FIG. 8H is a schematic diagram of a fusion protein with DHAS region that is at the N-terminal portion of the protein and an ACT region that is at the C-terminal portion of the protein, and F6PALD and MeDH regions between the DHAS and ACT regions, with F6PALD being closer to the DHAS region and MeDH being closer to the ACT region. Such a fusion protein can be designated DHAS-F6PALD-MeDH-ACT. Optionally, if polypeptide linker(s) is/are between the different region the fusion protein can be designated DHAS-L$^1$-F6PALD-MeDH-ACT, DHAS-F6PALD-L$^1$-MeDH-ACT, DHAS-F6PALD-MeDH-L$^1$-ACT, DHAS-L$^1$-F6PALD-L$^2$-MeDH-ACT, DHAS-L$^1$-F6PALD-MeDH-L$^2$-ACT, DHAS-F6PALD-L$^1$-MeDH-L$^2$-ACT, and DHAS-L$^1$-F6PALD-L$^2$-MeDH-L$^3$-ACT.

In other embodiments, in the fusion protein the methanol dehydrogenase is interrupted by at least one different region of amino acid sequence, such as a DHAS or a F6PALD region. For example, the nucleic acid will encode, in frame, a polypeptide with a first portion of a MeDH and a DHAS and/or a F6PALD region, and then a second portion of a MeDH. Although the MeDH sequence is interrupted, the fusion protein still maintains methanol dehydrogenase activity.

For example, FIG. 9A is a schematic diagram of a fusion protein having a first portion of a MeDH that is at the N-terminal portion of the protein, a second portion of a MeDH that is at the C-terminal portion of the protein, and DHAS region between, and in frame with, the first and second methanol dehydrogenase portions. Such fusion proteins can be designated MeDH(P1)-DHAS-MeDH(P2), Optionally, if polypeptide linker(s) is/are between the different portions and region(s) the fusion protein can be designated MeDH(P1)-L$^1$-DHAS-MeDH(P2), MeDH(P1)-DHAS-L$^1$-MeDH(P2), or MeDH(P1)-L$^1$-DHAS-L$^2$-MeDH(P2).

As another embodiment, FIG. 9B is a schematic diagram of a fusion protein having a first portion of a MeDH that is at the N-terminal portion of the protein, a second portion of a MeDH that is at the C-terminal portion of the protein, and F6PALD and DHAS regions between the first and second MeDH portions, with DHAS being closer to the first portion of the MeDH and F6PALD being closer to the second portion of the MeDH. Such a fusion protein can be designated MeDH(P1)-DHAS-F6PALD-MeDH(P2). Optionally, if polypeptide linker(s) is/are between the different portions and region(s) the fusion protein can be designated MeDH(P1)-L$^1$-DHAS-F6PALD-MeDH(P2), MeDH(P1)-DHAS-L$^1$-F6PALD-MeDH(P2), MeDH(P1)-DHAS-F6PALD-L$^1$-MeDH(P2), MeDH(P1)-L$^1$-DHAS-L$^2$-F6PALD-MeDH(P2), MeDH(P1)-L$^1$-DHAS-F6PALD-L$^2$-MeDH(P2), MeDH(P1)-DHAS-L$^1$-F6PALD-L$^2$-MeDH(P2), or MeDH(P1)-L$^1$-DHAS-L$^2$-F6PALD-L$^3$-MeDH(P2).

As another embodiment, FIG. 9C is a schematic diagram of a fusion protein having an ACT region that is at the N-terminal portion of the protein, a second portion of a MeDH that is at the C-terminal portion of the protein, and a first portion of the MeDH and a F6PALD region between the ACT region and the second portion of a MeDH, with F6PALD being in between the first and second MeDH portions. Such a fusion protein can be designated ACT-MeDH(P1)-F6PALD-MeDH(P2). Optionally, if polypeptide linker(s) is/are between the different portions and region(s) the fusion protein can be designated ACT-L$^1$-MeDH(P1)-F6PALD-MeDH(P2), ACT-MeDH(P1)-L$^1$-F6PALD-MeDH(P2), ACT-MeDH(P1)-F6PALD-L$^1$-MeDH(P2), ACT-L$^1$-MeDH(P1)-L$^2$-F6PALD-MeDH(P2), ACT-MeDH(P1)-L$^1$-F6PALD-L$^2$-MeDH(P2), or ACT-L$^1$-MeDH(P1)-F6PALD-L$^2$-MeDH(P2).

In specifically contemplated fusion protein embodiments above and elsewhere herein DHA Kinase (DHAK) replaces F6P Aldolase.

Table 1 includes a list of amino acid domains in the MeDH sequence *Bacillus methanolicus* MGA3 MeDH (SEQ ID NO: 1) predicted to have a secondary structure consistent with a coil. These domains represent sites for splitting the MeDH sequence and insertion of another open reading frame (with or without flanking linker sequences), such as shown in FIGS. 3A-3C. For example, the sequence AGTGSETT corresponding to amino acids 139-146 in *Bacillus methanolicus* MGA3 MeDH (SEQ ID NO: 1) represent a first domain having a predicted coil. A fusion protein of the disclosure could have a sequence with a split in the MeDH sequence anywhere within this domain, and insertion of one or more sequences selected from PHI, HPS, and ACT, or alternatively DHAS, F6PAld (or alternatively DHAK) and ACT. For example, for this domain the MeDH sequence can be split between amino acids 139 and 140, 140 and 141, 141 and 142, 142 and 143, 143 and 144, 144 and 145, or 145-146.

TABLE 1

| Type | Sequence | Amino Acid positions |
| --- | --- | --- |
| coil | AGTGSETT | 139-146 |
| coil | GIPSGY | 334-339 |
| coil | HSTGL | 42-46 |
| coil | AQPDP | 67-71 |
| coil | GSSHD | 97-101 |
| coil | VNSV | 122-125 |
| coil | IPP | 7-9 |
| coil | ITP | 167-169 |

The secondary structure of any MeDH can be predicted using EMBOSS (EMBOSS: The European Molecular Biology Open Software Suite (2000) Rice, P. Longden, I. and Bleasby, A. Trends in Genetics 16, (6) pp 276-277). The residues that constitute a predicted coil (residues which are not in any of the conformations such as helix, turn, or sheet) are proposed as sites where the MeDH sequence can be split and a second open reading frame inserted.

Embodiments of the invention include fusion proteins having a region with an amino acid sequence that provides methanol dehydrogenase (MeDH) activity. In the fusion protein, the MeDH amino acid sequence can be based on a full-length protein sequence, a partial sequence, such as one having N- and or C-terminal deletions, or a variant sequence, such as one having one or more amino acid substitutions that differ from the wild type sequence.

In some embodiments the fusion protein has first and second portions of a methanol dehydrogenase which are interrupted by another amino acid sequence that is different than the methanol dehydrogenase, such as a 3-hexulose-6-phosphate dehydrogenase or 6-phospho-3-hexuloisomerase (or alternatively DHAS or F6PAld; or in a further alternative DHAS or DHAK) amino acid sequence or an enzymatically active portion thereof, or methanol dehydrogenase activator or an enzymatically active portion thereof, positioned between the first and second portions of a methanol dehydrogenase.

The fusion protein can include a polypeptide sequence based on the NAD(P)+-dependent methanol dehydrogenase from Bacillus methanolicus MGA3 (Genbank Accession number EIJ77596.1, GI number: 387585261; designated herein as MeDH 2315, 382 amino acids long; SEQ ID NO: 1). MeDH 2315 is reported in the literature as an NAD(P)-dependent methanol dehydrogenase from Bacillus methanolicus MGA3 and its sequence was described in Brautaset et al., "Plasmid-Dependent Methylotrophy in Thermotolerant Bacillus methanolicus", Journal of Bacteriology, vol. 186, pp 1229-1238 (2004). It is also referred to as MeDH MGA3 in WO2013/110797 to Brautaset and MeDH "M" in Krog et al., "Methylotrophic Bacillus methanolicus Encodes Two Chromosomal and One Plasmid Born NAD+ Dependent Methanol Dehydrogenase Paralogs with Different Catalytic and Biochemical Properties", PLOS ONE, pp. 1-11, (2013), which report additional wild-type Bacillus MeDHs. SEQ ID NO: 2 is a nucleic acid sequence encoding SEQ ID NO: 1.

The fusion protein of the disclosure can optionally have a methanol dehydrogenase sequence that is less than 100% identical to Bacillus methanolicus MGA3 (SEQ ID NO: 1). For example, the methanol dehydrogenase region in the fusion polypeptide can have 50% or greater, 60% or greater, 70% or greater, 80% or greater, 85% or greater, 90% or greater, 95% or greater, 96% or greater, 97% or greater, 98% or greater, or 99% or greater identity to (SEQ ID NO: 1).

In some cases, variants having less than 100% identity of SEQ ID NO:1 can be generated by sequence alignment of SEQ ID NO:1 with other known methanol dehydrogenases or alcohol dehydrogenases to identify regions that are conserved and/or important for enzymatic functioning of the protein. Once these regions are identified, the methanol dehydrogenase can be modified at one or more amino acid locations outside of these conserved regions. Therefore, the methanol dehydrogenase region of the fusion protein can have one or more amino acid substitutions, deletions, or additions which cause the sequence to vary from a native methanol dehydrogenase while retaining certain sequence features. Table 2 is a table of pairwise sequence identity of various methanol dehydrogenases including Bacillus methanolicus MGA3 MeDH (SEQ ID NO: 1).

TABLE 2

| | Pairwise alignment (% ID) | | | | |
| --- | --- | --- | --- | --- | --- |
| MeDH | Bacillus methanolicus MGA3 [1] | Bacillus methanolicus MGA3 [2] | Bacillus methanolicus PB1 | Lysinibacillus fusiformis | Clostridium perfringens str. 13 |
| Bacillus methanolicus MGA3 [1] | 100 | 62 | 60.7 | 58.4 | 48.7 |
| Bacillus methanolicus MGA3 [2] | 62 | 100 | 92.7 | 72.2 | 53.2 |
| Bacillus methanolicus PB1 | 60.7 | 92.7 | 100 | 72.2 | 53.5 |
| Lysinibacillus fusiformis | 58.4 | 72.2 | 72.2 | 100 | 51.2 |
| Clostridium perfringens str. 13 | 48.7 | 53.2 | 53.5 | 51.2 | 100 |

[1] EIJ77596.1
[2] EIJ83020.1

In other cases, variants having less than 100% identity of SEQ ID NO:1 can be generated by known variants of methanol dehydrogenases, such as described in the art. Such variants may provide increased catalytic activity in the fusion protein, such as increased conversion of methanol to formaldehyde, which is then subsequently converted into a ketose phosphate compound such as hexulose 6-phosphate, or fructose 6-phosphate due to the localization of HPS and/or PSI in the fusion protein.

Exemplary variants of Bacillus methanolicus MGA3 MeDH (SEQ ID NO: 1) are described in International Patent Application No. PCT/US2014/059135, the disclosure of which is incorporated herein. A fusion protein including a MeDH region of the current disclosure can include one or more amino acid substitutions based on these variants.

Exemplary amino acid substitutions of SEQ ID NO: 1 include, but are not limited to, those as follows: S11T, D38N, H42Q, E48D, N53I, E56K, D60E, V61A, I63F, P65Q, D70N, P71I, P71T, P71V, T74S, D81G, K84R, E86K, N87K, I94V, S99P, S99T, A103V, I106L, G107S, L108V, L108W, V109Y, N112K, N112R, R115H, I116F, N117D, N117Q, N117Y, Q120H, Q120R, G121A, G121D, G121E, G121L, G121M, G121R, G121S, G121T, G121V, G121W, G121Y, V122A, V122P, N123D, N123I, N123L, N123R, N123Y, S124I, S124L, S124R, V125C, V125G, V125W, E126G, E126V, K127C, K127R, P128A, P128R, P128S, V129A, V129M, V129P, V129S, V130F, V130I, V130Y, A134T, S143T, T145M, T146N, S147R, L148A, L148F, L148G, L148I, L148T, L148V, L148W, A149L, A149M, A149T, A149V, V150A, V150I, T152M, A155V, K157N, V158E, V158H, V158K, V158W, P161A, P161G, P161Q, P161S, P161V, I163F, I163N, I163Q, I163T, D164G, D164N, E165G, K181R, A184T, L186M, T190A, T190S, I199V, Q217K, L226M, G256C, Q267H, G269S, G270M, G270S, G270Y, T296S, R298H, A300T, I302V, G312V, A316V, I323M, F333L, P336L, S337C, G343D, V344A, V344G, K345E, E350K, K354M, N355D, N355I, N355K, E358G, V360A, V360G, V360K, V360R, V360S, C361N, C361R, Q363K, and K379M.

Other exemplary amino acid substitutions of SEQ ID NO: 1 include: D38N, D60E, P71I, P71V, N87K, S99T, A103V, G107S, L108V, L108W, V109Y, R115H, I116F, N117D, N117Q, G121D, G121E, G121L, G121M, G121R, G121S, G121T, G121V, G121W, G121Y, V122P, N123D, N123I, N123L, N123R, N123Y, S124I, S124L, V125C, V125G, V125W, E126G, K127C, K127R, P128A, P128R, P128S, V129A, V129M, V129P, V129S, V130F, V130I, V130Y, A134T, S143T, T146N, A149L, A149M, A149T, A149V, V150A, K157N, V158E, V158H, V158K, V158W, I163Q, D164N, Q267H, G270M, G270S, G270Y, K345E, N355D, V360G, V360K, V360R, V360S, C361R.

In exemplary embodiments a fusion protein including a MeDH region of the current disclosure includes one, two, three, or all four amino acid substitutions selected from the following group: V129M, V130I, G270S, and N355D. An exemplary MeDH variant is SEQ ID NO: 8 which is encoded by the nucleic acid sequence SEQ ID NO: 9.

Corresponding amino acid substitutions can also be made in other methanol dehydrogenase sequences based on alignment of SEQ ID NO: 1.

SEQ ID NO: 1, or an amino acid sequence with at least 50% or greater identity to SEQ ID NO: 1, can be used in any of the fusion proteins of the disclosure, including, but not limited to MeDH-PHI, MeDH-HPS, MeDH-HPS-PHI, MeDH-ACT-PHI, MeDH-ACT-HPS, HPS-MeDH, PHI-MeDH, HPS-MeDH-PHI, PHI-MeDH-HPS, PHI-MeDH-ACT, HPS-MeDH-ACT, ACT-MeDH-PHI-HPS, ACT-MeDH-HPS-PHI, HPS-PHI-MeDH-ACT, PHI-HPS-MeDH-ACT, MeDH(P1)-PHI-MeDH(P2), MeDH(P1)-HPS-PHI-MeDH(P2), and ACT-MeDH(P1)-HPS-MeDH (P2), including those fusion proteins having one or more linker sequences between regions/portions of the fusion protein. In another embodiment SEQ ID NO: 1, or an amino acid sequence with at least 50% or greater identity to SEQ ID NO: 1, can be used in any of the fusion proteins of the disclosure, including, but not limited to MeDH-DHAS, MeDH-F6PALD, MeDH-F6PALD-DHAS, MeDH-ACT-DHAS, MeDH-ACT-F6PALD, F6PALD-MeDH, DHAS-MeDH, F6PALD-MeDH-DHAS, DHAS-MeDH-F6PALD, DHAS-MeDH-ACT, F6PALD-MeDH-ACT, ACT-MeDH-DHAS-F6PALD, ACT-MeDH-F6PALD-DHAS, F6PALD-DHAS-MeDH-ACT, DHAS-F6PALD-MeDH-ACT, MeDH (P1)-DHAS-MeDH(P2), MeDH(P1)-F6PALD-DHAS-MeDH(P2), and ACT-MeDH(P1)-F6PALD-MeDH(P2), including those fusion proteins having one or more linker sequences between regions/portions of the fusion protein.

An exemplary MeDH having at least 50% or greater identity to SEQ ID NO: 1 is SEQ ID NO: 10 which is encoded by the nucleic acid sequence SEQ ID NO: 11.

The fusion protein can include a polypeptide sequence based on other methanol dehydrogenase sequences, including those known in the art. Methanol dehydrogenases are of the enzyme class (EC) 1.1.1. Other MeDH sequences include Bacillus methanolicus MGA3 MeDH (SEQ ID NO:1; 3EIJ77596.1); Bacillus methanolicus C1 MeDH (SEQ ID NO:13; AAA22593.1); Bacillus methanolicus PB1 MeDH (SEQ ID NO:14; EIJ77618.1); Bacillus methanolicus PB1 MeDH (SEQ ID NO:15; EIJ78790.1); Bacillus methanolicus MGA3 MeDH (SEQ ID NO:16; EIJ80770.1); Bacillus methanolicus PB1 MeDH (SEQ ID NO:17; EIJ78397.1); Bacillus methanolicus MGA3 MeDH (SEQ ID NO:18; EIJ83020.1); Lysinibacillus fusiformis MeDH (SEQ ID NO:19; EFI69743.1); Bacillus coagulans 36D1 MeDH (SEQ ID NO:20; YP_004860127.1); Lysinibacillus sphaericus MeDH (SEQ ID NO:21; YP_001699778.1); Bacillus azotoformans LMG 9581 MeDH (SEQ ID NO:22; ZP_11313277.1); Burkholderia thailandensis E264 MeDH (SEQ ID NO:23; ZP_05587334.1); Cupriavidus necator N-1 MeDH (SEQ ID NO:24; YP_004681552.1); uncultured organism MeDH (SEQ ID NO:25; AGF87161);

Geobacter bemidjiensis Bem MeDH (SEQ ID NO:26; YP_002138168.1); Carboxydothermus hydrogenoformans Z-2901 MeDH (SEQ ID NO:27; YP_359772.1); Actinobacillus succinogenes 130Z MeDH (SEQ ID NO:28; YP_001343716.1); Acinetobacter baumannii Naval-82 MeDH (SEQ ID NO:29; ZP_16224338.1); Clostridium pasteurianum DSM 525 MeDH (SEQ ID NO:30; AAC45651.1); Methanosarcina mazei Tuc01 MeDH (SEQ ID NO:31; YP_007491369.1); Desulfovibrio vulgaris str. 'Miyazaki F' MeDH (SEQ ID NO:32; YP_002434746); Desulfovibrio africanus str. Walvis Bay MeDH (SEQ ID NO: 33; YP_005052855); Clostridium perfringens str. 13 MeDH (SEQ ID NO:34; NP_561852.1); Vibrio campbellii ATCC BAA-1116 MeDH (SEQ ID NO:35; YP_001447544); Desulfotomaculum reducens MI-1 MeDH (SEQ ID NO:36; YP_001113612.1); Desulfovibrio vulgaris str. Hildenborough MeDH (SEQ ID NO:37; YP_011618); Photobacterium profundum 3TCK MeDH (SEQ ID NO:38; ZP_01220157.1); Geobacillus sp. Y4.1MC1 MeDH (SEQ ID NO:39; YP_003990729.1); Desulfovibrio fructosovorans JJ MeDH (SEQ ID NO:40; ZP_07335453.1); Shewanella oneidensis MR-1 MeDH (SEQ ID NO:41; NP_717107); Sebaldella termitidis ATCC 33386 MeDH (SEQ ID NO:42; YP_003310546.1); Paenibacillus peoriae KCTC 3763 MeDH (SEQ ID NO:43; ZP_10241531.1); Klebsiella pneumoniae subsp. pneumoniae MGH 78578 MeDH (SEQ ID NO:44; YP_001337153.1); Escherichia coli MeDH (SEQ ID NO:45; YP_026233.1); Clostridium perfringens ATCC 13124 MeDH (SEQ ID NO:46; YP_694908); Ralstonia eutropha H16 MeDH (SEQ ID NO:47; YP_725376.1); Thermoanaerobacter sp. X514 MeDH (SEQ ID NO:48; YP_001663549); human gut metagenome MeDH (SEQ ID NO:49; EKC54576); or Geobacillus themodenitrificans NG80-2 MeDH (SEQ ID NO:50; YP_001126968.1).

Any of these MeDH sequences, or an amino acid sequence with at least 50% or greater identity to these sequences, can be used in any of the fusion proteins of the disclosure, including, but not limited to MeDH-PHI, MeDH-HPS, MeDH-HPS-PHI, MeDH-ACT-PHI, MeDH-ACT-HPS, HPS-MeDH, PHI-MeDH, HPS-MeDH-PHI, PHI-MeDH-HPS, PHI-MeDH-ACT, HPS-MeDH-ACT, ACT- MeDH-PHI-HPS, ACT-MeDH-HPS-PHI, HPS-PHI-MeDH-ACT, PHI-HPS-MeDH-ACT, MeDH(P1)-PHI-MeDH(P2), MeDH(P1)-HPS-PHI-MeDH(P2), and ACT-MeDH(P1)-HPS-MeDH(P2), including those fusion proteins having one or more linker sequences between regions/portions of the fusion protein. In embodiments of MeDH with DHA Pathway enzymes, any of these MeDH sequences, or an amino acid sequence with at least 50% or greater identity to these sequences, can be used in any of the fusion proteins of the disclosure, including, but not limited to MeDH-DHAS, MeDH-F6PALD, MeDH-F6PALD-DHAS, MeDH-ACT-DHAS, MeDH-ACT-F6PALD, F6PALD-MeDH, DHAS-MeDH, F6PALD-MeDH-DHAS, DHAS-MeDH-F6PALD, DHAS-MeDH-ACT, F6PALD-MeDH-ACT, ACT-MeDH-DHAS-F6PALD, ACT-MeDH-F6PALD-DHAS, F6PALD-DHAS-MeDH-ACT, DHAS-F6PALD-MeDH-ACT, MeDH(P1)-DHAS-MeDH(P2), MeDH(P1)-F6PALD-DHAS-MeDH(P2), and ACT-MeDH(P1)-F6PALD-MeDH(P2), including those fusion proteins having one or more linker sequences between regions/portions of the fusion protein.

In some embodiments of the disclosure, an engineered cell can express one or more fusion proteins that include a MeDH region, in addition to a MeDH protein that is not fused to another protein (e.g., a MeDH protein in wild-type form). Expression of a non-fused MeDH protein, in combination with MeDH fusion proteins that include a 3-hexulose-6-phosphate dehydrogenase activity or 6-phospho-3-hexuloisomerase region can allow expression of desired amounts of polypeptide conferring MeDH, HPS, PHI, and ACT in the cell. As discussed herein, MeDH and MeDH fusion proteins can form a multi-protein complex and predetermined amounts of MeDH, HPS, PHI, and ACT can be present in the multi-protein complex to provide optimal conversion of methanol through d-arabino-3-hexulose-6-phosphate to fructose 6-phosphate. In embodiments of MeDH with the DHA Pathway enzymes of the disclosure, an engineered cell can express one or more fusion proteins that include a MeDH region, in addition to a MeDH protein that is not fused to another protein (e.g., a MeDH protein in wild-type form). Expression of a non-fused MeDH protein, in combination with MeDH fusion proteins that include a DHAS or F6PAld (or DHAK) region can allow expression of desired amounts of polypeptide conferring MeDH, DHAS, F6PAld (or DHAK), and ACT in the cell. As discussed herein, MeDH and MeDH fusion proteins can form a multi-protein complex and predetermined amounts of MeDH, DHAS, F6PAld (or DHAK), and ACT can be present in the multi-protein complex to provide optimal conversion of methanol through DHA and G3P to fructose 6-phosphate.

Other suitable methanol dehydrogenase sequences that can be used in the fusion protein of the disclosure include those that are "orthologs" of known methanol dehydrogenase sequences, such as SEQ ID NO: 1, can be identified and part or all of its sequence can be used to prepare the fusion proteins of the disclosure. An ortholog is a gene or genes that are related by vertical descent and are responsible for substantially the same or identical functions in different organisms. Genes are related by vertical descent when, for example, they share sequence similarity of sufficient amount to indicate they are homologous, or related by evolution from a common ancestor. Genes can also be considered orthologs if they share three-dimensional structure but not necessarily sequence similarity, of a sufficient amount to indicate that they have evolved from a common ancestor to the extent that the primary sequence similarity is not identifiable. Genes that are orthologous can encode proteins with sequence similarity of about 45% to 100% amino acid sequence identity, and more preferably about 60% to 100% amino acid sequence identity.

For example, genes sharing a desired amount of identity (e.g., 45%, 50%, 55%, or 60% or greater) to the NAD(P)-dependent methanol dehydrogenase from *Bacillus methanolicus* MGA3 (2315A), including orthologs and paralogs, can be determined by methods well known to those skilled in the art. For example, inspection of nucleic acid or amino acid sequences for two polypeptides will reveal sequence identity and similarities between the compared sequences. Based on such similarities, one skilled in the art can determine if the similarity is sufficiently high to indicate the proteins are related through evolution from a common ancestor.

Computational approaches to sequence alignment and generation of sequence identity include global alignments and local alignments. Global alignment uses global optimization to forces alignment to span the entire length of all query sequences. Local alignments, by contrast, identify regions of similarity within long sequences that are often widely divergent overall. For understanding the identity of a target sequence to a known methanol dehydrogenase, such as For the *Bacillus methanolicus* MGA3 (2315A) template, a global alignment can be used. Optionally, amino terminal and/or carboxyl-terminal sequences of the target sequence that share little or no identity with the template sequence can be excluded for a global alignment and generation of an identity score.

Algorithms well known to those skilled in the art, such as Align, BLAST, Clustal W and others compare and determine a raw sequence similarity or identity, and also determine the presence or significance of gaps in the sequence which can be assigned a weight or score. Default parameters can be used for the alignment and BLOSUM62 as the scoring matrix.

Such algorithms also are known in the art and are similarly applicable for determining nucleotide sequence similarity or identity. Parameters for sufficient similarity to determine relatedness are computed based on well-known methods for calculating statistical similarity, or the chance of finding a similar match in a random polypeptide, and the significance of the match determined. A computer comparison of two or more sequences can, if desired, also be optimized visually by those skilled in the art. Related gene products or proteins can be expected to have a high similarity, for example, 45% to 100% sequence identity. Proteins that are unrelated can have an identity which is essentially the same as would be expected to occur by chance, if a database of sufficient size is scanned (about 5%).

In some cases, it can be useful to use the Basic Local Alignment Search Tool (BLAST) algorithm to understand the sequence identity between an amino acid motif in a template sequence and a target sequence. Therefore, in preferred modes of practice, BLAST is used to identify or understand the identity of a shorter stretch of amino acids (e.g. a sequence motif) between a template and a target protein. BLAST finds similar sequences using a heuristic method that approximates the Smith-Waterman algorithm by locating short matches between the two sequences. The (BLAST) algorithm can identify library sequences that resemble the query sequence above a certain threshold. Exemplary parameters for determining relatedness of two or more sequences using the BLAST algorithm, for example, can be as set forth below. Briefly, amino acid sequence alignments can be performed using BLASTP version 2.0.8

(Jan. 5, 1999) and the following parameters: Matrix: 0 BLOSUM62; gap open: 11; gap extension: 1; x_dropoff 50; expect: 10.0; wordsize: 3; filter: on. Nucleic acid sequence alignments can be performed using BLASTN version 2.0.6 (Sep. 16, 1998) and the following parameters: Match: 1; mismatch: −2; gap open: 5; gap extension: 2; x_dropoff: 50; expect: 10.0; wordsize: 11; filter: off. Those skilled in the art will know what modifications can be made to the above parameters to either increase or decrease the stringency of the comparison, for example, and determine the relatedness of two or more sequences.

The enzyme 3-hexulose-6-phosphate synthase (HPS) can carry out the fixation of formaldehyde with ribulose 5-phosphate (Ru5P) to form d-arabino-3-hexulose-6-phosphate (Hu6P). The fusion protein can include a polypeptide sequence based on Bacillus methanolicus MGA HPS (Genbank Accession number AAR39392.1, 211 amino acids long; SEQ ID NO: 3).

The fusion protein of the disclosure can optionally have a 3-hexulose-6-phosphate synthase sequence that is less than 100% identical to Bacillus methanolicus MGA HPS (SEQ ID NO: 3). For example, the methanol dehydrogenase region in the fusion polypeptide can have 50% or greater, 60% or greater, 70% or greater, 80% or greater, 85% or greater, 90% or greater, 95% or greater, 96% or greater, 97% or greater, 98% or greater, or 99% or greater identity to SEQ ID NO: 3.

In some cases, variants having less than 100% identity of SEQ ID NO: 3 can be generated by sequence alignment of SEQ ID NO: 3 with other known 3-hexulose-6-phosphate synthase to identify regions that are conserved and/or important for enzymatic functioning of the protein. Once these regions are identified, the 3-hexulose-6-phosphate synthase can be modified at one or more amino acid locations outside of these conserved regions. Therefore, the 3-hexulose-6-phosphate synthase region of the fusion protein can have one or more amino acid substitutions, deletions, or additions which cause the sequence to vary from a native methanol dehydrogenase while retaining certain sequence features.

SEQ ID NO: 3, or an amino acid sequence with at least 50% or greater identity to SEQ ID NO: 3, can be used in fusion proteins of the disclosure, including, but not limited to MeDH-PHI, MeDH-HPS, MeDH-HPS-PHI, MeDH-ACT-PHI, MeDH-ACT-HPS, HPS-MeDH, PHI-MeDH, HPS-MeDH-PHI, PHI-MeDH-HPS, PHI-MeDH-ACT, HPS-MeDH-ACT, ACT-MeDH-PHI-HPS, ACT-MeDH-HPS-PHI, HPS-PHI-MeDH-ACT, PHI-HPS-MeDH-ACT, MeDH(P1)-HPS-PHI-MeDH(P2), ACT-MeDH(P1)-HPS-MeDH(P2), including those fusion proteins having one or more linker sequences between regions/portions of the fusion protein.

The fusion protein can include a polypeptide sequence based on other 3-hexulose-6-phosphate dehydrogenase sequences, including those known in the art. 3-hexulose-6-phosphate dehydrogenases are of the enzyme class (EC) 4.1.2.43. Other 3-hexulose-6-phosphate dehydrogenases include, but are not limited to, Bacillus methanolicus PB1 HPS (SEQ ID NO: 51; EIJ81375.1); Methylobacillus flagellatus HPS (SEQ ID NO: 52; YP 544362.1); Methylobacillus flagellatus HPS (SEQ ID NO:63; YP 544363.1); Bacillus subtilis HPS (SEQ ID NO: 53; NP_388228.1); Methylophilus methylotrophus HPS (SEQ ID NO: 54; WP_018986666.1); Methylophilus methylotrophus ATCC 53528 HPS (SEQ ID NO: 55; WP_018985298.1); Aminomonas aminovorus HPS (SEQ ID NO:64; AAG29505.1), Amycolatopsis methanolica 239 HPS (SEQ ID NO:65; AIJ24611.1); Geobacillus sp. GHH01 HPS (SEQ ID NO:66; YP_007402409.1); Geobacillus sp. M10EXG HPS (SEQ ID NO:67; AAR91478.1); Geobacillus sp. Y4.1MC1 HPS (SEQ ID NO:68; YP_003990382.1); Geobacillus thermodenitrificans NG80-2 HPS (SEQ ID NO:69; WP_008879217.1); Methylomonas aminofaciens HPS (SEQ ID NO:70; BAA83096.1); Methylovorus glucosetrophus SIP3-4 HPS (SEQ ID NO:71; YP_003050044.1); Methylovorus sp. MP688 HPS (SEQ ID NO:72; YP_004038706.1); and Mycobacterium gastri HPS (SEQ ID NO: 62; BAA90546.1).

Any of these HPS sequences, or an amino acid sequence with at least 50% or greater identity to these sequences, can be used in fusion proteins of the disclosure, including, but not limited to MeDH-PHI, MeDH-HPS, MeDH-HPS-PHI, MeDH-ACT-PHI, MeDH-ACT-HPS, HPS-MeDH, PHI-MeDH, HPS-MeDH-PHI, PHI-MeDH-HPS, PHI-MeDH-ACT, HPS-MeDH-ACT, ACT-MeDH-PHI-HPS, ACT-MeDH-HPS-PHI, HPS-PHI-MeDH-ACT, PHI-HPS-MeDH-ACT, MeDH(P1)-HPS-PHI-MeDH(P2), ACT-MeDH(P1)-HPS-MeDH(P2), including those fusion proteins having one or more linker sequences between regions/portions of the fusion protein.

Other suitable 3-hexulose-6-phosphate dehydrogenase sequences that can be used in the fusion protein of the disclosure include those that are "orthologs" of known 3-hexulose-6-phosphate dehydrogenase sequences, such as orthologs of SEQ ID NO: 3, can be identified and part or all of its sequence can be used to prepare the fusion proteins of the disclosure.

One of skill can modify the HPS with one or more amino acid substitutions, deletions, and/or additions based on alignment of HPS sequences, including those known in the art. Tables 3A and 3B are tables of pairwise sequence identity of various 3 hexulose 6 phosphate dehydrogenase sequences including Bacillus methanolicus MGA HPS (SEQ ID NO: 3).

TABLE 3A

Pairwise alignment (% ID)

| HPS | Geobacillus thermodenitrificans NG80-2 | Bacillus methanolicus MGA3 | Bacillus methanolicus PB1 | Geobacillus sp. GHH01 | Geobacillus sp. M10EXG | Geobacillus sp. Y4.1MC1 | Methylophilus methylotrophus |
|---|---|---|---|---|---|---|---|
| Geobacillus thermodenitrificans NG80-2 | 100 | 30.8 | 30.8 | 30.3 | 29.9 | 29.9 | 91.8 |
| Bacillus methanolicus MGA3 | 30.8 | 100 | 98.1 | 76.8 | 76.8 | 77.3 | 98.4 |
| Bacillus methanolicus PB1 | 30.8 | 98.1 | 100 | 76.3 | 76.3 | 76.8 | 97.9 |
| Geobacillus sp. GHH01 | 30.3 | 76.8 | 76.3 | 100 | 97.6 | 98.1 | 98.9 |
| Geobacillus sp. M10EXG | 29.9 | 76.8 | 76.3 | 97.6 | 100 | 99.5 | 98.4 |

TABLE 3A-continued

Pairwise alignment (% ID)

| HPS | Geobacillus thermodenitri- ficans NG80-2 | Bacillus methanolicus MGA3 | Bacillus methanolicus PB1 | Geobacillus sp. GHH01 | Geobacillus sp. M10EXG | Geobacillus sp. Y4.1MC1 | Methylophilus methylotrophus |
|---|---|---|---|---|---|---|---|
| Geobacillus sp. Y4.1MC1 | 29.9 | 77.3 | 76.8 | 98.1 | 99.5 | 100 | 98.4 |
| Methylophilus methylotrophus | 31.8 | 38.4 | 37.9 | 38.9 | 98.4 | 38.4 | 100 |
| Methylophilus methylotrophus ATCC53528 | 32.1 | 34.4 | 34 | 38.3 | 97.8 | 37.8 | 81.9 |
| Methylobacillus flagellatus | 33.2 | 37.5 | 37 | 40.9 | 40.4 | 40.4 | 83.7 |
| Methylomonas aminofaciens | 32.7 | 36.5 | 36.1 | 39.9 | 39.4 | 39.4 | 84.7 |
| Methylovorus glucosetrophus SIP3-4 | 31.5 | 37.2 | 36.7 | 38.2 | 37.7 | 37.7 | 80.4 |
| Aminomonas aminovorus | 31.3 | 37 | 36.5 | 37.9 | 37.4 | 37.4 | 76.1 |
| Methylobacilus flagellatus | 31.3 | 37 | 36.5 | 37.9 | 37.4 | 37.4 | 76.5 |
| Amycolatopsis methanolica 239 | 33.8 | 40 | 38.6 | 37.6 | 38.1 | 38.1 | 46.2 |
| Mycobacterium gastri | 32.7 | 39.4 | 39.9 | 39.4 | 38.9 | 38.9 | 46.6 |

TABLE 3B

Pairwise alignment (% ID)

| HPS | Methylophilus methylotrophus ATCC 53528 | Methylo- bacillus flagellatus | Methylomonas aminofaciens | Methylovorus glucosetrophus SIP3-4 | Aminomonas aminovorus | Methylo- bacilus flagellatus | Amycolatopsis methanolica 239 | Myco- bacterium gastri |
|---|---|---|---|---|---|---|---|---|
| Geobacillus thermodenitri- ficans NG80-2 | 32.1 | 33.2 | 32.7 | 31.5 | 31.3 | 31.3 | 33.8 | 32.7 |
| Bacillus methanolicus MGA3 | 34.4 | 37.5 | 36.5 | 37.2 | 37 | 37 | 40 | 39.4 |
| Bacillus methanolicus PB1 | 34 | 37 | 36.1 | 36.7 | 36.5 | 36.5 | 38.6 | 39.9 |
| Geobacillus sp. GHH01 | 38.3 | 40.9 | 39.9 | 38.2 | 37.9 | 37.9 | 37.6 | 39.4 |
| Geobacillus sp. M10EXG | 37.8 | 40.4 | 39.4 | 37.7 | 37.4 | 37.4 | 38.1 | 38.9 |
| Geobacillus sp. Y4.1MC1 | 37.8 | 40.4 | 39.4 | 37.7 | 37.4 | 37.4 | 38.1 | 38.9 |
| Methylophilus methylotrophus | 81.9 | 83.7 | 84.7 | 80.4 | 76.1 | 76.5 | 46.2 | 46.6 |
| Methylophilus methylotrophus ATCC53528 | 100 | 87.1 | 87.6 | 82 | 83.3 | 83.8 | 47.1 | 47.1 |
| Methylobacillus flagellatus | 87.1 | 100 | 97.1 | 88.2 | 87.6 | 86.6 | 47.4 | 47.1 |
| Methylomonas aminofaciens | 87.6 | 97.1 | 100 | 89.2 | 86.1 | 86.1 | 46.9 | 45.7 |
| Methylovorus glucosetrophus SIP3-4 | 82 | 88.2 | 89.2 | 100 | 90.5 | 90.5 | 46.6 | 45.6 |
| Aminomonas aminovorus | 83.3 | 87.6 | 86.1 | 90.5 | 100 | 97.4 | 47.6 | 47.1 |
| Methylobacilus flagellatus | 83.8 | 86.6 | 86.1 | 90.5 | 97.4 | 100 | 47.6 | 46.2 |
| Amycolatopsis methanolica 239 | 47.1 | 47.4 | 46.9 | 46.6 | 47.6 | 47.6 | 100 | 60.1 |
| Mycobacterium gastri | 47.1 | 47.1 | 45.7 | 45.6 | 47.1 | 46.2 | 60.1 | 100 |

6-phospho-3-hexuloisomerase activity (PHI), can carry out the isomerization of d-arabino-3-hexulose-6-phosphate (Hu6P) to fructose 6-phosphate (Hu6P). The fusion protein can include a polypeptide sequence based on *Bacillus methanolicus* MGA3 PHI (Genbank Accession number AAR39393.1, 184 amino acids long; SEQ ID NO: 4).

The fusion protein of the disclosure can optionally have a 6-phospho-3-hexuloisomerase sequence that is less than 100% identical to *Bacillus methanolicus* MGA3 PHI (SEQ ID NO: 4). For example, the methanol dehydrogenase region in the fusion polypeptide can have 50% or greater, 60% or greater, 70% or greater, 80% or greater, 85% or greater, 90% or greater, 95% or greater, 96% or greater, 97% or greater, 98% or greater, or 99% or greater identity to (SEQ ID NO: 4).

In some cases, variants having less than 100% identity of SEQ ID NO: 4 can be generated by sequence alignment of SEQ ID NO: 4 with other known 6-phospho-3-hexuloisomerase to identify regions that are conserved and/or important for enzymatic functioning of the protein. Once these regions are identified, the 6-phospho-3-hexuloisomerase can be modified at one or more amino acid locations outside of these conserved regions. Therefore, the 6-phospho-3-hexuloisomerase region of the fusion protein can have one or more amino acid substitutions, deletions, or additions which cause the sequence to vary from a native 6-phospho-3-hexuloisomerase while retaining certain sequence features.

SEQ ID NO: 4, or an amino acid sequence with at least 50% or greater identity to SEQ ID NO: 4, can be used in fusion proteins of the disclosure, including, but not limited to MeDH-PHI, MeDH-HPS-PHI, ACT-MeDH-HPS-PHI, PHI-MeDH, HPS-MeDH-PHI, PHI-MeDH-HPS, MeDH (P1)-PHI-MeDH(P2), MeDH(P1)-HPS-PHI-MeDH(P2), including those fusion proteins having one or more linker sequences between regions/portions of the fusion protein.

The fusion protein can include a polypeptide sequence based on other 6-phospho-3-hexuloisomerase activity sequences, including those known in the art. 6-phospho-3-hexuloisomerases are of the enzyme class (EC) 5.3.1.27. Other PHI sequences include, but are not limited to *Bacillus methanolicus* PB1 PHI (SEQ ID NO: 56; EIJ81376.1); *Mycobacterium gastri* PB1 PHI (SEQ ID NO: 57; BAA90545.1); *Methylobacillus flagellatus* KT PHI (SEQ ID NO: 58; YP 545762.1); *Bacillus subtilis* PHI (SEQ ID NO: 59; NP_388227.1); *Methylophilus methylotrophus* ATCC 53528 HPS (SEQ ID NO: 60; WP_018985297.1); *Amycolatopsis methanolica* 239 PHI (SEQ ID NO:73;

AIJ24609.1); *Geobacillus* sp. GHH01 PHI (SEQ ID NO:74; YP_007402408.1); *Geobacillus* sp. Y4.1MC1 PHI (SEQ ID NO:75; YP_003990383.1); *Geobacillus thermodenitrificans* NG80-2 PHI (SEQ ID NO:76; WP_011887353.1); *Methylomonas aminofaciens* PHI (SEQ ID NO:77; BAA83098.1); *Methylovorus glucosetrophus* SIP3-4 PHI (SEQ ID NO:78; YP_003051269.1); and *Methylovorus* sp. MP688 PHI (SEQ ID NO: 79; ADQ84715.1).

Any of these PHI sequences, or an amino acid sequence with at least 50% or greater identity to these sequences, can be used in fusion proteins of the disclosure, including, but not limited to MeDH-PHI, MeDH-HPS-PHI, ACT-MeDH-HPS-PHI, PHI-MeDH, HPS-MeDH-PHI, PHI-MeDH-HPS, MeDH(P1)-PHI-MeDH(P2), MeDH(P1)-HPS-PHI-MeDH (P2), including those fusion proteins having one or more linker sequences between regions/portions of the fusion protein.

One of skill can modify the PHI with one or more amino acid substitutions, deletions, and/or additions based on alignment of PHI sequences, including those known in the art. Tables 4A and 4B are tables of pairwise sequence identity of various 6-phospho-3-hexuloisomerase sequences including *Bacillus methanolicus* MGA3 PHI (SEQ ID NO: 4).

TABLE 4A

Pairwise alignment (% ID)

| PHI | *Methylobacillus flagellatus* KT | *Methylomonas aminofaciens* | *Methylophilus methylotrophus* ATCC 53528 | *Methylovorus glucosetrophus* SIP3-4 | *Geobacillus thermodenitrificans* NG80-2 |
|---|---|---|---|---|---|
| *Methylobacillus flagellatus* KT | 100 | 95.6 | 58.9 | 64.4 | 31.1 |
| *Methylomonas aminofaciens* | 95.6 | 100 | 59.4 | 65 | 30.6 |
| *Methylophilus methylotrophus* ATCC 53528 | 58.9 | 59.4 | 100 | 86.5 | 28 |
| *Methylovorus glucosetrophus* SIP3-4 | 64.4 | 65 | 86.5 | 100 | 29.7 |
| *Geobacillus thermodenitrificans* NG80-2 | 31.1 | 30.6 | 28 | 29.7 | 100 |
| *Bacillus methanolicus* MGA3 | 32.4 | 33 | 32 | 33.1 | 37.2 |
| *Bacillus methanolicus* PB1 | 32.4 | 33 | 32 | 33.1 | 37.2 |
| *Geobacillus* sp. GHH01 | 35 | 34.4 | 32.4 | 32.4 | 41.5 |
| *Geobacillus* sp Y4.1MC1 | 33.9 | 34.4 | 33 | 33.5 | 39.9 |
| *Amycolatopsis methanolica* 239 | 31.3 | 31.9 | 27.1 | 27.6 | 36.6 |
| *Mycobacterium gastri* | 33 | 33 | 31.5 | 33.1 | 37.7 |

TABLE 4B

Pairwise alignment (% ID)

| PHI | *Bacillus methanolicus* MGA3 | *Bacillus methanolicus* PB1 | *Geobacillus* sp. GHH01 | *Geobacillus* sp. Y4.1MC1 | *Amycolatopsis methanolica* 239 | *Mycobacterium gastri* |
|---|---|---|---|---|---|---|
| *Methylobacillus flagellatus* KT | 32.4 | 32.4 | 35 | 33.9 | 31.3 | 33 |
| *Methylomonas aminofaciens* | 33 | 33 | 34.4 | 34.4 | 31.9 | 33 |
| *Methylophilus methylotrophus* ATCC 53528 | 32 | 32 | 32.4 | 33 | 27.1 | 31.5 |
| *Methylovorus glucosetrophus* SIP3-4 | 33.1 | 33.1 | 32.4 | 33.5 | 27.6 | 33.1 |
| *Geobacillus thermodenitrificans* NG80-2 | 37.2 | 37.2 | 41.5 | 39.9 | 36.6 | 37.7 |
| *Bacillus methanolicus* MGA3 | 100 | 98.9 | 75.1 | 76.8 | 32.6 | 37.5 |
| *Bacillus methanolicus* PB1 | 98.9 | 100 | 74.5 | 76.2 | 32.6 | 38.6 |
| *Geobacillus* sp. GHH01 | 75.1 | 74.6 | 100 | 93 | 33 | 36.2 |
| *Geobacillus* sp Y4.1MC1 | 76.8 | 76.2 | 93 | 100 | 32.6 | 38 |
| *Amycolatopsis methanolica* 239 | 32.6 | 32.6 | 33 | 32.6 | 100 | 47.7 |
| *Mycobacterium gastri* | 37.5 | 38.6 | 36.2 | 38 | 47.7 | 100 |

Engineered cells of the disclosure can also express MeDH-containing fusion proteins that include sequences of naturally-occurring HPS-PHI fusion proteins, or variants thereof.

The engineered fusion protein can include a polypeptide sequence based on natural HPS-PHI fusions, such as, a fusion from *Methylococcus capsulatas* (YP_115138.1); *Methylomicrobium album* BG8 (EIC30826.1); *Pyrococcus abyssi* (NP_127388.1); *Pyrococcus furiosus* (NP_577949.1); *Pyrococcus horikoshii* OT3 (NP_143767.1), or *Thermococcus kodakaraensis* (YP_182888.1). An exemplary HPS-PHI fusion is SEQ ID NO: 5.

Any of these HPS-PHI sequences, or an amino acid sequence with at least 50% or greater identity to these sequences, can be used in the fusion proteins of the disclosure, such as MeDH-PHI, MeDH-HPS-PHI, ACT-MeDH-HPS-PHI, and MeDH(P1)-HPS-PHI-MeDH(P2), including those fusion proteins having one or more linker sequences between regions/portions of the fusion protein.

Engineered cells of the disclosure (whether using HPA and PHI or using DHAS or F6PALd, or DHAS and DHAK) can also express MeDH-containing fusion proteins that include a MeDH activator sequence. A MeDH activator sequence can activate a MeDH enzyme by providing hydrolytic removal of a nicotinamide mononucleotide (NMN) moiety of the NAD cofactor. MeDH activator is active in the presence of magnesium ions and is also able to use ADP-ribose. (Kloosterman, H., et al. (2002) J Biol Chem. 277: 34785-34792).

The engineered fusion protein can include a polypeptide sequence based on MeDH activator sequences, such as, activators of *Bacillus methanolicus* MGA3 (WP_004435441.1; SEQ ID NO: 12) and *Bacillus methanolicus* PB1 (SEQ ID NO:80; WP_004437560.1).

These MeDH activator sequences, or an amino acid sequence with at least 50% or greater identity to SEQ ID NO: 12, can be used in the fusion proteins of the disclosure, such as MeDH-ACT-PHI, MeDH-ACT-HPS, HPS-MeDH-ACT, ACT-MeDH-PHI-HPS, ACT-MeDH-HPS-PHI, HPS-PHI-MeDH-ACT, PHI-HPS-MeDH-ACT, and ACT-MeDH(P1)-HPS-MeDH(P2).

One or more linker amino acid sequences can be present between regions in the fusion proteins of the disclosure. Linker sequence can provide desired functionality in the fusion protein. Some fusion proteins of the disclosure can be expressed as a single open reading frame without the introduction of linker(s), and some fusion proteins of the disclosure can include a linker sequence between one or more regions of the fusion protein, wherein the linker can allow the region to exhibit desired enzymatic activity. Linker sequences can generically be described as "rigid" or "flexible," with linker sequences of longer length generally considered to be more flexible. Rigid linkers frequently form alpha-helical structures. Linker sequences can be prepared to provide desired properties such as length, solubility, and protease sensitivity.

Exemplary linker sequences are from 1 to 150, 1 to 100, or 1 to 50 amino acids in length. Some linker sequences are short, such as from one to ten, or from two to six amino acids in length. Linker sequences may be referred to as "linkers," "linker peptides," "linker peptide sequences." The linker may include any amino acid, but preferably includes one or more amino acids that are selected from the group consisting of glycine, alanine, serine, and threonine. In some linker sequences the majority (>50%) of the amino acids residues are glycine. Some linker sequences may include acidic residues such as Asp or Glu, or basic residues, such as Lys, Arg. Linker sequences can be chosen to impart one or more particular properties to the fusion protein, such as improved stability or solubility properties. The amino acids may provide regions of flexibility between the MeDH, PHI, HPS, and/or ACT regions in the fusion proteins.

Exemplary linker sequence include, but are not limited to $(G)_n$ where n is 4-8; $(GS)_n$, $(GGS)_n$, $(GGGS)_n$, $(GGGGS)_n$, and $(GGGGGS)_n$, where n is 1-6, such as 1, 2, 3, 4, 5, or 6; $[(GGS)_x(GS)_y]_n$ where x is 1-6, y is 1-6, and n is 1-4; $(GE)_n$, $(GGE)_n$, $(GGGE)_n$, and $(GGGGE)_n$, where n is 1-10; $(GD)_n$, $(GGD)_n$, $(GGGD)_n$, and $(GGGGD)_n$, where n is 1-10; $(GK)_n$, $(GGK)_n$, $(GGGK)_n$, and $(GGGGK)_n$, where n is 1-10; $(GR)_n$, $(GGR)_n$, $(GGGR)_n$, and $(GGGGR)_n$, where n is 1-10; $(EAAAK)_n$ where n is 1-10; $A(EAAAK)_nA$ where n is 1-10; $A(EAAAK)_4ALEA(EAAAK)_4A$; $(PAPAP)_n$ where n is 1-4; $(AEAAAKEAAAKA)_n$ where n is 1-4; $(AP)_n$ where n is 1-35; $(KP)_n$ where n is 1-35; $(EP)_n$ where n is 1-35; $(LE)_n$ where n is 1-35; $(GA_2PA_3PAKQEA_3PAPA_2KAEAPA_3PA_2KA)_n$ where n is 1-5; $(KESGSVSSEQLAQFRSLD)_n$ where n is 1-5; $(EGKSSGSGSESKST)_n$ where n is 1-5; $(GSAGSAAGSGEF)_n$ where n is 1-4; $[A(EAAAK)_nA]_y$ where n is 1-5 and y is 1-4; $(GGSGGSGSGSGGGSGSGSGGS)_n$ where n is 1 or 2; and SSGWGSGG.

Preferably the linker is $[(GGS)_x(GS)_y(GGS)_z]_n$ (SEQ ID NO:91) where x is 1-6, y is 1-6, z is 0-3, and n is 1-4, preferably where x is 1-3, y is 1-3, z is 1-2, and n is 1-2.

Fusion protein formulas may optionally be described with reference to one or more SEQ ID NO(s). For example, a fusion protein of the general formula MeDH-L¹-HPS-L²-PHI, may be more specifically described as SEQ ID NO:1-L¹-SEQ ID NO:3-L²-SEQ ID NO:4. If the fusion protein has a sequences with less than 100% identity to referenced sequences (e.g., 90% or greater identity), the fusion protein may described as follows: [SEQ ID NO:1, ≥90%]-L¹-[SEQ ID NO:3, ≥90%]-L²-[SEQ ID NO:4, ≥90%]. Or for example, a fusion protein of the general formula MeDH-L¹-DHAS-L²-F6PAld, may be more specifically described as SEQ ID NO:1-L¹-SEQ ID NO:X-L²-SEQ ID NO:Y, where X and Y are a SEQ ID Number of a DHAS or F6PAld sequence, respectively, of which are exemplary sequences are described herein and below. If the fusion protein has a sequences with less than 100% identity to referenced sequences (e.g., 90% or greater identity), the fusion protein may described as follows: [SEQ ID NO:1≥90%]-L¹-[SEQ ID NO:X≥90%]-L²-[SEQ ID NO:Y≥90%].

As another example, a fusion protein of the general formula ACT-L¹-MeDH-L²-PHI-L³-HPS, may be more specifically described as SEQ ID NO:12-L¹-SEQ ID NO:1-L²-SEQ ID NO:4-L³-SEQ ID NO:3. If certain regions of the fusion protein have sequences with less than 100% identity (e.g., 90% or greater identity, 85% or greater identity) to referenced sequences, the fusion protein may described as follows: SEQ ID NO:12-L¹-[SEQ ID NO:1≥90%]-L²-SEQ ID NO:4-L³-[SEQ ID NO:3≥85%].

As another example, a fusion protein of the general formula MeDH-L¹-HPS-PHI, wherein HPS-PHI is from a natural fusion protein, may be more specifically described as SEQ ID NO:1-L¹-SEQ ID NO:5, SEQ ID NO:6-L¹-SEQ ID NO:5, SEQ ID NO:8-L¹-SEQ ID NO:5, or SEQ ID NO:10-L¹-SEQ ID NO:5. In some arrangements L¹ is SEQ ID NO:7. In some embodiments the fusion protein has 50% or greater, 60% or greater, 70% or greater, 80% or greater, 85% or greater, 90% or greater, 95% or greater, 96% or greater, 97% or greater, 98% or greater, or 99% or greater identity to SEQ ID NO:1-SEQ ID NO:7-SEQ ID NO:5, SEQ ID NO:6-SEQ ID NO:7-SEQ ID NO:5, SEQ ID NO:8-SEQ ID NO:7-SEQ ID NO:5, or SEQ ID NO:10-SEQ ID NO:7-SEQ ID NO:5.

In some embodiments of the invention, fusion proteins are expressed in an engineered cell to provide a multi-protein complex including the fusion proteins. Formation of a multi-protein complex can be achieved through MeDH-MeDH interactions. MeDH is believed to be a homo-multimeric protein, frequently composed of 10 monomer subunits. It has been shown that MeDH from *Methylococcus capsulatus* (Bath) is primarily a dimer in solution, and an oligomeric species with a molecular mass of ~450-560 kDa forms at higher protein concentrations. (Culpepper M. A., Rosenzweig, A. C. (2014) Biochemistry 53:6211-6219). Therefore, a multi-protein complex can be formed in the cell by interactions between MeDH portions of fusion proteins, or between MeDH portions of fusion proteins and a non-fused MeDH, HPS, PHI, and/or ACT (e.g., wild type) proteins, or between MeDH portions of fusion proteins and a non-fused MeDH, DHAS, F6PAld (or DHAK) and/or ACT (e.g., wild type) proteins. The expression of desired fusion proteins, or combination of fusion proteins and unfused proteins, can produce a variety of heterodecamers or heteromultimers with activity optimized for methanol utilization, in some cases, subsequent bioproduct formation. For example, the cell can be engineered to provide a multi-protein complex that efficiently converts methanol to d-arabino-3-hexulose-6-phosphate to fructose 6-phosphate, which then can be further used as a precursor to a desired bioproduct.

A cell can be engineered in such a way to provide desired ratios of MeDH, HPS, PHI, and ACT sequences or to provide desired ratios of MeDH, DHAS, F6PAld (or DHAK) and ACT sequences. For example, the cell can include exogenous nucleic acids encoding the following fusion proteins: MeDH-PHI, MeDH-HPS, and MeDH-ACT, (or alternately MeDH-DHAS, MeDH-F6PAld and MeDH-ACT) and if the cell is engineered so that each of these fusion proteins is expressed in equal numbers, then the amount of MeDH sequence would be stoichiometrically greater (three times) greater than PHI, HPS, and ACT sequences (or alternatively DHAS, F6PALd and ACT sequences). Optionally, the cell can be engineered to express a MeDH (non-fusion) protein. The fusion proteins can assemble along with the non-fusion MeDH protein to form a multi-protein complex having a desired ratio of protein components which in turn can provide an optimal balance of methanol pathway activities to maximize methanol flux.

In some embodiments, the cell is engineered to provide a stoichiometric ratio of MeDH that is greater than any one of HPS, PHI, or ACT (MeDH>HPS, PHI, or ACT). For example, the ratio of MeDH to any one of HPS, PHI, or ACT can be in the range of 10:1 to 0.5:1, 6:1 to 1:1, or 3:1 to 1:1. Alternatively in some embodiments, the cell is engineered to provide a stoichiometric ratio of MeDH that is greater than any one of DHAS, F6PALd or ACT (MeDH>DHAS, F6PAld or ACT). For example, the ratio of MeDH to any one of DHAS, F6PAld or ACT can be in the range of 10:1 to 0.5:1, 6:1 to 1:1, or 3:1 to 1:1.

An expression vector or vectors can be constructed to include one or more fusion protein-encoding nucleic acids as exemplified herein, operably linked to expression control sequences functional in the host organism. Expression vectors applicable for use in the microbial host organisms provided include, for example, plasmids, phage vectors, viral vectors, episomes and artificial chromosomes, including vectors and selection sequences or markers operable for stable integration into a host chromosome. Additionally, the expression vectors can include one or more selectable marker genes and appropriate expression control sequences. Selectable marker genes also can be included that, for example, provide resistance to antibiotics or toxins, complement auxotrophic deficiencies, or supply critical nutrients not in the culture media. Expression control sequences can include constitutive and inducible promoters, transcription enhancers, transcription terminators, and the like which are well known in the art.

The fusion protein can be co-expressed with one or more additional nucleic acids that may encode enzyme(s) useful for converting intermediates, such as fructose 6-phosphate (F6P) and other compounds downstream of F6P, to desired bioproducts. When two or more exogenous encoding nucleic acids are to be co-expressed, both nucleic acids can be inserted, for example, into a single expression vector or in separate expression vectors. For single vector expression, the encoding nucleic acids can be operationally linked to one common expression control sequence or linked to different expression control sequences, such as one inducible promoter and one constitutive promoter. The transformation of exogenous nucleic acid sequences involved in a metabolic or synthetic pathway can be confirmed using methods well known in the art. Such methods include, for example, nucleic acid analysis such as Northern blots or polymerase chain reaction (PCR) amplification of mRNA, or immuno-blotting for expression of gene products, or other suitable analytical methods to test the expression of an introduced nucleic acid sequence or its corresponding gene product. It is understood by those skilled in the art that the exogenous nucleic acid is expressed in a sufficient amount to produce the desired product, and it is further understood that expression levels can be optimized to obtain sufficient expression using methods well known in the art and as disclosed herein.

The term "exogenous" is intended to mean that the referenced molecule or the referenced activity is introduced into the host microbial organism. The molecule can be introduced, for example, by introduction of an encoding nucleic acid into the host genetic material such as by integration into a host chromosome or as non-chromosomal genetic material such as a plasmid. Therefore, the term as it is used in reference to expression of an encoding nucleic acid refers to introduction of the encoding nucleic acid in an expressible form into the microbial organism. When used in reference to a biosynthetic activity, the term refers to an activity that is introduced into the host reference organism. The source can be, for example, a homologous or heterologous encoding nucleic acid that expresses the referenced activity following introduction into the host microbial organism. Therefore, the term "endogenous" refers to a referenced molecule or activity that is present in the host. Similarly, the term when used in reference to expression of an encoding nucleic acid refers to expression of an encoding nucleic acid contained within the microbial organism. The term "heterologous" refers to a molecule or activity derived from a source other than the referenced species whereas "homologous" refers to a molecule or activity derived from the host microbial organism. Accordingly, exogenous expression of an encoding nucleic acid can utilize either or both a heterologous or homologous encoding nucleic acid.

It is understood that when more than one exogenous nucleic acid is included in a microbial organism, the more than one exogenous nucleic acid refers to the referenced encoding nucleic acid or biosynthetic activity, as discussed above. It is further understood, as disclosed herein, that more than one exogenous nucleic acid can be introduced into the host microbial organism on separate nucleic acid molecules, on polycistronic nucleic acid molecules, or a combination thereof, and still be considered as more than one exogenous nucleic acid. For example, as disclosed herein a microbial organism can be engineered to express two or more exogenous nucleic acids encoding a desired pathway enzyme or protein, such as an exogenous nucleic acid that expresses a fusion protein of the disclosure, and one or more other enzymes that convert an intermediate from the RuMP pathway (or alternatively a DHA Pathway, preferably DHA Route 1) to a desired bioproduct.

In the case where two exogenous nucleic acids encoding a desired activity are introduced into a host microbial organism, it is understood that the two exogenous nucleic acids can be introduced as a single nucleic acid, for example, on a single plasmid, on separate plasmids, can be integrated into the host chromosome at a single site or multiple sites, and still be considered as two exogenous nucleic acids. Similarly, it is understood that more than two exogenous nucleic acids can be introduced into a host organism in any desired combination, for example, on a single plasmid, on separate plasmids, can be integrated into the host chromosome at a single site or multiple sites, and still be considered as two or more exogenous nucleic acids, for example three exogenous nucleic acids. Thus, the number of referenced exogenous nucleic acids or biosynthetic activities refers to the number of encoding nucleic acids or the number of biosynthetic activities, not the number of separate nucleic acids introduced into the host organism.

Exogenous fusion protein-encoding nucleic acid sequences can be introduced stably or transiently into a host cell using techniques well known in the art including, but not limited to, conjugation, electroporation, chemical transformation, transduction, transfection, and ultrasound transformation. Optionally, for exogenous expression in *E. coli* or other prokaryotic cells, some nucleic acid sequences in the genes or cDNAs of eukaryotic nucleic acids can encode targeting signals such as an N-terminal mitochondrial or other targeting signal, which can be removed before transformation into prokaryotic host cells, if desired. For example, removal of a mitochondrial leader sequence led to increased expression in *E. coli* (Hoffmeister et al., *J. Biol. Chem.* 280:4329-4338 (2005)). For exogenous expression in yeast or other eukaryotic cells, genes can be expressed in the cytosol without the addition of leader sequence, or can be targeted to mitochondrion or other organelles, or targeted for secretion, by the addition of a suitable targeting sequence such as a mitochondrial targeting or secretion signal suitable for the host cells. Thus, it is understood that appropriate modifications to a nucleic acid sequence to remove or include a targeting sequence can be incorporated into an exogenous nucleic acid sequence to impart desirable properties. Furthermore, genes can be subjected to codon optimization with techniques well known in the art to achieve optimized expression of the proteins.

The terms "microbial," "microbial organism" or "microorganism" are intended to mean any organism that exists as a microscopic cell that is included within the domains of archaea, bacteria or eukarya. Therefore, the term is intended to encompass prokaryotic or eukaryotic cells or organisms having a microscopic size and includes bacteria, archaea and eubacteria of all species as well as eukaryotic microorganisms such as yeast and fungi. The term also includes cell cultures of any species that can be cultured for the production of a biochemical.

The term "isolated" when used in reference to a microbial organism is intended to mean an organism that is substantially free of at least one component as the referenced microbial organism is found in nature. The term includes a microbial organism that is removed from some or all components as it is found in its natural environment. The term also includes a microbial organism that is removed from some or all components as the microbial organism is found in non-naturally occurring environments.

In some aspects a nucleic acid encoding the fusion protein is introduced into a cell with a gene disruption. The term "gene disruption," or grammatical equivalents thereof, is intended to mean a genetic alteration that renders the encoded gene product inactive or attenuated. The genetic alteration can be, for example, deletion of the entire gene, deletion of a regulatory sequence required for transcription or translation, deletion of a portion of the gene which results in a truncated gene product, or by any of various mutation strategies that inactivate or attenuate the encoded gene product. One particularly useful method of gene disruption is complete gene deletion because it reduces or eliminates the occurrence of genetic reversions. The phenotypic effect of a gene disruption can be a null mutation, which can arise from many types of mutations including inactivating point mutations, entire gene deletions, and deletions of chromosomal segments or entire chromosomes. Specific antisense nucleic acid compounds and enzyme inhibitors, such as antibiotics, can also produce null mutant phenotype, therefore being equivalent to gene disruption.

A metabolic modification refers to a biochemical reaction that is altered from its naturally occurring state. Therefore, microorganisms may have genetic modifications to nucleic acids encoding metabolic polypeptides, or functional fragments thereof. Exemplary metabolic modifications are disclosed herein.

The microorganisms provided herein can contain stable genetic alterations, which refers to microorganisms that can be cultured for greater than five generations without loss of the alteration. Generally, stable genetic alterations include modifications that persist greater than 10 generations, particularly stable modifications will persist more than about 25 generations, and more particularly, stable genetic modifications will be greater than 50 generations, including indefinitely.

Those skilled in the art will understand that the genetic alterations, including metabolic modifications exemplified herein, are described with reference to a suitable host organism such as *E. coli* and their corresponding metabolic reactions or a suitable source organism for desired genetic material such as genes for a desired metabolic pathway. However, given the complete genome sequencing of a wide variety of organisms and the high level of skill in the area of genomics, those skilled in the art will readily be able to apply the teachings and guidance provided herein to essentially all other organisms. For example, the *E. coli* metabolic alterations exemplified herein can readily be applied to other species by incorporating the same or analogous encoding nucleic acid from species other than the referenced species. Such genetic alterations include, for example, genetic alterations of species homologs, in general, and in particular, orthologs, paralogs or nonorthologous gene displacements.

A variety of microorganism may be suitable for incorporating nucleic acid encoding the fusion protein, optionally with one or more other transgenes. Such organisms include both prokaryotic and eukaryotic organisms including, but not limited to, bacteria, including archaea and eubacteria, and eukaryotes, including yeast, plant, insect, animal, and mammal, including human. Exemplary species are reported in U.S. Patent Pub No. 2014/0058056 (Burgard et al.), which is incorporated herein by reference, and include, for example, *Escherichia coli, Saccharomyces cerevisiae, Saccharomyces kluyveri, Candida boidinii, Clostridium kluyveri, Clostridium acetobutylicum, Clostridium beijerinckii, Clostridium saccharoperbutylacetonicum, Clostridium perfringens, Clostridium difficile, Clostridium botulinum, Clostridium tyrobutyricum, Clostridium tetanomorphum, Clostridium tetani, Clostridium propionicum, Clostridium aminobutyricum, Clostridium subterminale, Clostridium sticklandii, Ralstonia eutropha, Mycobacterium bovis, Mycobacterium tuberculosis, Porphyromonas gingivalis, Arabidopsis thaliana, Thermus thermophilus, Pseudomonas* species, including *Pseudomonas aeruginosa, Pseudomonas putida, Pseudomonas stutzeri, Pseudomonas fluorescens, Homo sapiens, Oryctolagus cuniculus, Rhodobacter spaeroides, Thermoanaerobacter brockii, Metallosphaera sedula, Leuconostoc mesenteroides, Chloroflexus aurantiacus, Roseiflexus castenholzii, Erythrobacter, Simmondsia chinensis, Acinetobacter* species, including *Acinetobacter calcoaceticus* and *Acinetobacter baylyi, Porphyromonas gingivalis, Sulfolobus tokodaii, Sulfolobus solfataricus, Sulfolobus acidocaldarius, Bacillus subtilis, Bacillus cereus, Bacillus megaterium, Bacillus brevis, Bacillus pumilus, Rattus norvegicus, Klebsiella pneumonia, Klebsiella oxytoca, Euglena gracilis, Treponema denticola, Moorella thermoacetica, Thermotoga maritima, Halobacterium salinarum, Geobacillus stearothermophilus, Aeropyrum pernix, Sus scrofa, Caenorhabditis elegans, Corynebacterium glutamicum, Acidaminococcus fermentans, Lactococcus lactis, Lactobacillus plantarum, Streptococcus thermophilus, Enterobacter aerogenes, Candida, Aspergillus terreus, Pedicoccus pentosaceus, Zymomonas mobilis, Acetobacter pasteurians, Kluyveromyces lactis, Eubacterium barkeri, Bacteroides capillosus, Anaerotruncus colihominis, Natranaerobius thermophilusm, Campylobacter jejuni, Haemophilus influenzae, Serratia marcescens, Citrobacter amalonaticus, Myxococcus xanthus, Fusobacterium nuleatum, Penicillium chrysogenum,* marine *gamma proteobacterium,* butyrate-producing *bacterium, Nocardia iowensis, Nocardiafarcinica, Streptomyces griseus, Schizosaccharomyces pombe, Geobacillus thermoglucosidasius, Salmonella typhimurium, Vibrio cholera, Heliobacter pylori, Nicotiana tabacum, Oryza sativa, Haloferax mediterranei, Agrobacterium tumefaciens, Achromobacter denitrificans, Fusobacterium nucleatum, Streptomyces clavuligenus, Acinetobacter baumanii, Mus musculus, Lachancea kluyveri, Trichomonas vaginalis, Trypanosoma brucei, Pseudomonas stutzeri, Bradyrhizobium japonicum, Mesorhizobium loti, Bos taurus, Nicotiana glutinosa, Vibrio vulnificus, Selenomonas ruminantium, Vibrio parahaemolyticus, Archaeoglobus fulgidus, Haloarcula marismortui, Pyrobaculum aerophilum, Mycobacterium smegmatis MC2 155, Mycobacterium avium* subsp. *paratuberculosis K-10, Mycobacterium marinum M, Tsukamurella paurometabola DSM 20162, Cyanobium PCC7001, Dictyostelium discoideum AX4,* as well as other exemplary species disclosed herein or available as source organisms for corresponding genes.

In certain embodiments, suitable organisms include *Acinetobacter baumannii Naval-82, Acinetobacter sp. ADP1, Acinetobacter sp. strain M-1, Actinobacillus succinogenes 130Z, Allochromatium vinosum DSM 180, Amycolatopsis methanolica, Arabidopsis thaliana, Atopobium parvulum DSM 20469, Azotobacter vinelandii DJ, Bacillus alcalophilus ATCC 27647, Bacillus azotoformans LMG 9581, Bacillus coagulans 36D1, Bacillus megaterium, Bacillus methanolicus MGA3, Bacillus methanolicus PB1, Bacillus methanolicus PB-1, Bacillus selenitireducens MLS10, Bacillus smithii, Bacillus subtilis, Burkholderia cenocepacia, Burkholderia cepacia, Burkholderia multivorans, Burkholderia pyrrocinia, Burkholderia stabilis, Burkholderia thailandensis E264,* Burkholderiales bacterium Joshi 001, Butyrate-producing bacterium L2-50, *Campylobacter jejuni, Candida albicans, Candida boidinii, Candida methylica, Carboxydothermus hydrogenoformans, Carboxydothermus hydrogenoformans Z-2901, Caulobacter sp. AP07, Chloroflexus aggregans DSM 9485, Chloroflexus aurantiacus J-10-fl, Citrobacter freundii, Citrobacter koseri ATCC BAA-895, Citrobacter youngae, Clostridium, Clostridium acetobutylicum, Clostridium acetobutylicum ATCC 824, Clostridium acidurici, Clostridium aminobutyricum, Clostridium asparagiforme DSM 15981, Clostridium beijerinckii, Clostridium beijerinckii NCIMB 8052, Clostridium bolteae ATCC BAA-613, Clostridium carboxidivorans P7, Clostridium cellulovorans 743B, Clostridium difficile, Clostridium hiranonis DSM 13275, Clostridium hylemonae DSM 15053, Clostridium kluyveri, Clostridium kluyveri DSM555, Clostridium ljungdahli, Clostridium ljungdahlii DSM13528, Clostridium methylpentosum DSM5476, Clostridium pasteurianum, Clostridium pasteurianum DSM 525, Clostridium perfringens, Clostridium perfringens ATCC 13124, Clostridium perfringens str. 13, Clostridium phytofermentans ISDg, Clostridium saccharobutylicum, Clostridium saccharoperbutylacetonicum, Clostridium saccharoperbutylacetonicum N1-4, Clostridium tetani, Corynebacterium glutamicum ATCC 14067, Corynebacterium glutamicum R, Corynebacterium sp. U-96, Corynebacterium variabile, Cupriavidus necator N-1, Cyanobium PCC7001, Desulfatibacillum alkenivorans AK-01, Desulfitobacterium hafniense, Desulfitobacterium metallireducens DSM 15288, Desulfotomaculum reducens MI-1, Desulfovibrio africanus* str. Walvis Bay, *Desulfovibrio fructosovorans JJ, Desulfovibrio vulgaris* str. Hildenborough, *Desulfovibrio vulgaris* str. Miyazaki F, *Dictyostelium discoideum AX4, Escherichia coli, Escherichia coli K-12, Escherichia coli K-12 MG1655, Eubacterium hallii DSM 3353, Flavobacterium frigoris, Fusobacterium nucleatum* subsp. *polymorphum ATCC 10953, Geobacillus sp. Y4.1MC1, Geobacillus themodenitrificans NG80-2, Geobacter bemidjiensis Bem, Geobacter sulfurreducens, Geobacter sulfurreducens PCA, Geobacillus stearothermophilus DSM 2334, Haemophilus influenzae, Helicobacter pylori, Homo sapiens, Hydrogenobacter thermophilus, Hydrogenobacter thermophilus TK-6, Hyphomicrobium denitrificans ATCC 51888, Hyphomicrobium zavarzinii, Klebsiella pneumoniae, Klebsiella pneumoniae* subsp. *pneumoniae MGH 78578, Lactobacillus brevis ATCC 367, Leuconostoc mesenteroides, Lysinibacillus fusiformis, Lysinibacillus sphaericus, Mesorhizobium loti MAFF303099, Metallosphaera sedula, Methanosarcina acetivorans, Methanosarcina acetivorans C2A, Methanosarcina barkeri, Methanosarcina mazei Tuc01, Methylobacter marinus, Methylobacterium extorquens, Methylobacterium extorquens AM1, Methylococcus capsulatas, Methylomonas aminofaciens, Moorella thermoacetica, Mycobacter sp.* strain JC1 DSM 3803, *Mycobacterium avium* subsp. *paratuberculosis K-10, Mycobacterium bovis BCG, Mycobacterium gastri, Mycobacterium marinum M, Mycobacterium smegmatis, Mycobacterium smegmatis MC2 155, Mycobacterium tuberculosis, Nitrosopumilus salaria BD31, Nitrososphaera gargensis Ga9.2, Nocardia farcinica IFM 10152, Nocardia iowensis (sp. NRRL 5646), Nostoc sp.*

PCC 7120, *Ogataea angusta, Ogataea parapolymorpha* DL-1 (*Hansenula polymorpha* DL-1), *Paenibacillus peoriae* KCTC 3763, *Paracoccus denitrificans, Penicillium chrysogenum, Photobacterium profundum* 3TCK, *Phytofermentans* ISDg, *Pichia pastoris, Picrophilus torridus* DSM9790, *Porphyromonas gingivalis, Porphyromonas gingivalis* W83, *Pseudomonas aeruginosa* PA01, *Pseudomonas denitrificans, Pseudomonas knackmussii, Pseudomonas putida, Pseudomonas* sp, *Pseudomonas syringae* pv. *syringae* B728a, *Pyrobaculum islandicum* DSM 4184, *Pyrococcus abyssi, Pyrococcus furiosus, Pyrococcus horikoshii* OT3, *Ralstonia eutropha, Ralstonia eutropha* H16, *Rhodobacter capsulatus, Rhodobacter sphaeroides, Rhodobacter sphaeroides* ATCC 17025, *Rhodopseudomonas palustris, Rhodopseudomonas palustris* CGA009, *Rhodopseudomonas palustris* DX-1, *Rhodospirillum rubrum, Rhodospirillum rubrum* ATCC 11170, *Ruminococcus obeum* ATCC 29174, *Saccharomyces cerevisiae, Saccharomyces cerevisiae* S288c, *Salmonella enterica, Salmonella enterica* subsp. *enterica* serovar *Typhimurium* str. LT2, *Salmonella enterica typhimurium, Salmonella typhimurium, Schizosaccharomyces pombe, Sebaldella termitidis* ATCC 33386, *Shewanella oneidensis* MR-4, *Sinorhizobium meliloti* 1021, *Streptomyces coelicolor, Streptomyces griseus* subsp. *griseus* NBRC 13350, *Sulfolobus acidocalarius, Sulfolobus solfataricus* P-2, *Synechocystis* str. PCC 6803, *Syntrophobacter fumaroxidans, Thauera aromatica, Thermoanaerobacter* sp. X514, *Thermococcus kodakaraensis, Thermococcus litoralis, Thermoplasma acidophilum, Thermoproteus neutrophilus, Thermotoga maritima, Thiocapsa roseopersicina, Tolumonas auensis* DSM 9187, *Trichomonas vaginalis* G3, *Trypanosoma brucei, Tsukamurella paurometabola* DSM 20162, *Vibrio cholera, Vibrio harveyi* ATCC BAA-1116, *Xanthobacter autotrophicus* Py2, *Yersinia intermedia*, and *Zea mays*.

Therefore, the engineered cell including the fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, can include one or more further genetic alterations, such as inserted transgenes, deletions, attenuation, mutations, etc., desired to increase levels of one or more intermediates or a product thereof, and include those genetic modifications as described in U.S. Patent Pub No. 2014/0058056 (Burgard et al.), which is incorporated herein by reference.

Target products obtained from, and product pathways suitable for producing in, host cells expressing the fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, described herein include the following.

Of particular interest are a target product obtained using pyruvate and acetyl-CoA as entry point or precursor to its product pathway(s), in part because the methanol metabolic pathway using the novel enzymes enables fixing the carbon of methanol into pathways to pyruvate and acetyl-CoA. Target products include (a) 1,4-butanediol and intermediates thereto, such as 4-hydroxybutanoic acid (4-hydroxybutanoate, 4-hydroxybutyrate, 4-HB), (b) butadiene and intermediates thereto, such as 1,4-butanediol, 1,3-butanediol, crotyl alcohol, 3-buten-2-ol (methyl vinyl carbinol) and 3-buten-1-ol, (c) 1,3-butanediol and intermediates thereto, such as 2,4-pentadienoate, crotyl alcohol or 3-buten-1-ol, (d) adipate, 6-aminocaproic acid, caprolactam, hexamethylenediamine and levulinic acid and their intermediates, e.g. 4-aminobutyryl-CoA, (e) methacrylic acid (2-methyl-2-propenoic acid) and its esters known collectively as methacrylates, such as methyl methacrylate, methyl methacrylate, 3-hydroxyisobutyrate and/or 2-hydroxyisobutyrate and their intermediates, (f) 1,2-propanediol (propylene glycol), n-propanol, 1,3-propanediol and glycerol, and their intermediates and (g) succinic acid and intermediates thereto.

In some aspects, a gene encoding a fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, is introduced into a cell engineered with increased of levels of 1,4-butanediol (BDO) or hydroxylbutyrate (4-HB) biosynthetic capability, those skilled in the art will understand with applying the teaching and guidance provided herein to a particular species that the identification of metabolic modifications can include identification and inclusion or inactivation of orthologs. To the extent that paralogs and/or nonorthologous gene displacements are present in the referenced microorganism that encode an enzyme catalyzing a similar or substantially similar metabolic reaction, those skilled in the art also can utilize these evolutionally related genes.

With the complete genome sequence available for now more than 550 species (with more than half of these available on public databases such as the NCBI), including 395 microorganism genomes and a variety of yeast, fungi, plant, and mammalian genomes, the identification of genes encoding the requisite BDO or 4-HB biosynthetic pathway as well as other known biosynthetic pathways for 1,3-butanediol (13BDO), butadiene, 6-amino caproic acid (6ACA), hexamethyldiamine (HMDA), adipic acid or derivatives thereof, croytl alcohol, methyl vinyl carbinol, 3-buten-1-ol, succinic acid or derivatives thereof, n-propanol, isopropanol, propylene, methacrylic acid or derivatives thereof, methanol metabolic and/or formaldehyde assimilation activity for one or more genes in related or distant species, including for example, homologues, orthologs, paralogs and nonorthologous gene displacements of known genes, and the interchange of genetic alterations between organisms is routine and well known in the art. Accordingly, the metabolic alterations allowing biosynthesis of various target products including 1,3-butanediol (13BDO), 1, 4-butanediol (BDO), 4-HB, butadiene, 6-amino caproic acid (6ACA), hexamethyldiamine (HMDA), adipic acid or derivatives thereof, croytl alcohol, methyl vinyl carbinol, 3-buten-1-ol, succinic acid or derivatives thereof, n-propanol, isopropanol, propylene, methacrylic acid or derivatives thereof, metabolism of methanol and/or assimilation of formaldehyde described herein with reference to a particular organism such as *E. coli* can be readily applied to other microorganisms, including prokaryotic and eukaryotic organisms alike. Given the teachings and guidance provided herein, those skilled in the art will know that a metabolic alteration exemplified in one organism can be applied equally to other organisms.

Exemplary alcohol metabolic pathway gene(s), such as described in U.S. Patent Pub No. 2014/0058056, encode a protein selected from the group consisting of: a formate dehydrogenase, a formaldehyde activating enzyme, a formaldehyde dehydrogenase, a S-(hydroxymethyl)glutathione synthase, a glutathione-dependent formaldehyde dehydrogenase, a S-formylglutathione hydrolase, a formate hydrogen lyase, and a hydrogenase, any or more can be coexpressed with the fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, in the engineered cell.

Other exemplary alcohol metabolic pathway gene(s), such as described in U.S. Patent Pub No. 2014/0058056, encode an alcohol metabolic pathway gene(s) encoding a protein selected from the group consisting of a succinyl-CoA reductase (aldehyde forming), a 4-hydroxybutyrate (4-HB) dehydrogenase, a 4-HB kinase, a phosphotrans-4-hydroxybutyrylase, a 4-hydroxybutyryl-CoA reductase (aldehyde forming), a 1,4-butanediol dehydrogenase; a succinate reductase, a succinyl-CoA reductase (alcohol forming), 4-hydroxybutyryl-CoA transferase, a 4-hydroxybutyryl-CoA synthetase, a 4-HB reductase, and a 4-hydroxybutyryl-CoA reductase (alcohol forming), a succinyl-CoA transferase, and a succinyl-CoA synthetase, any or more can be co-expressed with the fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, in the engineered cell.

1,4-butanediol and intermediates thereto, such as 4-hydroxybutanoic acid (4-hydroxybutanoate, 4-hydroxybutyrate, 4-HB), are target products that can be made by co-expressing the fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, described herein with a product pathway described herein as well as in the following documents. Suitable product pathways and enzymes, methods for screening and methods for isolating are found herein as well as in the following documents, incorporated herein by reference: WO2008115840A2 published 25 Sep. 2008 entitled "Compositions and Methods for the Biosynthesis of 1, 4-Butanediol and Its Precursors"; WO2010141780A1 published 9 Dec. 2010 entitled "Process of Separating Components of A Fermentation Broth"; WO2010141920A2 published 9 Dec. 2010 entitled "Microorganisms for the Production of 1, 4-Butanediol and Related Methods"; WO2010030711A2 published 18 Mar. 2010 entitled "Microorganisms for the Production of 1, 4-Butanediol"; WO2010071697A1 published 24 Jun. 2010 entitled "Microorganisms and Methods for Conversion of Syngas and Other Carbon Sources to Useful Products"; WO2009094485A1 published 30 Jul. 2009 entitled "Methods and Organisms for Utilizing Synthesis Gas or Other Gaseous Carbon Sources and Methanol"; WO2009023493A1 published 19 Feb. 2009 entitled "Methods and Organisms for the Growth-Coupled Production of 1,4-Butanediol"; WO2008115840A2 published 25 Sep. 2008 entitled "Compositions and Methods for the Biosynthesis of 1,4-Butanediol and Its Precursors"; and International Application No. PCT/US13/56725 filed 27 Aug. 2013 entitled "Microorganisms an Methods for Enhancing the Availability of Reducing Equivalents in the Presence of Methanol, and for Producing 1,4-Butanediol Related Thereto".

Butadiene and intermediates thereto, such as 1,4-butanediol, 1,3-butanediol, crotyl alcohol, 3-buten-2-ol (methyl vinyl carbinol) and 3-buten-1-ol, are target products that can be made by co-expressing the fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, described herein with a product pathway described in the following documents. In addition to direct fermentation to produce butadiene, 1,3-butanediol, 1,4-butanediol, crotyl alcohol, 3-buten-2-ol (methyl vinyl carbinol) and 3-buten-1-ol can be separated, purified (for any use), and then dehydrated to butadiene in a second step involving metal-based catalysis. Suitable product pathways and enzymes, methods for screening and methods for isolating are found in the following documents, incorporated herein by reference: WO2011140171A2 published 10 Nov. 2011 entitled "Microorganisms and Methods for the Biosynthesis of Butadiene"; WO2012018624A2 published 9 Feb. 2012 entitled "Microorganisms and Methods for the Biosynthesis of Aromatics, 2,4-Pentadienoate and 1,3-Butadiene"; WO2011140171A2 published 10 Nov. 2011 entitled "Microorganisms and Methods for the Biosynthesis of Butadiene"; WO2013040383A1 published 21 Mar. 2013 entitled "Microorganisms and Methods for Producing Alkenes"; WO2012177710A1 published 27 Dec. 2012 entitled "Microorganisms for Producing Butadiene and Methods Related thereto"; WO2012106516A1 published 9 Aug. 2012 entitled "Microorganisms and Methods for the Biosynthesis of Butadiene"; WO2013028519A1 published 28 Feb. 2013 entitled "Microorganisms and Methods for Producing 2,4-Pentadienoate, Butadiene, Propylene, 1,3-Butanediol and Related Alcohols"; and U.S. Patent Pub No. 2015/0050708.

1,3-butanediol and intermediates thereto, such as 2,4-pentadienoate, crotyl alcohol or 3-buten-1-ol, are target products that can be made by co-expressing the fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, described herein with a product pathway described herein as well as in the following documents. Suitable product pathways and enzymes, methods for screening and methods for isolating are found herein as well as in the following documents, incorporated herein by reference: WO2011071682A1 published 16 Jun. 2011 entitled "Methods and Organisms for Converting Synthesis Gas or Other Gaseous Carbon Sources and Methanol to 1, 3-Butanediol"; WO2011031897A published 17 Mar. 2011 entitled "Microorganisms and Methods for the Co-Production of Isopropanol with Primary Alcohols, Diols and Acids"; WO2010127319A2 published 4 Nov. 2010 entitled "Organisms for the Production of 1,3-Butanediol"; WO2013071226A1 published 16 May 2013 entitled "Eukaryotic Organisms and Methods for Increasing the Availability of Cytosolic Acetyl-CoA, and for Producing 1,3-Butanediol"; WO2013028519A1 published 28 Feb. 2013 entitled "Microorganisms and Methods for Producing 2,4-Pentadienoate, Butadiene, Propylene, 1,3-Butanediol and Related Alcohols"; WO2013036764A1 published 14 Mar. 2013 entitled "Eukaryotic Organisms and Methods for Producing 1,3-Butanediol"; WO2013012975A1 published 24 Jan. 2013 entitled "Methods for Increasing Product Yields"; WO2012177619A2 published 27 Dec. 2012 entitled "Microorganisms for Producing 1, 3-Butanediol and Methods Related Thereto"; and U.S. Patent Pub No. 2015/0050708.

Adipate, 6-aminocaproic acid, caprolactam, hexamethylenediamine and levulinic acid, and their intermediates, e.g. 4-aminobutyryl-CoA, are target products, useful for example for making nylon polymers, that can be made by co-expressing the fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, described herein with a product pathway described herein as well as in the following documents. Suitable product pathways and enzymes, methods for screening and methods for isolating are found herein as well as in the following documents, incorporated herein by reference: WO2010129936A1 published 11 Nov. 2010 entitled "Microorganisms and Methods for the Biosynthesis of Adipate, Hexamethylenediamine and 6-Aminocaproic Acid"; WO2013012975A1 published 24 Jan. 2013 entitled "Methods for Increasing Product Yields"; WO2012177721A1 published 27 Dec. 2012 entitled "Microorganisms for Producing 6-Aminocaproic Acid"; WO2012099621A1 published 26 Jul. 2012 entitled "Methods for Increasing Product Yields"; and U.S. Patent Pub No. 2014/0329916 entitled "Microorganisms an Methods for Enhancing the Availability of Reducing Equivalents in the Presence of Methanol, and for Producing Adipate, 6-Aminocaproate, Hexamethylenediamine or Caprolactam Related Thereto".

Methacrylic acid (2-methyl-2-propenoic acid; used in the preparation of its esters known collectively as methacrylates, such as methyl methacrylate, which is used most notably in the manufacture of polymers), methacrylate ester such as methyl methacrylate, 3-hydroxyisobutyrate and/or 2-hydroxyisobutyrate and their intermediates are target products, useful for example for making polymers, that can be made by co-expressing the fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, described herein with a product pathway described herein as well as in the following documents. Suitable product pathways and enzymes, methods for screening and methods for isolating are found herein as well as in the following documents, incorporated herein by reference: WO2012135789A2 published 4 Oct. 2012 entitled "Microorganisms for Producing Methacrylic Acid and Methacrylate Esters and Methods Related Thereto"; WO2009135074A2 published 5 Nov. 2009 entitled "Microorganisms for the Production of Methacrylic Acid"; and U.S. Patent Pub No. 2014/0288254 entitled "Microorganisms an Methods for Enhancing the Availability of Reducing Equivalents in the Presence of Methanol, and for Producing 3-Hydroxyisobutyate or Methacrylic Acid Related Thereto".

1,2-propanediol (propylene glycol), n-propanol, 1,3-propanediol and glycerol, and their intermediates are target products, useful for example for making polymers, that can be made by co-expressing the fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, described herein with a product pathway described herein as well as in the following documents. Suitable product pathways and enzymes, methods for screening and methods for isolating are found herein as well as in the following documents, incorporated herein by reference: WO2009111672A1 published 9 Nov. 2009 entitled "Primary Alcohol Producing Organisms"; WO2011031897A1 17 Mar. 2011 entitled "Microorganisms and Methods for the Co-Production of Isopropanol with Primary Alcohols, Diols and Acids"; WO2012177599A2 published 27 Dec. 2012 entitled 'Microorganisms for Producing N-Propanol 1, 3-Propanediol, 1, 2-Propanediol or Glycerol and Methods Related Thereto"; and U.S. Patent Pub No. 2014/0302575 entitled "Microorganisms an Methods for Enhancing the Availability of Reducing Equivalents in the Presence of Methanol, and for Producing 1,2-Propanediol, n-Propanol, 1,3-Propanediol, or Glycerol Related Thereto".

Succinic acid and intermediates thereto (useful to produce products including polymers, e.g. PBS, 1,4-butanediol, tetrahydrofuran, pyrrolidone, solvents, paints, deicers, plastics, fuel additives, fabrics, carpets, pigments, and detergents) are target products that can be made by co-expressing the fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, described herein with a product pathway described herein as well as in the following documents. Suitable product pathways and enzymes, methods for screening and methods for isolating are found herein as well as in the following documents, incorporated herein by reference: EP1937821A2 published 2 Jul. 2008 entitled "Methods and Organisms for the Growth-Coupled Production of Succinate"; and U.S. Patent Pub No. 2014/0302575 entitled "Microorganisms and Methods for Enhancing the Availability of Reducing Equivalents in the Presence of Methanol, and for Producing Succinate Related Thereto".

Target products obtained from, and product pathways suitable for producing in, host cells co-expressing the fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, described herein include the following. Butadiene and intermediates thereto, such as 1,4-butanediol, 1,3-butanediol, crotyl alcohol, 3-buten-2-ol (methyl vinyl carbinol) and 3-buten-1-ol, are target products that can be made by co-expressing the fusion protein having at least (i) methanol dehydrogenase activity and (ii) 3-hexulose-6-phosphate dehydrogenase activity and/or 6-phospho-3-hexuloisomerase activity described herein with a product pathway described in the following documents. In addition to direct fermentation to produce butadiene, 1,3-butanediol, 1,4-butanediol, crotyl alcohol, 3-buten-2-ol (methyl vinyl carbinol) and 3-buten-1-ol can be separated, purified (for any use), and then dehydrated to butadiene in a second step involving metal-based catalysis. Suitable product pathways and enzymes, methods for screening and methods for isolating are found in: WO2011140171A2 published 10 Nov. 2011 entitled "Microorganisms and Methods for the Biosynthesis of Butadiene"; WO2012018624A2 published 9 Feb. 2012 entitled "Microorganisms and Methods for the Biosynthesis of Aromatics, 2, 4-Pentadienoate and 1, 3-Butadiene"; WO2011140171A2 published 10 Nov. 2011 entitled "Microorganisms and Methods for the Biosynthesis of Butadiene"; WO2013040383A1 published 21 Mar. 2013 entitled "Microorganisms and Methods for Producing Alkenes"; WO2012177710A1 published 27 Dec. 2012 entitled "Microorganisms for Producing Butadiene and Methods Related thereto"; WO2012106516A1 published 9 Aug. 2012 entitled "Microorganisms and Methods for the Biosynthesis of Butadiene"; WO2013028519A1 published 28 Feb. 2013 entitled "Microorganisms and Methods for Producing 2,4-Pentadienoate, Butadiene, Propylene, 1,3-Butanediol and Related Alcohols"; and U.S. Patent Pub No. 2015/0050708.

Figure 6:
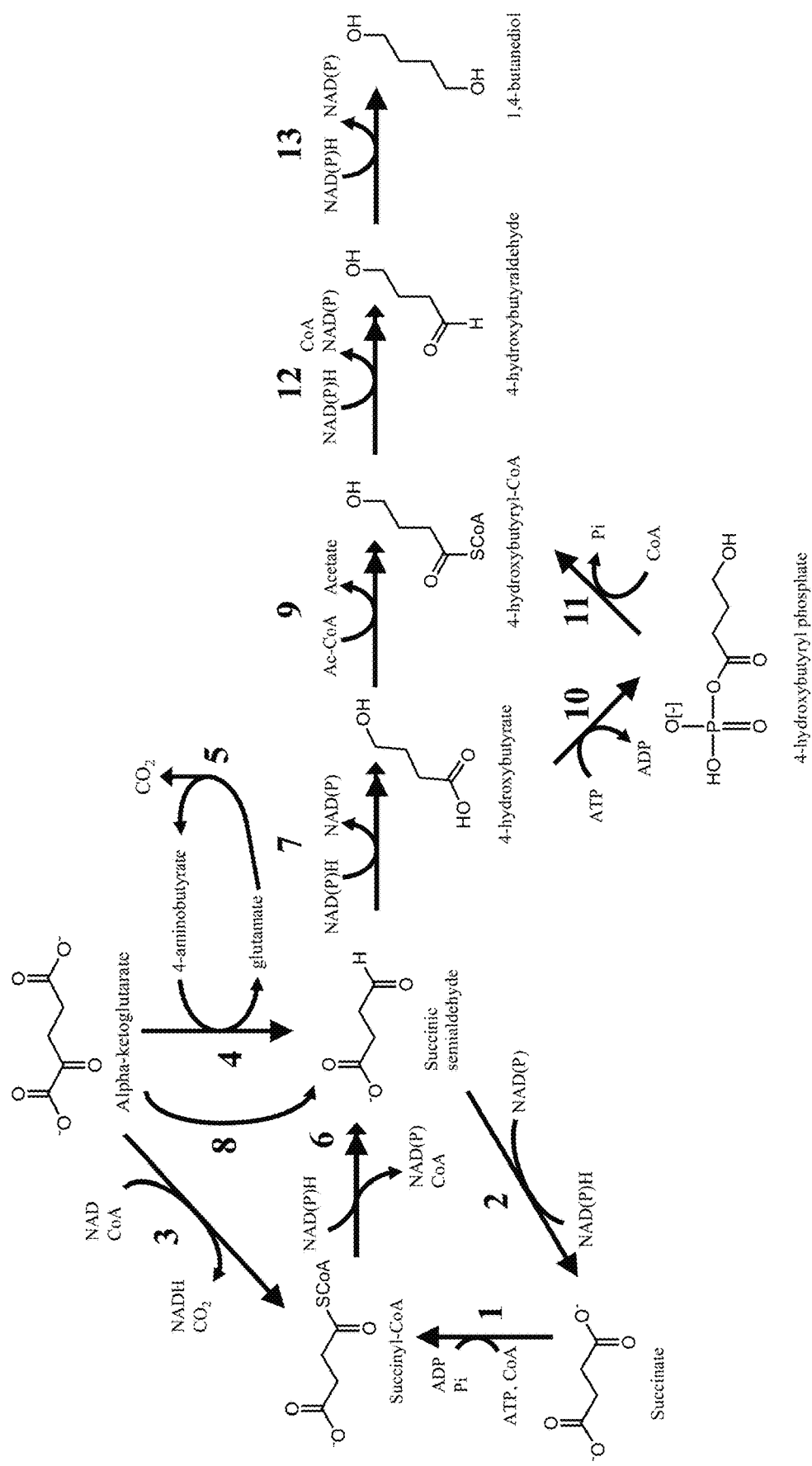
FIG. 6 illustrates an exemplary target product pathway, a 1,4-BDO product pathway, which can exploit acetyl-CoA available from methanol assimilation as disclosed herein. Enzymes catalyzing the biosynthetic reactions are: (1) succinyl-CoA synthetase; (2) CoA-independent succinic semialdehyde dehydrogenase; (3) α-ketoglutarate dehydrogenase; (4) glutamate:succinate semialdehyde transaminase; (5) glutamate decarboxylase; (6) CoA-dependent succinic semialdehyde dehydrogenase; (7) 4-hydroxybutanoate dehydrogenase; (8) α-ketoglutarate decarboxylase; (9) 4-hydroxybutyryl CoA: acetyl-CoA transferase; (10) butyrate kinase; (11) phosphotransbutyrylase; (12) aldehyde dehydrogenase; (13) alcohol dehydrogenase.

Enzymes, genes and methods for engineering pathways from acetyl-CoA, succinate and succinyl-CoA to various products, such as BDO, into a microorganism, are now known in the art (see, e.g., U.S. Publ. No. 2011/0201089). A set of BDO pathway enzymes represents a group of enzymes that can convert succinate or alpha-ketoglutarate to BDO as shown in FIG. 6. For example, BDO can be produced from succinyl-CoA via previously disclosed pathways (see for example, Burk et al., WO 2008/115840). FIG. 6 presents exemplary pathways which can use the primary metabolites, e.g. acetyl-CoA, made available by the use of methanol as a carbon source as described herein. In FIG. 6, the organism comprises at least one exogenous nucleic acid encoding a BDO pathway enzyme expressed in a sufficient amount to produce BDO. In certain embodiments, the BDO pathway enzyme is selected from the group consisting of (1) a succinyl-CoA synthetase; (2) a CoA-independent succinic semialdehyde dehydrogenase; (3) a α-ketoglutarate dehydrogenase; (4) a glutamate:succinate semialdehyde transaminase; (5) a glutamate decarboxylase; (6) a CoA-dependent succinic semialdehyde dehydrogenase; (7) a 4-hydroxybutanoate dehydrogenase; (8) a α-ketoglutarate decarboxylase; (9) a 4-hydroxybutyryl CoA:acetyl-CoA transferase; (10) a butyrate kinase; (11) a phosphotransbutyrylase; (12) an aldehyde dehydrogenase; and (13) an alcohol dehydrogenase. Preferred pathways include those from alpha-ketoglutarate, e.g. steps 8, 7, 9, 12 and 13; steps 3, 6, 7, 9, 12 and 13; and steps 1, 6, 7, 9, 12, 13. In an alternative, a single protein can comprise the activities of steps 12 and 13. Specific enzymes, classes of enzymes and sources of enzymes and their genes can be found in WO2008115840, for example.

In some embodiments, the disclosure provides organisms comprising a fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, and that are engineered to improve the availability of reducing equivalents, which can be used for the production of target product molecules. It will be recognized by one skilled in the art that any product molecule that utilizes reducing equivalents in its production can exhibit enhanced production through other biosynthetic pathways.

In numerous engineered pathways, realization of maximum product yields based on carbohydrate feedstock is hampered by insufficient reducing equivalents or by loss of reducing equivalents to byproducts. Methanol is a relatively inexpensive organic feedstock that can be used to generate reducing equivalents by using the fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, and one or more metabolic enzymes. The reducing equivalents produced by the metabolism of methanol can then be used to power the glucose to BDO production pathways, for example, as shown in FIG. 6.

FIG. 6 presents exemplary pathways which can use the primary metabolites, e.g. acetyl-CoA, made available by the use of methanol as a carbon source as described herein. In FIG. 6, the organism comprises at least one exogenous nucleic acid encoding a BDO pathway enzyme expressed in a sufficient amount to produce BDO. In certain embodiments, the BDO pathway enzyme is selected from the group consisting of (1) a succinyl-CoA synthetase; (2) a CoA-independent succinic semialdehyde dehydrogenase; (3) a α-ketoglutarate dehydrogenase; (4) a glutamate:succinate semialdehyde transaminase; (5) a glutamate decarboxylase; (6) a CoA-dependent succinic semialdehyde dehydrogenase; (7) a 4-hydroxybutanoate dehydrogenase; (8) a α-ketoglutarate decarboxylase; (9) a 4-hydroxybutyryl CoA:acetyl-CoA transferase; (10) a butyrate kinase; (11) a phosphotransbutyrylase; (12) an aldehyde dehydrogenase; and (13) an alcohol dehydrogenase. Preferred pathways include those from alpha-ketoglutarate, e.g. steps 8, 7, 9, 12 and 13; steps 3, 6, 7, 9, 12 and 13; and steps 1, 6, 7, 9, 12, 13. In an alternative, a single protein can comprise the activities of steps 12 and 13. Specific enzymes, classes of enzymes and sources of enzymes and their genes can be found in WO2008115840A2, for example.

Enzymes, genes and methods for engineering pathways from succinate and succinyl-CoA to various products, such as BDO, into a microorganism, are now known in the art (see, e.g., U.S. Publ. No. 2011/0201089). A set of BDO pathway enzyme s represents a group of enzymes that can convert succinate or alpha-ketoglutarate to BDO as shown in FIG. 6. The additional reducing equivalents obtained from the MeDH pathway, as disclosed herein, improve the yields of all these products when utilizing carbohydrate-based feedstock. For example, BDO can be produced from succinyl-CoA via previously disclosed pathways (see for example, Burk et al., WO 2008/115840).

The maximum theoretical yield of BDO via the pathway shown in FIG. 6 supplemented with the reactions of the oxidative TCA cycle (e.g., citrate synthase, aconitase, isocitrate dehydrogenase, alpha-ketoglutarate dehydrogenase) is 1.09 mol/mol.

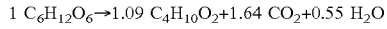

1 $C_6H_{12}O_6 \rightarrow 1.09\ C_4H_{10}O_2 + 1.64\ CO_2 + 0.55\ H_2O$

When both feedstocks of sugar and methanol are available, the methanol can be utilized to generate reducing equivalents by employing one or more of enzymes. The reducing equivalents generated from methanol can be utilized to power the glucose to BDO production pathways, e.g., as shown in FIG. 6. Theoretically, all carbons in glucose will be conserved, thus resulting in a maximal theoretical yield to produce BDO from glucose at 2 mol BDO per mol of glucose under either aerobic or anaerobic conditions:

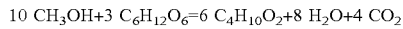

10 $CH_3OH + 3\ C_6H_{12}O_6 = 6\ C_4H_{10}O_2 + 8\ H_2O + 4\ CO_2$

In a similar manner, the maximum theoretical yields of succinate and 4-HB can reach 2 mol/mol glucose:

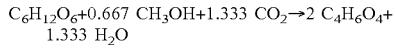

$C_6H_{12}O_6 + 0.667\ CH_3OH + 1.333\ CO_2 \rightarrow 2\ C_4H_6O_4 + 1.333\ H_2O$

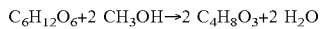

$C_6H_{12}O_6 + 2\ CH_3OH \rightarrow 2\ C_4H_8O_3 + 2\ H_2O$

In other embodiments, the organism having a fusion protein having at least (i) methanol dehydrogenase activity and (ii) 3-hexulose-6-phosphate dehydrogenase activity and/or 6-phospho-3-hexuloisomerase activity, or alternatively including the fusion protein having at least (i) methanol dehydrogenase activity and (ii) DHAS activity and/or F6PAld activity, either alone or in combination with a BDO pathway, as provided herein, may further comprise a second formaldehyde assimilation pathway (FAP). The second FAP can also utilizes formaldehyde, for example, formaldehyde that not utilized by the fusion protein, in the formation of intermediates of certain central metabolic pathways that can be used, for example, in the formation of biomass.

With reference to FIG. 5, in the second formaldehyde assimilation pathway, the organism comprises at least one exogenous nucleic acid encoding a formaldehyde assimilation pathway enzyme that is different than the MeDH, PSI, HPS, and ACT proteins. Enzymes of the second formaldehyde assimilation pathway can be expressed in a sufficient amount to produce an intermediate of glycolysis and/or a metabolic pathway that can be used in the formation of biomass. In one embodiment, the second formaldehyde assimilation pathway enzyme is expressed in a sufficient amount to produce an intermediate of glycolysis. In another embodiment, the second formaldehyde assimilation pathway enzyme is expressed in a sufficient amount to produce an intermediate of a metabolic pathway that can be used in the formation of biomass. In some of the embodiments, the second formaldehyde assimilation pathway comprises a dihydroxyacetone (DHA) synthase or a DHA kinase. The preferred DHA pathway is DHA Route 1 in FIG. 5, which is a combination of DHA (dihydroxyacetone) synthase, e.g. EC 2.2.1.3 (Step 6) and F6P (fructose-6-phosphate) aldolase (Step 7). In one embodiment, the intermediate is a DHA, a DHA phosphate, or a combination thereof. In certain embodiments, the organism comprises two exogenous nucleic acids, each encoding a second formaldehyde assimilation pathway enzyme.

In addition to the fusion protein having at least (i) methanol dehydrogenase activity and (ii) 3-hexulose-6-phosphate dehydrogenase activity and/or 6-phospho-3-hexuloisomerase activity, the cell can also possess a pathway that proceeds through dihydroxyacetone (DHA). Both the fusion protein of the RuMP pathway and the DHA pathway can be for the detoxification and assimilation of formaldehyde. As shown in FIG. 5, a transketolase first transfers a glycoaldehyde group from xylulose-5-phosphate to formaldehyde (Step 6, FIG. 5), resulting in the formation of DHA and G3P, which is an intermediate in glycolysis. The DHA obtained from DHA synthase is then further phosphorylated to form DHA phosphate (DHAP) by a DHA kinase. DHAP can be assimilated into glycolysis and several other pathways. Alternatively, DHA and G3P can be converted by fructose-6-phosphate aldolase to form fructose-6-phosphate (F6P) (FIG. 5, step 7).

In some embodiments, in addition to the fusion protein having at least (i) methanol dehydrogenase activity and (ii) DHAS and/or F6PAld activity, the cell can also possess a pathway that proceeds through hexose-6-phosphate (H6P) as depicted in FIG. 5. The pathway that proceeds through hexose-6-phosphate (H6P) can optionally use a MeDH fusion protein. For example, an engineered cell of the disclosure can include a MeDH fusion protein of the DHA pathway and a MeDH fusion protein of the RuMP pathway, which can be for the detoxification and assimilation of formaldehyde.

The DHA synthase in the engineered cell, which in some embodiments can be present as a fusion protein with MeDH, can be an exogenous DHA synthase, such as a DHA synthase from *Mycobacter* sp. strain JC1 DSM 3803 (SEQ ID NO:81; AAG12171.2); *Ogataea parapolymorpha* DL-1 (*Hansenula polymorpha* DL-1) (SEQ ID NO: 82; EFW95760.1); or *Candida boidinii* (SEQ ID NO:83; AAC83349.1). DHA synthases are of the enzyme class (EC) 2.2.1.3. Table 5 is a table of pairwise sequence identity of various DHA synthase sequences.

TABLE 5

| | Pairwise alignment (% ID) | | |
|---|---|---|---|
| DHA Synthase | *Mycobacter* sp. strain JC1 DSA 3803 | *Ogataea parapolymorpha* DL-1 (*Hansenula polymorpha* DL-1) | *Candida boidinii* |
| *Mycobacter* sp. strain JC1 DSM 3803 | 100 | 29.8 | 30.9 |
| *Ogataea parapolymorpha* DL-1 (*Hansenulo polymorpha* DL-1) | 29.8 | 100 | 70.7 |
| *Candida boidinii* | 30.9 | 70.7 | 100 |

The DHA kinase in the engineered cell, which in some embodiments can be present as a fusion protein with MeDH, can be an exogenous DHA kinase, such as a DHA kinase from *Pichia angusta* (AAC27705.1); *Saccharomyces cerevisiae* S288c (P54838.1); *Saccharomyces cerevisiae* S288c (P43550.1); *Citrobacter freundii* ATCC 8090 (ZP_16280678.1); *Klebsiella pneumoniae* subsp. *pneumoniae* WGLW3 (ZP_18488498.1); *Escherichia coli* K-12 MG1655 (NP 415718.6); *Escherichia coli* K-12 MG1655 (NP_415717.1); or *Escherichia coli* K-12 MG1655 (NP 415716.4). DHA kinases are of the enzyme class (EC) 2.7.1.121. Table 6 is a table of pairwise sequence identity of various DHA kinase sequences.

TABLE 6

| | Pairwise alignment (% ID) | | | | | | | |
|---|---|---|---|---|---|---|---|---|
| DNA kinase | *Escherichia coli* K-12 MG1655 | *Escherichia coli* K-12 MG1655 | *Citrobacter freundii* ATCC 8090 | *Klebsiella pneumoniae* subsp. *pneumoniae* WGLW3 | *Escherichia coli* K-12 MG1655 | *Saccharomyces cerevisiae* S288c | *Pichia angusta* | *Saccharomyces cerevisiae* S288c |
| *Escherichia coli* K-12 MG1655 | 100 | 5.5 | 9.9 | 10.6 | 11.1 | 11 | 10.1 | 9.5 |
| *Escherichia coli* K-12 MG1655 | 5.5 | 100 | 11.4 | 11.2 | 5.2 | 9.4 | 9.2 | 10.3 |
| *Citrobacter freundii* ATCC 8090 | 9.9 | 11.4 | 100 | 86.2 | 26.9 | 31.7 | 31.3 | 29 |
| *Klebsiella pneumoniae* subsp. *pneumoniae* WGLW3 | 10.6 | 11.2 | 86.2 | 100 | 27.2 | 30.8 | 30.1 | 29.1 |

TABLE 6-continued

| | Pairwise alignment (% ID) | | | | | | | |
|---|---|---|---|---|---|---|---|---|
| DNA kinase | Escherichia coli K-12 MG1655 | Escherichia coli K-12 MG1655 | Citrobacter freundii ATCC 8090 | Klebsiella pneumoniae subsp. pneumoniae WGLW3 | Escherichia coli K-12 MG1655 | Saccharomyces cerevisiae S288c | Pichia angusta | Saccharomyces cerevisiae S288c |
| Escherichia coli K-12 MG1655 | 11.1 | 5.2 | 26.3 | 27.2 | 100 | 32.7 | 33.1 | 31.6 |
| Saccharomyces cerevisiae S288c | 11 | 9.4 | 31.7 | 30.8 | 32.7 | 100 | 42.6 | 43.1 |
| Pichia angusta | 10.1 | 9.2 | 31.3 | 30.1 | 33.1 | 42.6 | 100 | 50.2 |
| Saccharomyces cerevisiae S288c | 9.5 | 10.3 | 29 | 29.1 | 32.6 | 43.1 | 50.2 | |

The fructose-6-phosphate aldolase in the engineered cell, which in some embodiments can be present as a fusion protein with MeDH, can be an exogenous fructose-6-phosphate aldolase, such as a ructose-6-phosphate aldolase from *Amycolatopsis methanolica* 239 (SEQ ID NO:84; AIJ24623.1); *Bacillus methanolicus* MGA3 plasmid pBM19 (SEQ ID NO:85; WP_003349819.1); *Bacillus methanolicus* PF plasmid pBM20 (SEQ ID NO:86; WP_003352247.1); *Geobacillus thermodenitriicans* NG80-2 (SEQ ID NO:87; WP_008880720.1); *Geobacillus thermodenitriicans* NG80-2 (SEQ ID NO:88; WP_008880032.1); *Methylophilus methylotrophus* ATCC 53528 (SEQ ID NO: 89; WP_018986971.1); and *Bacillus methanolicus* MGA3 (SEQ ID NO:90, WP_003346852.1). Fructose-6-phosphate aldolases are of the enzyme class (EC) 4.1.2.

The fructose biphosphate aldolase in the engineered cell, which in some embodiments can be present as a fusion protein with MeDH, can be an exogenous fructose biphosphate aldolase. Fructose biphosphate aldolases are of the enzyme class (EC) 4.1.2.13.

Suitable purification and/or assays to test, e.g., for the production of BDO can be performed using well known methods. Suitable replicates such as triplicate cultures can be grown for each engineered strain to be tested. For example, product and byproduct formation in the engineered production host can be monitored. The final product and intermediates, and other organic compounds, can be analyzed by methods such as HPLC (High Performance Liquid Chromatography), GC-MS (Gas Chromatography-Mass Spectroscopy) and LC-MS (Liquid Chromatography-Mass Spectroscopy) or other suitable analytical methods using routine procedures well known in the art. The release of product in the fermentation broth can also be tested with the culture supernatant. Byproducts and residual glucose can be quantified by HPLC using, for example, a refractive index detector for glucose and alcohols, and a UV detector for organic acids (Lin et al., *Biotechnol. Bioeng.* 90:775-779 (2005)), or other suitable assay and detection methods well known in the art. The individual enzyme or protein activities from the exogenous DNA sequences can also be assayed using methods well known in the art.

The BDO or other target molecules may be separated from other components in the culture using a variety of methods well known in the art. Such separation methods include, for example, extraction procedures as well as methods that include continuous liquid-liquid extraction, pervaporation, evaporation, filtration, membrane filtration (including reverse osmosis, nanofiltration, ultrafiltration, and microfiltration), membrane filtration with diafiltration, membrane separation, reverse osmosis, electrodialysis, distillation, extractive distillation, reactive distillation, azeotropic distillation, crystallization and recrystallization, centrifugation, extractive filtration, ion exchange chromatography, size exclusion chromatography, adsorption chromatography, carbon adsorption, hydrogenation, and ultrafiltration. All of the above methods are well known in the art.

Examples of target molecule isolation processes include distillation for 13BDO, 14BDO, butadiene, methyl vinyl carbinol, 3-buten-1-ol, n-propanol, isopropanol, propylene, and crotyl alcohol; crystallization for 6ACA (alternatively it can be converted to caprolactam and then purified via distillation as a final step), HMDA, adipic acid or derivatives thereof, succinic acid or derivatives thereof, or any of crystallization, distillation, or extraction for methacrylic acid or derivatives thereof.

Target molecules such as 13BDO, 14BDO, butadiene, methyl vinyl carbinol n-propanol, isopropanol, propylene, crotyl alcohol; 3-buten-1-ol, 6ACA, HMDA, adipic acid or derivatives thereof, succinic acid or derivatives thereof, or methacrylic acid or derivatives thereof are chemicals used in commercial and industrial applications. In some embodiments, BDO and/or 4-HB are used in various commercial and industrial applications. Non-limiting examples of such applications include production of plastics, elastic fibers, polyurethanes, polyesters, including polyhydroxyalkanoates such as P4HB or co-polymers thereof, PTMEG and polyurethane-polyurea copolymers, referred to as spandex, elastane or Lycram™, nylons, and the like. Moreover, BDO and/or 4-HB are also used as a raw material in the production of a wide range of products including plastics, elastic fibers, polyurethanes, polyesters, including polyhydroxyalkanoates such as P4HB or co-polymers thereof, PTMEG and polyurethane-polyurea copolymers, referred to as spandex, elastane or Lycram™, nylons, and the like.

Accordingly, in some embodiments, provided are biobased plastics, elastic fibers, polyurethanes, polyesters, including polyhydroxyalkanoates such as P4HB or co-polymers thereof, PTMEG and polyurethane-polyurea copolymers, referred to as spandex, elastane or Lycram™, nylons, and the like, comprising one or more bioderived BDO and/or 4-HB or bioderived BDO and/or 4-HB intermediate thereof produced by an organism provided herein or produced using a method disclosed herein.

As used herein, the term "bioderived" means derived from or synthesized by a biological organism and can be considered a renewable resource since it can be generated by a biological organism. Such a biological organism, in particular the microbial organisms disclosed herein, can utilize feedstock or biomass, such as, sugars or carbohydrates obtained from an agricultural, plant, bacterial, or animal source. Alternatively, the biological organism can utilize atmospheric carbon. As used herein, the term "biobased" means a product as described above that is composed, in whole or in part, of a bioderived compound of the disclosure. A biobased or bioderived product is in contrast to a petroleum derived product, wherein such a product is derived from or synthesized from petroleum or a petrochemical feedstock.

In some embodiments, provided herein is a culture medium comprising bioderived BDO. In some embodiments, the bioderived BDO is produced by culturing an organism having a fusion protein and BDO pathway, as provided herein. In certain embodiments, the bioderived BDO has a carbon-12, carbon-13 and carbon-14 isotope ratio that reflects an atmospheric carbon dioxide uptake source. In one embodiment, the culture medium is separated from an organism having a fusion protein and BDO pathway.

In other embodiments, provided herein is a bioderived BDO. In some embodiments, the bioderived BDO is produced by culturing an organism having a fusion protein and BDO pathway, as provided herein. In some embodiments, the bioderived BDO has an Fm value of at least 80%, at least 85%, at least 90%, at least 95% or at least 98%. In certain embodiments, the bioderived BDO is a component of culture medium.

In certain embodiments, provided herein is a composition comprising a bioderived BDO provided herein, for example, a bioderived BDO produced by culturing an organism having a MeDH fusion protein and BDOP (BDO pathway), as provided herein. In some embodiments, the composition further comprises a compound other than said bioderived BDO. In certain embodiments, the compound other than said bioderived BDO is a trace amount of a cellular portion of an organism having a fusion protein and a BDO pathway, as provided herein.

In some embodiments, provided herein is a biobased product comprising a bioderived BDO provided herein. In certain embodiments, the biobased product is a plastic, elastic fiber, polyurethane, polyester, polyhydroxyalkanoate, poly-4-HB, co-polymer of poly-4-HB, poly(tetramethylene ether) glycol, polyurethane-polyurea copolymer, spandex, elastane, Lycram™, or nylon. In certain embodiments, the biobased product comprises at least 5% bioderived BDO. In certain embodiments, the biobased product is (i) a polymer, THF or a THF derivative, or GBL or a GBL derivative; (ii) a plastic, elastic fiber, polyurethane, polyester, polyhydroxyalkanoate, poly-4-HB, co-polymer of poly-4-HB, poly(tetramethylene ether) glycol, polyurethane-polyurea copolymer, spandex, elastane, Lycram™, or nylon; (iii) a polymer, a resin, a fiber, a bead, a granule, a pellet, a chip, a plastic, a polyester, a thermoplastic polyester, a molded article, an injection-molded article, an injection-molded part, an automotive part, an extrusion resin, an electrical part and a casing; and optionally where the biobased product is reinforced or filled and further where the biobased product is glass-reinforced or -filled or mineral-reinforced or -filled; (iv) a polymer, wherein the polymer comprises polybutylene terephthalate (PBT); (v) a polymer, wherein the polymer comprises PBT and the biobased product is a resin, a fiber, a bead, a granule, a pellet, a chip, a plastic, a polyester, a thermoplastic polyester, a molded article, an injection-molded article, an injection-molded part, an automotive part, an extrusion resin, an electrical part and a casing; and optionally where the biobased product is reinforced or filled and further where the biobased product is glass-reinforced or -filled or mineral-reinforced or -filled; (vi) a THF or a THF derivative, wherein the THF derivative is polytetramethylene ether glycol (PTMEG), a polyester ether (COPE) or a thermoplastic polyurethane; (viii) a THF derivative, wherein the THF derivative comprises a fiber; or (ix) a GBL or a GBL derivative, wherein the GBL derivative is a pyrrolidone. In certain embodiments, the biobased product comprises at least 10% bioderived BDO. In some embodiments, the biobased product comprises at least 20% bioderived BDO. In other embodiments, the biobased product comprises at least 30% bioderived BDO. In some embodiments, the biobased product comprises at least 40% bioderived BDO. In other embodiments, the biobased product comprises at least 50% bioderived BDO. In one embodiment, the biobased product comprises a portion of said bioderived BDO as a repeating unit. In another embodiment, provided herein is a molded product obtained by molding the biobased product provided herein. In other embodiments, provided herein is a process for producing a biobased product provided herein, comprising chemically reacting said bioderived-BDO with itself or another compound in a reaction that produces said biobased product. In certain embodiments, provided herein is a polymer comprising or obtained by converting the bioderived BDO. In other embodiments, provided herein is a method for producing a polymer, comprising chemically or enzymatically converting the bioderived BDO to the polymer. In yet other embodiments, provided herein is a composition comprising the bioderived BDO, or a cell lysate or culture supernatant thereof.

BDO is a valuable chemical for the production of high performance polymers, solvents, and fine chemicals. It is the basis for producing other high value chemicals such as tetrahydrofuran (THF) and gamma-butyrolactone (GBL). The value chain is comprised of three main segments including: (1) polymers, (2) THF derivatives, and (3) GBL derivatives. In the case of polymers, BDO is a comonomer for polybutylene terephthalate (PBT) production. PBT is a medium performance engineering thermoplastic used in automotive, electrical, water systems, and small appliance applications. Conversion to THF, and subsequently to polytetramethylene ether glycol (PTMEG), provides an intermediate used to manufacture spandex products such as LYCRA® fibers. PTMEG is also combined with BDO in the production of specialty polyester ethers (COPE). COPEs are high modulus elastomers with excellent mechanical properties and oil/environmental resistance, allowing them to operate at high and low temperature extremes. PTMEG and BDO also make thermoplastic polyurethanes processed on standard thermoplastic extrusion, calendaring, and molding equipment, and are characterized by their outstanding toughness and abrasion resistance. The GBL produced from BDO provides the feedstock for making pyrrolidones, as well as serving the agrochemical market. The pyrrolidones are used as high performance solvents for extraction processes of increasing use, including for example, in the electronics industry and in pharmaceutical production. Accordingly, provided herein is bioderived BDO produced according to the methods described herein and biobased products comprising or obtained using the bioderived BDO.

In some embodiments, the carbon feedstock and other cellular uptake sources such as phosphate, ammonia, sulfate, chloride and other halogens can be chosen to alter the isotopic distribution of the atoms present in BDO and/or 4-HB or any BDO and/or 4-HB pathway intermediate. The various carbon feedstock and other uptake sources enumerated above will be referred to herein, collectively, as "uptake sources." Uptake sources can provide isotopic enrichment for any atom present in the product BDO and/or 4-HB or BDO and/or 4-HB pathway intermediate, or for side products generated in reactions diverging away from a BDO and/or 4-HB pathway. Isotopic enrichment can be achieved for any target atom including, for example, carbon, hydrogen, oxygen, nitrogen, sulfur, phosphorus, chloride or other halogens. The same holds true for the MMPs and FAPs, as well as intermediates thereof, provided herein.

In some embodiments, the uptake sources can be selected to alter the carbon-12, carbon-13, and carbon-14 ratios. In some embodiments, the uptake sources can be selected to alter the oxygen-16, oxygen-17, and oxygen-18 ratios. In some embodiments, the uptake sources can be selected to alter the hydrogen, deuterium, and tritium ratios. In some embodiments, the uptake sources can be selected to alter the nitrogen-14 and nitrogen-15 ratios. In some embodiments, the uptake sources can be selected to alter the sulfur-32, sulfur-33, sulfur-34, and sulfur-35 ratios. In some embodiments, the uptake sources can be selected to alter the phosphorus-31, phosphorus-32, and phosphorus-33 ratios. In some embodiments, the uptake sources can be selected to alter the chlorine-35, chlorine-36, and chlorine-37 ratios.

In some embodiments, the isotopic ratio of a target atom can be varied to a desired ratio by selecting one or more uptake sources. An uptake source can be derived from a natural source, as found in nature, or from a man-made source, and one skilled in the art can select a natural source, a man-made source, or a combination thereof, to achieve a desired isotopic ratio of a target atom. An example of a man-made uptake source includes, for example, an uptake source that is at least partially derived from a chemical synthetic reaction. Such isotopically enriched uptake sources can be purchased commercially or prepared in the laboratory and/or optionally mixed with a natural source of the uptake source to achieve a desired isotopic ratio. In some embodiments, a target isotopic ratio of an uptake source can be obtained by selecting a desired origin of the uptake source as found in nature. For example, as discussed herein, a natural source can be a biobased derived from or synthesized by a biological organism or a source such as petroleum-based products or the atmosphere. In some such embodiments, a source of carbon, for example, can be selected from a fossil fuel-derived carbon source, which can be relatively depleted of carbon-14, or an environmental or atmospheric carbon source, such as $CO_2$, which can possess a larger amount of carbon-14 than its petroleum-derived counterpart.

Isotopic enrichment is readily assessed by mass spectrometry using techniques known in the art such as Stable Isotope Ratio Mass Spectrometry (SIRMS) and Site-Specific Natural Isotopic Fractionation by Nuclear Magnetic Resonance (SNIF-NMR). Such mass spectral techniques can be integrated with separation techniques such as liquid chromatography (LC) and/or high performance liquid chromatography (HPLC).

Accordingly, in some embodiments, provided are BDO and/or 4-HB or a BDO and/or 4-HB pathway intermediate thereof that has a carbon-12, carbon-13, and carbon-14 ratio that reflects an atmospheric carbon, also referred to as environmental carbon, uptake source.

Further, the disclosure relates, in part, to biologically produced BDO and/or 4-HB or BDO and/or 4-HB intermediate thereof as disclosed herein, and to the products derived therefrom, wherein the BDO and/or 4-HB or a BDO and/or 4-HB intermediate thereof has a carbon-12, carbon-13, and carbon-14 isotope ratio of about the same value as the $CO_2$ that occurs in the environment.

Those skilled in the art will understand that an organism can be engineered that secretes the biosynthesized compounds when grown on a carbon source such as a methanol alone or combined with other carbohydrates. Such compounds include, for example, BDO and any of the intermediate metabolites in the BDOP. All that is required is to engineer in one or more of the required enzyme or protein activities to achieve biosynthesis of the desired compound or intermediate including, for example, inclusion of some or all of the BDO biosynthetic pathways. Accordingly, provided herein is an organism that produces and/or secretes BDO when grown on a carbohydrate or other carbon source and produces and/or secretes any of the intermediate metabolites shown in the BDOP when grown on a carbohydrate or other carbon source. The BDO producing microbial organisms provided herein can initiate synthesis from an intermediate. The same holds true for intermediates in the formaldehyde assimilation.

In one embodiment, the carbon source is methanol or formate. In certain embodiments, methanol is used as a carbon source. In other embodiments, formate is used as a carbon source. In specific embodiments, methanol is used as a carbon source in the organisms provided herein, either alone or in combination with the product pathways provided herein.

In one embodiment, the carbon source comprises methanol, and sugar (e.g., glucose) or a sugar-containing biomass. In another embodiment, the carbon source comprises formate, and sugar (e.g., glucose) or a sugar-containing biomass. In one embodiment, the carbon source comprises methanol, formate, and sugar (e.g., glucose) or a sugar-containing biomass. In specific embodiments, the methanol or formate, or both, in the fermentation feed is provided as a mixture with sugar (e.g., glucose) or sugar-comprising biomass. In certain embodiments, sugar is provided for sufficient strain growth. In some embodiments, the sugar (e.g., glucose) is provided at a molar concentration ratio of methanol to sugar of from 200:1 to 1:200. In certain embodiments, the carbon source comprises formate and a sugar (e.g., glucose). In some embodiments, the sugar (e.g., glucose) is provided at a molar concentration ratio of formate to sugar of from 200:1 to 1:200. In certain embodiments, the carbon source comprises a mixture of methanol and formate, and a sugar (e.g., glucose). In certain embodiments, sugar is provided for sufficient strain growth. In some embodiments, the sugar (e.g., glucose) is provided at a molar concentration ratio of methanol and formate to sugar of from 200:1 to 1:200.

Example 1: Preparation of MeDH Fusion Protein Constructs

Nucleic acid constructs for expression of various MeDH-containing fusion proteins were prepared, as well as control constructs without a fusion and a no insert control. Table 7 is a list of the nucleic acid constructs and Table 8 provides details of the genes used in the fusion protein constructs.

TABLE 7 pZS13S-p100-2315LS-linker-hps-phi
pZS13S-p100-2435A-linker-hps-phi
pZS13S-p100-2451A-linker-hps-phi
pZS13S-p108-2315LS-linker-hps-phi
pZS13S-p108-2435A-linker-hps-phi
pZS13S-p108-2451A-linker-hps-phi
pZS13S-p100-2435A-hps-phi

TABLE 7-continued pZS13S-p100-2451A-hps-phi
pZS13S-p108-2315LS-hps-phi
pZS13S-p108-2435A-hps-phi
pZS13S-p108-2451A-hps-phi

TABLE 8

| Gene/region | CDS number | Identifier/SEQ ID NO | Source |
| --- | --- | --- | --- |
| MeDH | 2315LS | Variant of MGA3_17392 SEQ ID NO: 8 | Evolved variant of MeDH from Bacillus Methanolicus |
| MeDH | 2435A | ADH_2277 SEQ ID NO: 6 | Desulfotomaculum reducens MI-1 |
| MeDH | 2451A | ADH/KC157637 SEQ ID NO: 10 | Metalibrary sp |
| HPS-PHI | 2616A | rmpAB fusion SEQ ID NO: 5 | Mycobacterium gastri MB19 |
| Linker | | | |
| GGSGGSGSGSGGSGSGSGGS (SEQ ID NO: 7) | | | |

Nucleic acid constructs that express these MeDH-GGSGGSGSGSGGSGSGSGGS-2616A fusions were transformed into *E. coli* as described in Example 2.

Example 2: Preparation of Engineered *E. coli* Expressing MeDH Fusion Proteins and Analysis Nucleic acid constructs as listed in Table 7 were transformed into *E. coli*. *E. coli* transformants that express MeDH-2616A fusions were assessed for expression of soluble protein, methanol dehydrogenase activity in lysates of *E. coli* cells, and ability to confer an engineered *E. coli* strain (ECKh-8665) the ability to grow on methanol as a carbon source. Several variables were tested to identify combinations that confer improved activity, including: promoter strength, different MeDH variants, and peptide linkers in MeDH and 2616 fusions.

Nucleic acid constructs were transformed into *E. coli* strain 7539 and grown overnight at 37° C. in 5 mL of LB+carb100 broth.

In vitro assay conditions were as follows. Lysis: 1 mL of cells harvested and lysed in 200 ul of BugBuster with lysozyme and benzonase (samples were all OD normalized during data normalization). Assay: 10 uL of lysate added to 100 ul of assay buffer, rate of NADH production monitored at 340 nm over 2 hours. Assay buffer: 100 mM Tris 8.5, 500 mM Methanol, 5 mM $MgCl_2$, 500 mM $NAD^+$.

Growth in Bioscreen instrument of *E. coli* host ECKh-8665 containing the denoted plasmid. The media was MM9 minimal media containing 2 g/L glycerol and 500 mM methanol. 3 replicates. See Table 9.

TABLE 9

| plasmid (pZS*13S-) | Growth rate estimation |
| --- | --- |
| P108_2451A-linker-2616A | 0.11 |
| P100_2435A | 0.11 |
| P100_2315LS | 0.10 |
| P107_2435A | 0.10 |
| P108_2435A-linker-2616A | 0.09 |
| P108_2315LS | 0.09 |
| P108_2315LS-linker-2616A | 0.08 |
| P119_2435A | 0.04 |
| P108_2315LS-2616A | no growth |
| Empty Vector | no growth |

SEQUENCE LISTING

```
Sequence total quantity: 91
SEQ ID NO: 1          moltype = AA  length = 382
FEATURE               Location/Qualifiers
source                1..382
                      mol_type = protein
                      note = MGA3
                      organism = Bacillus methanolicus
SEQUENCE: 1
MTTNFFIPPA SVIGRGAVKE VGTRLKQIGA KKALIVTDAF LHSTGLSEEV AKNIREAGVD   60
VAIFPKAQPD PADTQVHEGV DVFKQENCDS LVSIGGGSSH DTAKAIGLVA ANGGRINDYQ  120
GVNSVEKPVV PVVAITTTAG TGSETTSLAV ITDSARKVKM PVIDEKITPT VAIVDPELMV  180
KKPAGLTIAT GMDALSHAIE AYVKGATPV TDAFAIQAMK LINEYLPKAV ANGEDIEARE  240
KMAYAQYMAG VAFNNGGLGL VHSISHQVGG VYKLQHGICN SVNMPHVCAF NLIAKTERFA  300
```

```
HIAELLGENV AGLSTAAAAE RAIVALERIN KSFGIPSGYA EMGVKEEDIE LLAKNAYEDV    360
CTQSNPRVPT VQDIAQIIKN AM                                             382

SEQ ID NO: 2            moltype = DNA  length = 1149
FEATURE                 Location/Qualifiers
source                  1..1149
                        mol_type = genomic DNA
                        organism = Bacillus methanolicus
                        sub_species = MGA3
SEQUENCE: 2
atgacaacaa acttttcat tccaccagcc agcgtaattg acgcggtgc agtaaaggaa       60
gtaggaacaa gacttaagca aattggagct aagaaagcgc ttatcgttac agatgcattc   120
cttcacagca caggtttatc tgaagaagtt gctaaaaaca ttcgtgaagc tggcgttgat   180
gttgcgattt tcccaaaagc tcaaccagat ccagcagata cacaagttca tgaaggtgta   240
gatgtattca aacaagaaaa ctgtgattca cttgtttcta tcggtggagg tagctctcac   300
gatacagcta aagcaatcgg tttagttgca gcaaacggcg aagaatcaa tgactatcaa    360
ggtgtaaaca gcgtagaaaa accagtcgtt ccagtagttg caatcactac aacagctggt   420
actggtagtg aaacaacatc tcttgcggtt attacagact ctgcacgtaa agtaaaaatg   480
cctgttattg atgagaaaat tactccaact gtagcaattg ttgacccaga attaatggta   540
aaaaaaccag ctggattaac aatcgcaact ggtatggatg cattgtccca tgcaattgaa   600
gcatatgttg caaaaggtgc tacaccagtt actgatgcat ttgctattca agcaatgaaa   660
cttatcaatg aatacttacc aaaagcggtt gcgaaccgga aagacatcga agcacgtgta   720
aaaatggctt atgcacaata catggcagga gtggcattta acaacggtgg tttaggacta   780
gttcactcta tttctcacca gtaggtgga gtttacaaat tacaaacgg aatctgtaac    840
tcagttaata tgccacacgt ttgcgcattc aacctaattg ctaaaactga gcgcttcgca   900
cacattgctg agcttttagg tgagaatgtt gctggcttaa gctgcgcag agctgctgga   960
agagcaattg tagctcttga aagaatcaac aaattccttcg gtatcccatc tggctatgca  1020
gaaatgggcg tgaaagaaga ggatatcgaa ttattagcga aaaacgcata cgaagactta  1080
tgtactcaaa gcaacccacg cgttcctact gttcaagaca ttgcacaaat catcaaaaac  1140
gctatgtaa                                                          1149

SEQ ID NO: 3            moltype = AA  length = 211
FEATURE                 Location/Qualifiers
source                  1..211
                        mol_type = protein
                        note = MGA3
                        organism = Bacillus methanolicus
SEQUENCE: 3
MELQLALDLV NIEEAKQVVA EVQEYVDIVE IGTPVIKIWG LQAVKAVKDA FPHLQVLADM     60
KTMDAAAYEV AKAAEHGADI VTILAAAEDV SIKGAVEEAK KLGKKILVDM IAVKNLEERA   120
KQVDEMGVDY ICVHAGYDLQ AVGKNPLDDL KRIKAVVKNA KTAIAGGIKL ETLPEVIKAE   180
PDLVIVGGGI ANQTDKKAAA EKINKLVKQG L                                  211

SEQ ID NO: 4            moltype = AA  length = 184
FEATURE                 Location/Qualifiers
source                  1..184
                        mol_type = protein
                        note = MGA3
                        organism = Bacillus methanolicus
SEQUENCE: 4
MLTTEFLAEI VKELNSSVNQ IADEEAEALV NGILQSKKVF VAGAGRSGFM AKSFAMRMMH     60
MGIDAYVVGE TVTPNYEKED ILIIGSGSGE TKSLVSMAQK AKSIGGTIAA VTINPESTIG   120
QLADIVIKMP GSPKDKSEAR ETIQPMGSLF EQTLLLFYDA VILRFMEKKG LDTKTMYGRH   180
ANLE                                                                184

SEQ ID NO: 5            moltype = AA  length = 406
FEATURE                 Location/Qualifiers
REGION                  1..406
                        note = HPS-PHI fusion
source                  1..406
                        mol_type = protein
                        organism = synthetic construct
SEQUENCE: 5
MKLQVAIDLL STEAALELAG KVAEYVDIIE LGTPLIKAEG LSVITAVKKA HPDKIVFADM     60
KTMDAGELEA DIAFKAGADL VTVLGSADDS TIAGAVKAAQ AHNKGVVVDL IGIEDKATRA   120
QEVRALGAKF VEMHAGLDEQ AKPGFDLNGL LAAGEKARVP FSVAGGVKVA TIPAVQKAGA   180
EVAVAGGAIY GAADPAAAAK ELRAAIAMTQ AAEADGAVKV VGDDITNNLS LVRDEVADTA   240
AKVDPEQVAV LARQIVQPGR VFVAGAGRSG LVLRMAAMRL MHFGLTVHVA GDTTTPAISA   300
GDLLLVASGS GTTSGVVKSA ETAKKAGARI AAFTTNPDSP LAGLADAVVI IPAAQKTDHG   360
SHISRQYAGS LFEQVLFVVT EAVFQSLWDH TEVEAEELWT RHANLE                  406

SEQ ID NO: 6            moltype = AA  length = 388
FEATURE                 Location/Qualifiers
source                  1..388
                        mol_type = protein
                        note = MI-1
                        organism = Desulfotomaculum reducens
SEQUENCE: 6
MTVGEQVFGY FIPTVNLMGV GAHKEIPDQV KVLGGSNVLI VTDAFLGRPG GMADDIKGML     60
```

```
-continued

EAENIKVTIY AGAEPNPTDV NVHDGLKVYQ ECGADMILSL GGGSSHDCAK GIGIVATNGG    120
NIRDYEGINK SSKAMPPFIA VNTTAGTASE MTRFCIITNT SNHVKMAIVD WRCTPNIAIN    180
DPLLMAGMPP ALTAATGMDA LTHAIEAYVS VAATPVTDSA ALMAIKLISQ YLRAAVANGE    240
NMEARDKMAY AEFLGGMAFN NASLGYVHAM AHQLGGFYNL PHGVCNAILL PHVEAFNLIA    300
CPERFVDIAV AMGENVEGLS VRDAADKALS AIRKLSADVG IPAGLTELGV KEEDLKTMAE    360
NAMKDACALT NPRKATLNDI VGIYKTAL                                      388

SEQ ID NO: 7              moltype = AA  length = 20
FEATURE                   Location/Qualifiers
REGION                    1..20
                          note = linker
source                    1..20
                          mol_type = protein
                          organism = synthetic construct
SEQUENCE: 7
GGSGGSGSGS GGSGSGSGGS                                               20

SEQ ID NO: 8              moltype = AA  length = 382
FEATURE                   Location/Qualifiers
REGION                    1..382
                          note = MeDH variant
source                    1..382
                          mol_type = protein
                          organism = synthetic construct
SEQUENCE: 8
MTTNFFIPPA SVIGRGAVKE VGTRLKQIGA KKALIVTDAF LHSTGLSEEV AKNIREAGVD    60
VAIFPKAQPD PADTQVHEGV DVFKQENCDS LVSIGGGSSH DTAKAIGLVA ANGGRINDYQ   120
GVNSVEKPMI PVVAITTTAG TGSETTSLAV ITDSARKVKM PVIDEKITPT VAIVDPELMV   180
KKPAGLTIAT GMDALSHAIE AYVAKGATPV TDAFAIQAMK LINEYLPKAV ANGEDIEARE   240
KMAYAQYMAG VAFNNGGLGL VHSISHQVGS VYKLQHGICN SVNMPHVCAF NLIAKTERFA   300
HIAELLGENV AGLSTAAAAE RAIVALERIN KSFGIPSGYA EMGVKEEDIE LLAKDAYEDV   360
CTQSNPRVPT VQDIAQIIKN AM                                           382

SEQ ID NO: 9              moltype = DNA  length = 1149
FEATURE                   Location/Qualifiers
misc_feature              1..1149
                          note = MeDH variant
source                    1..1149
                          mol_type = other DNA
                          organism = synthetic construct
SEQUENCE: 9
atgaccacca acttttttcat cccaccagca tcagttatcg gtagaggcgc agttaaagaa    60
gttggcaccc gtctgaagca aatcggtgcg aagaaagctc tgattgttac cgacgcgttt   120
ctgcatagca ccggtttgag cgaagaagtg gcgaagaaca ttcgtgaagc gggcgtcgat   180
gtggcgattt tcccgaaagc ccagccggac cctgccgata cgcaagtcca cgaaggtgtt   240
gatgtcttta acaggagaa ttgcgacagc ttggttagca tcggtggcgg ctcttcccat   300
gatacggcga aagcaattgg cctgtcgca gcaaatggtg gccgtatcaa tgactaccag   360
ggtgttaaca gcgtggagaa gccgatgatt ccggtggtcg cgatcacgac tacggcaggc   420
accggctccg aaaccaccag cttggcggtc atcacggata gcgcgcgtaa agtgaaaatg   480
ccggtgatcg atgagaaaat caccccgacc gtggcgattg tcgatccgga gctgatggtg   540
aagaagccgg ctggtttgac cattgcaacc ggtatggacg ccctgtctca cgccatcgaa   600
gcatacgtgg caaagggtgc gacgccggtg accgatgcgt tcgccattca ggcaatgaaa   660
ctgattaatg agtatctgcc gaaggctgtt gcgaatggcg aggacatcga ggcacgcgag   720
aaaatggcgt atgctcaata catggccggt gtcgcgttca caatggtgg tctgggtctg   780
gtacacagca tcagccacca agtgggtagt gtgtacaaac tgcaacagg catttgcaac   840
tccgtcaaca tgccgcacgt tgtgcgcttt aatctgattg ccaagaccga acgtttcgcc   900
catatcgctg agctgctggg tgagaacgtt gcaggcctga gcacggcggc tgcggcggag   960
cgcgcaattg tcgcgctgga acgcattaac aagagctttg gtatcccgag cggctatgcg  1020
gagatgggtg tgaaagaaga ggacattgaa ctgctggcta aggatgcgta cgaggacgtt  1080
tgtactcaga gcaaccccgcg tgttccgacg gtccaggaca ttgcccagat tatcaagaac  1140
gcgatgtag                                                         1149

SEQ ID NO: 10             moltype = AA  length = 393
FEATURE                   Location/Qualifiers
REGION                    1..393
                          note = Metalibrary sp
source                    1..393
                          mol_type = protein
                          organism = unidentified
SEQUENCE: 10
MSLVNYLQLA DRTDGFFIPS VTLVGPGCVK EVGPRAKMLG AKRALIVTDA GLHKMGLSQE    60
IADLLRSEGI DSVIFAGAEP NPTDINVHDG VKVYQKEKCD FIVSLGGGSS HDCAKGIGLV   120
TAGGGHIRDY EGVDKSKVPM TPLIAINTTA GTASEMTRFC IITNTDTHVK MAIVDWRCTP   180
LVAIDDPRLM VKMPPALTAA TGMDALTHAV EAYVSTAATP ITDTCAEKAI ELIGQWLPKA   240
VANGDWMEAR AAMCYAQYLA GMAFNNASLG YVHAMAHQLG GFYNLPHGVC NAILLPHVCQ   300
FNLIAATERY ARIAALLGVD TSGMETREAA LAAIAAIKEL SSSIGIPRGL SELGVKAADH   360
KVMAENAQKD ACMLTNPRKA TLEQVIGIFE AAM                                393

SEQ ID NO: 11             moltype = DNA  length = 1182
```

```
FEATURE                 Location/Qualifiers
misc_feature            1..1182
                        note = Metalibrary sp
source                  1..1182
                        mol_type = genomic DNA
                        organism = unidentified
SEQUENCE: 11
atgagcctgg ttaattatct gcagctggcc gatcgtaccg atggcttttt tatcccgagc    60
gttaccctgg ttggtccggg ttgtgttaaa gaagttggtc ctcgcgcaaa aatgctgggt   120
gcaaaacgtg cactgattgt taccgatgca ggtctgcaca aaatgggtct gagccaagaa   180
attgccgatc tgctgcgtag cgaaggtatt gatagcgtta ttttgccgg tgcagaaccg    240
aatccgaccg atatcaatgt tcatgatggt gtgaaagtgt atcagaaaga gaatgcgat    300
tttatcgtta gcctggtgg tggtagcagc catgattgtg caaaaggtat tggtctggtt   360
accgcaggcg gtggtcatat tcgtgattat gaaggtgttg acaaaagcaa agttccgatg   420
acaccgctga ttgcaattaa taccaccgca ggcaccgcaa gcgaaatgac ccgttttttgt   480
attattacca caccgatac ccatgtgaaa atgcaattg ttgattggcg ttgtactccg      540
ctggttgcca ttgatgatcc gcgtctgatg gttaaaatgc ctccggcact gaccgcagca   600
accggtatgg atgcactgac ccatgcagtt gaagcatatg tgagcaccgc agccaccccg   660
attaccgata cctgtgcaga aaaagcaatt gaactgattg gtcagtggct gccgaaagca   720
gttgcaaatg gtgattggat ggaagcacgt gcagcaatgt ttatgcaca gtatctggca    780
ggtatggcat caataatgc aagcctgggt tatgttcatg caatggcaca tcagctgggt    840
ggcttttata acctgccgca tggtgtttgt aatgcaattc tgctgcctca tgtttgccag   900
tttaatctga ttgcagccac cgaacgttat gcccgtattg cagcactgct gggtgttgat   960
accagccgta tggaaacccg tgaagcagca ctggcagcaa ttgccgcaat taaagaactg  1020
agcagcagca ttggtattcc gcgtggtctg agcgaactgg gtgttaaagc agccgatcat  1080
aaagttatgg cagaaaatgc acagaaagat gcatgtatgc tgacaaatcc gcgtaaagca  1140
accctggaac aggttattgg tatttttgaa gccgcaatgt ag                    1182

SEQ ID NO: 12           moltype = AA  length = 185
FEATURE                 Location/Qualifiers
source                  1..185
                        mol_type = protein
                        organism = Bacillus methanolicus
SEQUENCE: 12
MGKLFEEKTI KTEQIFSGRV VKLQVDDVEL PNGQTSKREI VRHPGAVAVI AITNENKIVM    60
VEQYRKPLEK SIVEIPAGKL EKGEDPRITA LRELEEETGY ECEQMEWLIS FATSPGFADE   120
IIHIYVAKGL SKKENAAGLD EDEFVDLIEL TLDEALQYIK EQRIYDSKTV IAVQYLQLQE   180
ALKNK                                                                185

SEQ ID NO: 13           moltype = AA  length = 381
FEATURE                 Location/Qualifiers
source                  1..381
                        mol_type = protein
                        note = C1
                        organism = Bacillus methanolicus
SEQUENCE: 13
MTNFFIPPAS VIGRGAVKEV GTRLKQIGAK KALIVTDAFL HSTGLSEEVA KNIREAGLDV    60
AIFPKAQPDP ADTQVHEGVD VFKQENCDAL VSIGGGSSHD TAKAIGLVAA NGGRINDYQG   120
VNSVEKPVVP VVAITTTAGT GSETTSLAVI TDSARKVKMP VIDEKITPTV AIVDPELMVK   180
KPAGLTIATG MDALSHAIEA YVAKGATPVT DAFAIQAMKL INEYLPKAVA NGEDIEAREA   240
MAYAQYMAGV AFNNGGLGLV HSISHQVGGV YKLQHGICNS VNMPHVCAFN LIAKTERFAH   300
IAELLGENVS GLSTAAAAER AIVALERYNK NFGIPSGYAE MGVKEEDIEL LAKNAFEDVC   360
TQSNPRVATV QDIAQIIKNA L                                              381

SEQ ID NO: 14           moltype = AA  length = 383
FEATURE                 Location/Qualifiers
source                  1..383
                        mol_type = protein
                        note = PB1
                        organism = Bacillus methanolicus
SEQUENCE: 14
MTQRNFFIPP ASVIGRGAVK EVGTRLKQIG ATKALIVTDA FLHGTGLSEE VAKNIREAGL    60
DAVIFPKAQP DPADTQVHEG VDIFKQEKCD ALVSIGGGSS HDTAKAIGLV AANGGRINDY   120
QGVNSVEKPV VPVVAITTTA GTGSETTSLA VITDSARKVK MPVIDEKITP TVAIVDPELM   180
VKKPAGLTIA TGMDALSHAI EAYVAKRATP VTDAFAIQAM KLINEYLPRA VANGEDIEAR   240
EAMAYAQYMA GVAFNNGGLG LVHSISHQVG GVYKLQHGIC NSVNMPHVCQ FNLIARTERF   300
AHIAELLGEN VSGLSTASAA ERAIVALQRY NKNFGIPSGY AEMGVKEEDI ELLANNAYQD   360
VCTLDNPRVP VTQDIAQIIK NAL                                            383

SEQ ID NO: 15           moltype = AA  length = 383
FEATURE                 Location/Qualifiers
source                  1..383
                        mol_type = protein
                        note = PB1
                        organism = Bacillus methanolicus
SEQUENCE: 15
MTKTKFFIPS STVFGRGAVK EVGARLKAIG ATKALIVTDA FLHSTGLSEE VAKNIREAGL    60
DVVIFPKAQP DPADTQVHEG VEVFKQEKCD ALVSIGGGSS HDTAKGIGLV AANGGRINDY   120
QGVNSVEKQV VPQIAITTTA GTGSETTSLA VITDSARKVK MPVIDEKITP TVAIVDPELM   180
```

```
VKKPAGLTIA TGMDALSHAI EAYVAKRATP VTDAFAIQAM KLINEYLPKA VANGEDIEAR    240
EAMAYAQYMA GVAFNNGGLG LVHSISHQVG GVYKLQHGIC NSVVMPHVCQ FNLIARTERF    300
AHIAELLGEN VSGLSTASAA ERTIAALERY NRNFGIPSGY KAMGVKEEDI ELLANNAMQD    360
VCTLDNPRVP TVQDIQQIIK NAL                                           383

SEQ ID NO: 16           moltype = AA   length = 385
FEATURE                 Location/Qualifiers
source                  1..385
                        mol_type = protein
                        note = MGA3
                        organism = Bacillus methanolicus
SEQUENCE: 16
MKNTQSAFYM PSVNLFGAGS VNEVGTRLAG LGVKKALLVT DAGLHSLGLS EKIAGIIREA     60
GVEVAIFPKA EPNPTDKNVA EGLEAYNAEN CDSIVTLGGG SSHDAGKAIA LVAANGGTIH    120
DYEGVDVSKK PMVPLIAINT TAGTGSELTK FTIITDTERK VKMAIVDKHV TPTLSINDPE    180
LMVGMPPSLT AATGLDALTH AIEAYVSTGA TPITDALAIQ AIKIISKYLP RAVANGKDIE    240
AREQMAFAQS LAGMAFNNAG LGYVHAIAHQ LGGFYNFPHG VCNAILLPHV CRFNLISKVE    300
RYAEIAAFLG ENVDGLSTYE AAEKAIKAIE RMARDLNIPK GFKELGAKEE DIETLAKNAM    360
NDACALTNPR KPKLEEVIQI IKNAM                                         385

SEQ ID NO: 17           moltype = AA   length = 385
FEATURE                 Location/Qualifiers
source                  1..385
                        mol_type = protein
                        note = PB1
                        organism = Bacillus methanolicus
SEQUENCE: 17
MTNTQSIFYI PSVNLFGPGS VNEVGTRLAG LGVKKALLVT DAGLHGLGLS EKIASIIREA     60
GVEVLIFPKA EPNPTDKNVA EGLEVYNAEN CDSIVTLGGG SSHDAGKGIA LVAANGGTIY    120
DYEGVDKSKK PMVPLIAINT TAGTGSELTR FTIITDTERK VKMAIVDKHV TPTLSINDPE    180
LMVGMPPSLT AATGLDALTH AIEAYVSTAA TPITDALAIQ AIKIISKYLP RAFANGKDME    240
AREQMAFAQS LAGMAFNNAS LGYVHAIAHQ FGGFYNFPHG VCNAILLPHV CRFNLISKVE    300
RFAEIAALLG ENVAGLSTRE AAEKGIKAIE RMAKDLNIPR GFKELGAKEE DIVTLAENAM    360
KDATALTNPR KPKLEEVIQI IKNAM                                         385

SEQ ID NO: 18           moltype = AA   length = 385
FEATURE                 Location/Qualifiers
source                  1..385
                        mol_type = protein
                        note = MGA3
                        organism = Bacillus methanolicus
SEQUENCE: 18
MTNTQSAFFM PSVNLFGAGS VNEVGTRLAD LGVKKALLVT DAGLHGLGLS EKISSIIRAA     60
GVEVSIFPKA EPNPTDKNVA EGLEAYNAEN CDSIVTLGGG SSHDAGKAIA LVAANGGKIH    120
DYEGVDVSKE PMVPLIAINT TAGTGSELTK FTIITDTERK VKMAIVDKHV TPTLSINDPE    180
LMVGMPPSLT AATGLDALTH AIEAYVSTGA TPITDALAIQ AIKIISKYLP RAVANGKDIE    240
AREQMAFAQS LAGMAFNNAG LGYVHAIAHQ LGGFYNFPHG VCNAVLLPYV CRFNLISKVE    300
RYAEIAAFLG ENVDGLSTYD AAEKAIKAIE RMAKDLNIPK GFKELGAKEE DIETLAKNAM    360
KDACALTNPR KPKLEEVIQI IKNAM                                         385

SEQ ID NO: 19           moltype = AA   length = 401
FEATURE                 Location/Qualifiers
source                  1..401
                        mol_type = protein
                        organism = Lysinibacillus fusiformis
SEQUENCE: 19
MSDVLKQFVM PKTNLFGPGA IQEVGKRLND LEVKKTLIVT DEGLHKLGLS EQIANIITAA     60
GIDVAIFPKA EPNPTDQNIE DGISVYHAEN CDSIVSLGGG SAHDAAKGIG LIASNGGRIH    120
DYEGVDKSQN PLVPLIAINT TAGTASEMTR FTIITDTARK VKMAIVDKHV TPLLSINDPE    180
LMIGLPPALT AATGVDALTH AIESFVSTNA TPITDACAEK VLQLIPEYLP RAYANGADIE    240
AREQMVYAQF LAGMAFNNAS LGYVHAIAHQ LGGFYNLPHG VCNAILLPHV CRFNVTARTE    300
RFARIAELLG ENVEGLSKRD AAEKAITAIE KLSQDLNIPS GFRELGAKDE DIEILAKNAL    360
LDVCAETNPR KATLEDIKQI ITNAMGPIVK KEESLEAVAL S                       401

SEQ ID NO: 20           moltype = AA   length = 386
FEATURE                 Location/Qualifiers
source                  1..386
                        mol_type = protein
                        note = 36D1
                        organism = Bacillus coagulans
SEQUENCE: 20
MLTGLRTDFQ MPSVNLFGQG TAEEIGNRLK NLGCRRPLIV TDEGLHQLGY SEKIAAYIKE     60
AGLEVAIYPK AEPNPTDKNV EDGLKTYHEE NCDSIVSLGG GSAHDCAKGI GLVAANGGKI    120
HDYEGLDRSE KPMVPLVAIN TTAGTASEMT KFTIITDTSR KVKMAIVDKH VTPVLSINDP    180
LLMVGMPPSL TAATGLDALT HAVEAYVSTA ATPVTDACAI KAIQIIPQYL PKAVANGNDM    240
EAREQMVYAQ YLAGMAFNNA SLGYVHAIAH QFGGFYNLPH GVCNAILLPH VCRFNLIARK    300
ERFAEIAVAL GEKTDSLSVD EAAEKAITAI ERLAAQLNIP KGFKELGAKE EDIEILAQHA    360
MQDACAATNP RKPTQKEVEA IIKAAM                                        386
```

```
SEQ ID NO: 21          moltype = AA  length = 402
FEATURE                Location/Qualifiers
source                 1..402
                       mol_type = protein
                       organism = Lysinibacillus sphaericus
SEQUENCE: 21
MSDVLKQFVM PKKNLFGPGA IQEVGKHLND LEVKKTLIVT DEGLHKLGLS EQIANIITAA    60
GIDVAIFPKA EPNPTDQNIE DGIADYHAES CDSIVSLGGG SAHDAAKGIG LIASNGGRIQ   120
DYEGVDKSQN PLVPLIAINT TAGTASEMTR FTIITDTARK VKMAIVDKHV TPLLSINDSE   180
LMIGLPPALT AATGVDALTH AIESFVSTNA TPITDACAEK VLQLVPEFLP RAYANGDALE   240
AREQMVYAQF LAGMAFNNAS LGYVHAIAHQ LGGYYNLPHG VCNAILLPHV CRFNVTARTE   300
RFARIAELLG ENVTGLSKRD AAEKAISAIE KLSKDLNIPS GFRELGAKDE DIEILAKNAM   360
LDVCAETNPR KATLDDIKQI ITNAMGPIVK KEESLEAVAA LS                      402

SEQ ID NO: 22          moltype = AA  length = 386
FEATURE                Location/Qualifiers
source                 1..386
                       mol_type = protein
                       note = LMG 9581
                       organism = Bacillus azotoformans
SEQUENCE: 22
MANQKVYGFF MPTVNLMGVG AVNEAGPRIK ALGCNKSLLV TDKGLSKMGV AEEIANIIGQ    60
AGVEVSIFDG AEPNPTDLNV EAGLKQYREL GCDSIISLGG GSSHDCAKGI GLVASNGGTI   120
HDYEGVDMSK EPMIPLVAIN TTAGTASEMT RFCIITDTSR KIKMAIVDKH TTPLISINDP   180
ILTVKMPAGL TAATGMDALT HAIEAYVSTD ATPITDACAL QTIRLVSQNL RAAVANGEDI   240
DARNNMCYAQ FLGGMAFNNA SLGYVHAIAH QLGGFYNLPH GVCNAVLLPH VERFNLIAKP   300
ERFVDIAIAL GENVSGLPTR AAAEIALTAI ETLAKDVGIP GSLTELGVKE EDIPLLAENA   360
MRDACSFTNP RKATLDDVQG MIRAAL                                        386

SEQ ID NO: 23          moltype = AA  length = 386
FEATURE                Location/Qualifiers
source                 1..386
                       mol_type = protein
                       note = E264
                       organism = Burkholderia thailandensis
SEQUENCE: 23
MANQKVYGFF MPTVNLMGVG AVNEAGPRIK ALGCNKSLLV TDKGLSKMGV AEEIANIIGQ    60
AGVEVSIFDG AEPNPTDLNV EAGLKQYREL GCDSIISLGG GSSHDCAKGI GLVASNGGTI   120
HDYEGVDMSK EPMIPLVAIN TTAGTASEMT RFCIITDTSR KIKMAIVDKH TTPLISINDP   180
ILTVKMPAGL TAATGMDALT HAIEAYVSTD ATPITDACAL QTIRLVSQNL RAAVANGEDI   240
DARNNMCYAQ FLGGMAFNNA SLGYVHAIAH QLGGFYNLPH GVCNAVLLPH VERFNLIAKP   300
ERFVDIAIAL GENVSGLPTR AAAEIALTAI ETLAKDVGIP GSLTELGVKE EDIPLLAENA   360
MRDACSFTNP RKATLDDVQG MIRAAL                                        386

SEQ ID NO: 24          moltype = AA  length = 390
FEATURE                Location/Qualifiers
source                 1..390
                       mol_type = protein
                       note = N-1
                       organism = Cupriavidus necator
SEQUENCE: 24
MTHLNIANRV DSFFIPCVTL FGPGCARETG ARARSLGARK ALIVTDAGLH KMGLSEVVAG    60
HIREAGLQAV IFPGAEPNPT DVNVHDGVKL FEREECDFIV SLGGGSSHDC AKGIGLVTAG   120
GGHIRDYEGI DKSTVPMTPL ISINTTAGTA AEMTRFCIIT NSSNHVKMAI VDWRCTPLIA   180
IDDPSLMVAM PPALTAATGM DALTHAIEAY VSTAATPITD ACAEKAIVLI AEWLPKAVAN   240
GDSMEARAAM CYAQYLAGMA FNNASLGYVH AMAHQLGGFY NLPHGVCNAI LLPHVSEFNL   300
IAAPERYARI AELLGENIGG LSAHDAAKAA VSAIRTLSTS IGIPAGLAGL GVKADDHEVM   360
ASNAQKDACM LTNPRKATLA QVMAIFAAAM                                    390

SEQ ID NO: 25          moltype = AA  length = 393
FEATURE                Location/Qualifiers
source                 1..393
                       mol_type = protein
                       note = uncultured organism
                       organism = unidentified
SEQUENCE: 25
MSLVNYLQLA DRTDGFFIPS VTLVGPGCVK EVGPRAKMLG AKRALIVTDA GLHKMGLSQE    60
IADLLRSEGI DSVIFAGAEP NPTDINVHDG VKVYQKEKCD FIVSLGGGSS HDCAKGIGLV   120
TAGGGHIRDY EGVDKSKVPM TPLIAINTTA GTASEMTRFC IITNTDTHVK MAIVDWRCTP   180
LVAIDDPRLM VKMPPALTAA TGMDALTHAV EAYVSTAATP ITDTCAEKAI ELIGQWLPKA   240
VANGDWMEAR AAMCYAQYLA GMAFNNASLY YVHAMAHQLG GFYNLPHGVC NAILLPHVCQ   300
FNLIAATERY ARIAALLGVD TSGMETREAA LAAIAAIKEL SSSIGIPRGL SELGVKAADH   360
KVMAENAQKD ACMLTNPRKA TLEQVIGIFE AAM                                393

SEQ ID NO: 26          moltype = AA  length = 387
FEATURE                Location/Qualifiers
source                 1..387
                       mol_type = protein
                       note = Bem
```

```
                        organism = Geobacter bemidjiensis
SEQUENCE: 26
MALGEQTYGF YIPTVSLMGI GSAKETGGQI KALGASKALI VTDKGLSAMG VADKIKSQVE   60
EAGVSAVIFD GAEPNPTDIN VHDGVKVYQD NGCDAIISLG GGSSHDCAKG IGMVIGNGGH  120
IRDLEGVNKT TKPMPAFVAI NTTAGTASEM TRFCIITNTD THVKMAIVDW RCTPNVAIND  180
PLLMVGKPAA LTAATGMDAL THAVEAYVST IATPITDACA IKAIELIAEF LSKAVANGED  240
LEARDKMAYA EYLAGMAFNN ASLGYVHSMA HQLGGFYNLP HGVCNAILLP AVSQYNLIAC  300
PKRFADIAKA LGENIDGLSV TEAGQKAIDR IRTLSASIGI PTGLKALNVK EADLTIMAEN  360
AKKDACQFTN PRKATLEQVV QIFKDAM                                     387

SEQ ID NO: 27           moltype = AA  length = 383
FEATURE                 Location/Qualifiers
source                  1..383
                        mol_type = protein
                        note = Z-2901
                        organism = Carboxydothermus hydrogenoformans
SEQUENCE: 27
MKTYRFYMPP VSLMGIGCLK EAGEEIKKLG FKKALIVTDK VLVKIGLVNK LTEILDNEGI   60
EYVIFDETKP NPTVKNVEDG LKMLKENNCD FLISFGGGSP HDCAKGIGLV ATNGGSIKDY  120
EGVNKSAKPM LPLVAVNTTA GTASEMTRFS IITDEDRHVK MAIVDWHVTP IMAVNDPELM  180
VEMPKALTAA TGMDALTHAI EAYVSIDATP VTDAAALKAI ELIFKYLKRA VENGKDIEAR  240
DKMAYAEYLA GVAFNNAGLG YVHAMAHQLG GFYDLPHGVC NAVLLPHVQA YNLQVVPERF  300
IDIAKAMGIN VENLTAKEAG EKVLEAIKNL SREIGIPSGL KELGVKEEDL KTLAENALKD  360
ACGFTNPKQA SLDDIIRIFK EAM                                         383

SEQ ID NO: 28           moltype = AA  length = 385
FEATURE                 Location/Qualifiers
source                  1..385
                        mol_type = protein
                        note = 130Z
                        organism = Actinobacillus succinogenes
SEQUENCE: 28
MSTYYFLPTR NVFGENAVEE VGTLMKSLGG NNPLIVTDAF LAKNGMADQL AAVLSNAGLK   60
PVIFGGAEPN PTDKNVEEGI VFYNEHGCDS IISLGGGSSH DCAKGIGLIA SNGGRIQDYE  120
GVDRSHNAMV PLMAVNTTAG TASEITRFCI ITDTARKVKM AIVDWRITPQ IAVNDPLLMK  180
GMPPSLTAAT GMDALTHAIE AYVSTAANPL TDAALMAIT MIQQYLPKAV ANGDYMKARD  240
KMAYAQYLAG IAFNNASLGY VHAMAHQLGG FYNLPHGVCN AILLPYVEEF NLIGNLRFR  300
DIAKAMGENI DGLCTDDAAL KAIGAIRRLS KQVGIPANLQ LLGVKPEDFD VMAENAMKDV  360
CMLTNPRKAT KQQVIEIFQR AYDGD                                       385

SEQ ID NO: 29           moltype = AA  length = 390
FEATURE                 Location/Qualifiers
source                  1..390
                        mol_type = protein
                        note = Naval-82
                        organism = Acinetobacter baumannii
SEQUENCE: 29
MAFKNIADQT NGFYIPCVSL FGPGCAKEIG TKAQNLGAKK ALIVTDEGLF KFGVADLIAS   60
YLTEAGVASH IFPGAEPNPT DINVHNGVNA YNENGCDFIV SLGGGSSHDC AKGIGLVTAG  120
GGHIRDYEGI DKSKVPMTPL IAVNTTAGTA SEMTRFCIIT NTDTHVKMAI VDWRCTPLIA  180
IDDRMIAK PAGLTAATGM DALTHAVEAY VSTAANPITD ACAEKAITMI SQWLQPAVAN  240
GENIEARDAM SYAQYLAGMA FNNASLGYVH AMAHQLGGFY NLPHGVCNAI LLPHVCEFNL  300
IACPDRYAKI AELMGVNTHG LTVTEAAYAA IDAIRKLSSL IGIPSGLTEL GVKTEDLAVM  360
AENAQKDACM LTNPRKANHA QVVEIFKAAL                                  390

SEQ ID NO: 30           moltype = AA  length = 385
FEATURE                 Location/Qualifiers
source                  1..385
                        mol_type = protein
                        note = DSM 525
                        organism = Clostridium pasteurianum
SEQUENCE: 30
MRMYDFLAPN VNFMGAGAIK LVGERCKILG GKKALIVTDK FLRNMEDGAV AQTVKYIKEA   60
GIDVAFYDDV EPNPKDTNVR DGLKVYRKEN CDLIVTVGGG SSHDCGKGIG IAATHEGDLY  120
DYAGIETLTN PLPPIVAVNT TAGTGSEVTR HCVITNTKTK IKFVIVSWRN LPLVSINDPI  180
LMIKKPAGLT AATGMDALTH AIESYVSKDA NPVTDALAIQ AIKLIANNLR QAVALGENLE  240
ARENMAYASL LAGMAFNNAN LGYVHAMAHQ LGGLYDMAHG VANAMLLPHV ERYNLISNPK  300
KFADIAEFMG ENIEGLSVME AAEKAIDAMF RLSKDVGIPA SLKEMGVNEG DFEYMAKMAL  360
KDGNAFSNPR KGNEKDIVKI FREAF                                       385

SEQ ID NO: 31           moltype = AA  length = 386
FEATURE                 Location/Qualifiers
source                  1..386
                        mol_type = protein
                        note = Tuc01
                        organism = Methanosarcina mazei
SEQUENCE: 31
MIEKMTYTYL NPKIALMGPG CVNGIGTHAK DLGGTKALIV SGKSRHGKEL AADIRRILER   60
AGIEAAIFPG ADPNPTDTSV MEGADIYRKE NCNMIVAVGG GSPMDCAKAI GIVVYNGGRI  120
```

```
NDYEGVGKVT RGIPPLITVN TTAGTASEMT SFTIITDTER HIKMAIVDPR ITPDVAVNDP  180
ELMVSMPPAL TAATGMDALT HAVEAYVSTM ATPTTDAAAI KAIELISKYL PEAVLHGEDI  240
RARDMMAHAE YLAGIAFNNA SLGYVHSMAH QLGGFYDLPH GVCNAILLPY VEMYNKQVCP  300
ERFADIAKAM GEKVEGLSPE EAADKAIEAI KKLAAEIGIP SGLKELGARE EDLELLAENA  360
MQDVCRLTNP RELSKEDIIE IYRKAL                                      386

SEQ ID NO: 32          moltype = AA  length = 393
FEATURE                Location/Qualifiers
source                 1..393
                       mol_type = protein
                       note = str. 'Miyazaki F'
                       organism = Desulfovibrio vulgaris
SEQUENCE: 32
MAVQEQVYGF FIPSVTLIGI GASKAIPEKI KALGGSKPLI VTDMGIVKAG ILKQITDLLD  60
AAKMAYSVYD ETIPNPTDDN VHKGVEVYKK NKCDSLITLG GGSSHDCGKG IGLVIANGGK  120
IHDFEGVDKS FKPMPPYVAV NTTAGTASEM TRFCIITDTS RKVKMAIVDW RVTPSIALDD  180
PLLMMGMPPA LTAATGMDAL THAVEAYVST IATPMTDACA EQAITLIATF LRRAVANGRD  240
IEARERMCFA QYLAGMAFNN ASLGHVHAMA HQLGGFYDLP HGECNAILLP HVSQFNLIAK  300
LDRFARIAEL MGENISGLSV RDAAEKAICA IKRLSADVGI PAGLVALGKR YGKDVKAKDI  360
AIMTKNAQKD ACGLTNPRCP TDADVAAIYE AAM                               393

SEQ ID NO: 33          moltype = AA  length = 393
FEATURE                Location/Qualifiers
source                 1..393
                       mol_type = protein
                       note = str. Walvis Bay
                       organism = Desulfovibrio africanus
SEQUENCE: 33
MAVREQVYGF FIPSVTLIGI GASKEIPNKI RDLGGKKPLI VTDQGIVKAG ILKMITDHMD  60
KAGMQYSVYD KTIPNPTDNN VAEGVEVYKK EGCDSLITLG GGSSHDCGKG VGLVVSNGGK  120
IHDYEGVDKS TKPLPPYVAV NTTAGTASEM TRFCIITDTS RKVKMAIVDW RVTPGIALDD  180
PLLMVGMPPA LTAATGMDAL THAVEAYVST IATPMTDACA EKAISLIFTF LRRATANGQD  240
IEAREGMCFA QYLAGMAFNN ASLGHVHAMA HQLGGFYDLP HGECNAILLP HVEKYNLIAK  300
VERFGKMAEI MGENIQGMSP RAAAEKCLDA IRQLSQDVGI PSGLIELGKR YGKNVKKEDI  360
DTMTGNAQKD ACGFTNPRCP SDKDVKAIYE AAL                               393

SEQ ID NO: 34          moltype = AA  length = 385
FEATURE                Location/Qualifiers
source                 1..385
                       mol_type = protein
                       note = str. 13
                       organism = Clostridium perfringens
SEQUENCE: 34
MRMYDYLVPS VNFMGANSIS VVGERCKILG GKKALIVTDK FLRGLKGGAV ELTEKYLKEA  60
GIEVAYYDGV EPNPKDTNVK DGLKIFQDEN CDMIVTVGGG SSHDCGKGIG IAATHEGDLY  120
DYAGIETLTN PLPPIVAVNT TAGTASEVTR HCVITNTKTK VKFVIVSWRN LPLVSINDPM  180
LMVGKPAGLT AATGMDALTH AVEAYVSKDA NPVTDAAAIQ AIKLISSNLR QAVALGENLV  240
ARENMAYGSL LAGMAFNNAN LGYVHAMAHQ LGGLYDMPHG VANAMLLPHV CKYNLISNPQ  300
KFADIAEFMG ENIEGLSVMD AAQKAIDAMF RLSTDIGIPA KLRDMGVKEE DFGYMAEMAL  360
KDGNAFSNPR KGNERDIVEI FKAAF                                       385

SEQ ID NO: 35          moltype = AA  length = 382
FEATURE                Location/Qualifiers
source                 1..382
                       mol_type = protein
                       note = ATCC BAA-1116
                       organism = Vibrio campbellii
SEQUENCE: 35
MTSAFFIPTV NLMGAGCLKD ATDSIQSQGF KKGLIVTDKI LNQIGVVKQV QDLLAERDVE  60
TVVFDGTQPN PTISNVNDGL ALLTDNECDF VISLGGGSPH DCAKGIALVA SNGGKIADYE  120
GVDQSAKPMM PLIAINTTAG TASEMTRFCI ITDEERHIKM AIVDKHTTPL ISVNDPELML  180
AKPASLTAAT GMDALTHAIE AYVSIAATPI TDAVAIKAIE LIQAYLRTAV KNGEDLEARE  240
QMAYAQFMAG MAFNNASLGY VHAMAHQLGG FYDLPHGVCN AILLPHVQRY NAQVCPERLR  300
DVAKAMGVNV EDMSAEAGAA AAIDAIVTLA KDVGIPAGIK ELGAKLEDIP TLADNALKDA  360
CGFTNPKQAT HEEISKIFEE AM                                          382

SEQ ID NO: 36          moltype = AA  length = 388
FEATURE                Location/Qualifiers
source                 1..388
                       mol_type = protein
                       note = MI-1
                       organism = Desulfotomaculum reducens
SEQUENCE: 36
MTVGEQVFGY FIPTVNLMGV GAHKEIPDQV KVLGGSNVLI VTDAFLGRPG GMADDIKGML  60
EAENIKVTIY AGAEPNPTDV NVHDGLKVYQ ECGADMILSL GGGSSHDCAK GIGIVATNGG  120
NIRDYEGINK SSKAMPPFIA VNTTAGTASE MTRFCIITNT SNHVKMAIVD WRCTPNIAIN  180
DPLLMAGMPP ALTAATGMDA LTHAIEAYVS VAATPVTDSA ALMAIKLISQ YLRAAVANGE  240
NMEARDKMAY AEFLGGMAFN NASLGYVHAM AHQLGGFYNL PHGVCNAILL PHVEAFNLIA  300
CPERFVDIAV AMGENVEGLS VRDAADKALS AIRKLSADVG IPAGLTELGV KEEDLKTMAE  360
```

```
NAMKDACALT NPRKATLNDI VGIYKTAL                                              388

SEQ ID NO: 37           moltype = AA  length = 393
FEATURE                 Location/Qualifiers
source                  1..393
                        mol_type = protein
                        note = str. Hildenborough
                        organism = Desulfovibrio vulgaris
SEQUENCE: 37
MAVQEQVYGF FIPRVTLIGI GASKAIPEKI KALGGSKPLI VTDMGIVKAG ILKQITDLLD            60
AAKMAYSVYD ETIPNPTDDN VHKGVDVYKK NKCDSLITLG GGSSHDCGKG IGLVVANGGK           120
IHDFEGVDKS TQRMPPYLAV NTTAGTASEM TRFCIITDTS RKVKMAIVDW RVTPNIALDD           180
PLLMLGMPPA LTAATGMDAL THAVEAYVST IATPMTDACA EQAITLIATF LRRAVANGQD           240
LEARERMCFA QYLAGMAFNN ASLGHVHAMA HQLGGFYDLP HGECNAILLP HVSKFNLIAK           300
LDRYARIAQL MGENIAGLST REAAERAISA IKCLSTDVGI PAGLVALGKR YGKDVKAADI           360
AIMTKNAQKD ACGLTNPRCP TDADVAAIYE AAL                                        393

SEQ ID NO: 38           moltype = AA  length = 382
FEATURE                 Location/Qualifiers
source                  1..382
                        mol_type = protein
                        note = 3TCK
                        organism = Photobacterium profundum
SEQUENCE: 38
MSSAFFIPSV NLMGAGCLTE AADAVKAHGF KKALIVTDKV LNQIGVVKQV VDLLAERNVE            60
AVVFDGTQPN PTMGNVEAGL ALLKANECDF VISLGGGSPH DCAKGIALVA SNGGSISDYE           120
GVDVSAKPQL PLVAINTTAG TASEMTRFCI ITDEARHIKM AIVDKNTTPL MSVNDPELML           180
AKPASLTAAT GMDALTHAIE AYVSTAATPI TDAVAIKAME LIQAHLRTAV NDGQNLEARE           240
QMAYAQFMAG MAFNNASLGY VHAMAHQLGG FYDLPHGVCN AVLLPHVQRY NAKVCPERLR           300
DVAKAMGVNV EAMTADQGAD AALEAIQVLS KDVGIPAGLK DLGAKNEDIS ILADNALKDA           360
CGFTNPKQAT HEEISEIFAA AM                                                    382

SEQ ID NO: 39           moltype = AA  length = 384
FEATURE                 Location/Qualifiers
source                  1..384
                        mol_type = protein
                        note = Y4.1MC1
                        organism = Geobacillus sp.
SEQUENCE: 39
MSNAHVFYVP STNLMGRGCL AKVGPFIKEF GFKKALVVTD KFLHKSGIAG KVLAVLDEIG            60
VNYVVYDDVK PNPTTKNVYA GADLFKKNEC DFLSVGGGS PQDTAKAIGL YVTNGGDIRD           120
YEGVNKTKNK SVPIVAVNTT AGTSSEFTIN YVITDEERNV KMVMVDKNSL VTISVNDPEL          180
MVDKPAALTA ATGMDALTHA IEAVVTPGSY TVTDATALAA IEIIFNYLPR AVKNGHDIEA          240
REQMAYAMFL VGIAFNNAGL GMVHAMAHQL GGMYDLPHGV CNAMLLPIVE RENAKRDPRK          300
FRAIAKAAGI DVTGKTDEQC AEEVIEAIKA LSREIGIPSK LSELGVDEVD LEKLANNALK          360
DACAPGNPFQ PTKEEVISMF KEIL                                                 384

SEQ ID NO: 40           moltype = AA  length = 393
FEATURE                 Location/Qualifiers
source                  1..393
                        mol_type = protein
                        note = JJ
                        organism = Desulfovibrio fructosovorans
SEQUENCE: 40
MAVREQVYGF FIPSVTLIGI GAAKQIPEKI KALGGTKPLI VTDKGVVKVG VCKMITDLLD            60
AAGMKYHIYD ETIPNPTDEN VHKGVEVYKK EGCDSLITLG GGSSHDCGKG IGLVISNGGK           120
IHDYEGVDKS SKPFMPYLAV NTTAGTASEM TRFCIITDLS RHVKMAIVDW RVTPHIAIDD           180
PVLMVGMPPA LTASTGMDAL THAVEAFVST IANPMTDACA IEAIKLIFKY LRKAVANGQD           240
MEAREGMCFA EYLAGMAFNN ASLGHVHAMA HQLGGFYDLP HGECNAILLP HVESYNLIAK           300
VEKFAEMAKI MGENIEGMAP RDAAELCLKA IRQLSVDVGI PAGLVELGKR YGKDVKAADI           360
PTMTGNAQKD ACGLTNPRCP TDKDVAAIYT AAL                                        393

SEQ ID NO: 41           moltype = AA  length = 382
FEATURE                 Location/Qualifiers
source                  1..382
                        mol_type = protein
                        note = MR-1
                        organism = Shewanella oneidensis
SEQUENCE: 41
MAAKFFIPSV NVLGKGAVDD AIGDIKTLGF KRALIVTDKP LVNIGLVGEV AEKLGQNGIT            60
STVFDGVQPN PTVGNVEAGL ALLKANQCDF VISLGGGSPH DCAKGIALVA TNGGSIKDYE           120
GLDKSTKPQL PLVAINTTAG TASEMTRFCI ITDEARHIKM AIVDKHTTPI LSVNDPELML           180
KKPASLTAAT GMDALTHAVE AYVSIAANPI TDACAIKAIE LIQGNLVNAV KQGQDIEARE           240
QMAYAQFLAG MAFNNASLGY VHAMAHQLGG FYDLPHGVCN ALLLPHVQEY NAKVCPHRLK           300
DIAKAMGVDV AKMTDEQGAA AAITAIKTLS VAVNIPENLT LLGVKAEDIP TLADNALKDA           360
CGFTNPKQAT HAEICQIFTN AL                                                    382

SEQ ID NO: 42           moltype = AA  length = 384
FEATURE                 Location/Qualifiers
```

```
source                   1..384
                         mol_type = protein
                         note = ATCC 33386
                         organism = Sebaldella termitidis
SEQUENCE: 42
MKVSRRIYWP AVTLIGPGCV KEIGGDIKDL GLKKALVVTD NVLVKIGVVK KVTDVLDESG    60
INYVVVDDIQ PNPTMKNIHD GLNTYKSENC DFVISIGGGS PQDAGKAIGL LATNGGEIKD   120
YEGINMSKHK SVPIIAINTT AGTASEVTIN YVITNEDTHI KMVMVDKNCL ASIAVSDPEL   180
MTGKPADLTA ATGMDALTHA IEAYVSTGAY ELTDVLALEA VKLIGESLED AVKDGNNIEA   240
RSKMAYASYI AGMSFNNAGL GYVHSMAHQL GGFYNLPHGV CNAILLPHVE KFNSANTGDK   300
LRKVAEILGE NVEGLSVEEA NAKAIEAIMK LSERVGIPKG LKELGVKEED FKVMAENALK   360
DVCAGTNPRE VTLEDTIALY KEAL                                         384

SEQ ID NO: 43            moltype = AA  length = 384
FEATURE                  Location/Qualifiers
source                   1..384
                         mol_type = protein
                         note = KCTC 3763
                         organism = Paenibacillus peoriae
SEQUENCE: 43
MTGTSKFMMP GMSLMGSGAL ADAGTEIGKL GYTNALIVTD KPLVDIGIVK KVTSVLESIN    60
VKSVVYSGTQ PNPTVTNVNE GLELLSQSKC DFIISLGGGS PHDCAKGIAL LASNGGQIGD   120
YEGVDKSTKP SFPLIAINTT AGTASEMTMF CIITDEERHI KMAIVDNHTT PLIAVNDPDL   180
MMAMPKSLTA ATGMDALTHS IEAYVSTNAT PITDACAIKA IELIRDNLAR AVDDGNDVEA   240
RSQMAYAEFL AGMAFNNAGL GFVHAMAHQL GGFYNLPHGV CNAILLPHVE RYNAKASAER   300
LTDIARALGE NTDGVTPEQG ANLALQAIEK LAKRVNIPSG LEELGVKRED FTVLAANALK   360
DACGVTNPVQ PTQQEVIAIF EQAM                                         384

SEQ ID NO: 44            moltype = AA  length = 387
FEATURE                  Location/Qualifiers
source                   1..387
                         mol_type = protein
                         note = subsp. pneumoniae MGH 78578
                         organism = Klebsiella pneumoniae
SEQUENCE: 44
MSYRMFDYLV PNVNFFGPNA ISVVGERCQL LGGKKALLVT DKGLRAIKDG AVDKTLHYLR    60
EAGIEVAIFD GVEPNPKDTN VRDGLAVFRR EQCDIIVTVG GGSPHDCGKG IGIAATHEGD   120
LYQYAGIETL TNPLPPIVAV NTTAGTASEV TRHCVLRTTE TKVKFVIVSW RNLPSVSIND   180
PLLMIGKPAA LTAATGMDAL THAVEAYISK DANPVTDAAA MQAIRLIARN LRQAVALGSN   240
LQARENMAYA SLLAGMAFNN ANLGYVHAMA HQLGGLYDMP HGVANAVLLP HVARYNLIAN   300
PEKFADIAEL MGENITGLST LDAAEKAIAA ITRLSMDIGI PQHLRDLGVK EADFPYMAEM   360
ALKDGNAFSN PRKGNEQEIA AIFRQAF                                      387

SEQ ID NO: 45            moltype = AA  length = 383
FEATURE                  Location/Qualifiers
source                   1..383
                         mol_type = protein
                         organism = Escherichia coli
SEQUENCE: 45
MAASTFFIPS VNVIGADSLT DAMNMMADYG FTRTLIVTDN MLTKLGMAGD VQKALEERNI    60
FSVIYDGTQP NPTTENVAAG LKLLLKENNCD SVISLGGGSP HDCAKGIALV AANGGDIRDY   120
EGVDRSAKPQ LPMIAINTTA GTASEMTRFC IITDEARHIK MAIVDKHVTP LLSVNDSSLM   180
IGMPKSLTAA TGMDALTHAI EAYVSIAATP ITDACALKAV TMIAENLPLA VEDGSNAKAR   240
EAMAYAQFLA GMAFNNASLG YVHAMAHQLG GFYNLPHGVC NAVLLPHVQV FNSKVAAARL   300
RDCAAAMGVN VTGKNDAEGA EACINAIREL AKKVDIPAGL RDLNVKEEDF AVLATNALKD   360
ACGFTNPIQA THEEIVAIYR AAM                                          383

SEQ ID NO: 46            moltype = AA  length = 382
FEATURE                  Location/Qualifiers
source                   1..382
                         mol_type = protein
                         note = ATCC 13124
                         organism = Clostridium perfringens
SEQUENCE: 46
MSYKFFMPAI SLMGADCLKD AGDQVGELGF KKALIVTDKV LGQIGIVKKV TDVLDNKNIE    60
YAIYDETKPN PTVKNVNDGL ALLKEKECDF VISLGGGSAH DCAKGIALLA TNGGEIKDYE   120
GVDKSKKPQL PMVGINTTAG TGSEMTLFAI ITDEERHIKM ALVDKHLTPI IAVNDPILML   180
AMPKSLTAAT GMDALTHAIE AYVSTAATPI TDACAEKAIE LISNYLVNAV ENGGQDVEARD  240
MMAYAEYLAG MAFNNASLGY VHAMAHQLGF FYNLPHGVCN AILLPHVQEY NKSTSASRLA   300
KIAKIMGGNI EGLTDEQGAD LCIDMIKSLS QTIGIPEGLG VLGVKESDFE TLATNALNDA   360
CSLTNPRKGN LEEVIAIFKK AM                                           382

SEQ ID NO: 47            moltype = AA  length = 366
FEATURE                  Location/Qualifiers
source                   1..366
                         mol_type = protein
                         note = H16
                         organism = Ralstonia eutropha
SEQUENCE: 47
```

```
MRARPARAPK RKAQERPSSS RMPACTRWGY PKPSRGTSAR QGFRPLIFPG AEPNPTDVNV    60
HDGVKLFEQE GCDFIVSLGG GSSHDCAKGI GLVTAGGGHI RDYEGIDKST VPMTPLISIN   120
TTAGTAAEMT RFCIITNSSN HVKMAIVDWR CTPLIAIDDP RLMVAMPPAL TAATGMDALT   180
HAVEAYVSTA ATPITDACAE KAIALIGEWL PKAVANGNSL EARAAMCYAQ YLAGMAFNNA   240
SLGYVHAMAH QLGGLYNLPH GVCNAILLPH VSEFNLIAAP ERFAKIAELL GENVASLSTS   300
DAAKAAISAI RALAASIGIP AGLASLGVKA EDHEVMAHNA QKDACMLTNP RRATTAQVIA   360
IFAAAM                                                             366

SEQ ID NO: 48           moltype = AA   length = 389
FEATURE                 Location/Qualifiers
source                  1..389
                        mol_type = protein
                        note = X514
                        organism = Thermoanaerobacter sp.
SEQUENCE: 48
MKIFKFHMPP INLIGVGCLK DVGREIKKLG FKKGIIVTDK VLVRAGLVNN VISVLEEEGI    60
EYVVFDETKP NPTIKNVTNG LKLLIENKCD FIISCGGGSA HDCAKGIGLI AKEKNFIDEV   120
ERLDKVKCGG WNSALLLPLV AINTTAGTGS EVTKFAIITD EEKRIKMPIV DWRITPLIAV   180
NDPLLMIGMP KSLTAASGMD ALTHAIEAYI SIDANPFTDA LALKAIEIIF NYLKRAVENG   240
NDIEAREKMA YAEFLAGIAF NNAGLGYVHA MAHQLGGFYD LPHGVCNAVL LPHVLEYNLE   300
AVQNKLIYIA KAMGIDVDKL TTKEIGGKII ESINQLSQEI GIPSRLKELG VKEEDIKELS   360
QNALKDVCGF TNPKKATLED IINIFKSAM                                    389

SEQ ID NO: 49           moltype = AA   length = 384
FEATURE                 Location/Qualifiers
source                  1..384
                        mol_type = protein
                        note = human gut metagenome
                        organism = unidentified
SEQUENCE: 49
MGNRIILNGT SYFGRGAREN VITELRNRNF TKALVVTDKN LLDAHVTNLV TDVLDKNDFS    60
YQIYSDIKPN PTTLNVQEGV TFCRNSKADV IIAVGGGSAI DTAKAISIIM TNPEHFDVIS   120
LDGAVETKNA GMPIIALPTT AGTAAEVTIN YVITNPVGPK KMVCVDPHDI PIVAIIDQDL   180
MEKMPKSLAA STGMDALTHA MEGYTTKAAW LMTDMFHLNA MALIYKNLEK AVNLKDRDAI   240
DNVGYGQYIA GMGFSNVGLG IVHSMAHSLG AFFDTPHGLA NALLLPHVLK FNGKICPDLF   300
RNMGRAMGLD MDNLTDDEAV DKVVDAVRSL AIKIGIPQTL KEIGIKKEDL PMLAHQAIDD   360
VCTAGNPRNV TEQDILALYQ EAYE                                         384

SEQ ID NO: 50           moltype = AA   length = 387
FEATURE                 Location/Qualifiers
source                  1..387
                        mol_type = protein
                        note = NG80-2
                        organism = Geobacillus themodenitrificans
SEQUENCE: 50
MQNFTFRNPT KLIFGRGQIE QLKEEVPKYG KKVLLVYGGG SIKRNGLYDE VMSLLTDIGA    60
EVVELPGVEP NPRLSTVKKG VDICRREGIE FLLAVGGGSV IDCTKAIAAG AKFDGDPWEF   120
ITKKATVTEA LPFGTVLTLA ATGSEMNAGS VITNWETKEK YGWGSPVTFP QFSILDPTYT   180
MTVPKDHTVY GIVDMMSHVF EQYFHHTPNT PLQDRMCEAV LKTVIEAAPK LVDDLENYEL   240
RETIMYSGTI ALNGFLQMGV RGDWATHDIE HAVSAVYDIP HAGGLAILFP NWMKHVLDEN   300
VSRFAQLAVR VFDVDPTGKT ERDVALEGIE RLRAFWSSLG APSRLADYGI GEENLELMAD   360
KAMAFGEFGR FKTLNRDDVL AILRASL                                      387

SEQ ID NO: 51           moltype = AA   length = 211
FEATURE                 Location/Qualifiers
source                  1..211
                        mol_type = protein
                        note = PB1
                        organism = Bacillus methanolicus
SEQUENCE: 51
MQLQLALDLV NIEEAKQVVS EVQEYVDIVE IGTPVIKIWG LQAVKAVKDA FPHLQVLADM    60
KTMDAAAYEV AKAAEHGADI VTILAAAEDV SIKGAVEEAK KLGKKILVDM IAIKNLEERA   120
KQVDEMGVDY ICVHAGYDLQ AVGKNPLEDL KRIKAVVKNA KTAIAGGIKL ETLPEVIKAE   180
PDLVIVGGGI ANQTDKKAAA EKINKLVKQG L                                 211

SEQ ID NO: 52           moltype = AA   length = 228
FEATURE                 Location/Qualifiers
source                  1..228
                        mol_type = protein
                        organism = Methylobacillus flagellatus
SEQUENCE: 52
MAKPLVQMAL DSLDFDQTVA LATTVAPHVD ILEIGTPCIK YNGIKLLETL RAKFPNNKIL    60
VDLKTMDAGF YEAEPPYKAG ADIVTVLGTA DIGTIKGVID VANKYGKKAQ VDLINVTKDA   120
ARTKEVAKLG AHIIGVHTGL DQQAAGQTPF ADLNLVSSLN LGVDISVAGG VKATTAKQVV   180
DAGATIVVAG AAIYGAADPA AAAAEISAAA KGTQSSGGLF GWLKKLFS                228

SEQ ID NO: 53           moltype = AA   length = 210
FEATURE                 Location/Qualifiers
source                  1..210
```

```
                         mol_type = protein
                         organism = Bacillus subtilis
SEQUENCE: 53
MELQLALDLV NIPEAIELVK EVEQYIDVVE IGTPVVINEG LRAVKEIKEA FPQLKVLADL    60
KIMDAGGYEI MKASEAGADI ITVLGATDDA TIKGAVEEAK KQKKKILVDM INVKDIESRA   120
KEIDALGVDY ICVHTGYDLQ AEGKNSFEEL TTIKNTVKNA KTAIAGGIKL DTLPEVIQQK   180
PDLVIVGGGI TSAADKAETA SKMKQLIVQG                                    210

SEQ ID NO: 54            moltype = AA   length = 293
FEATURE                  Location/Qualifiers
source                   1..293
                         mol_type = protein
                         organism = Methylophilus methylotrophus
SEQUENCE: 54
MAQTQMALDS LDFDATIALA AKVAPHVDIL EIGTPCIKHN GIELLKALRS KFPNNKILVD    60
LKTMDAGFYE AEPFYKAGAD ICTVLGTADI GTIKGVIDAA NKYGKEAQID LINVKDKKAR   120
TLEVVKLGAH IIGVHTGLDQ QAAGQTPFAD LGLVSGLKTG AKVSVAGGVK AATTKQVVDA   180
GADIVVGAAA IYGAADPAAA ANEITKIAHG SGAAAKGGNK VLLPWIIAAVA AVLVFSLLGK   240
KSEEAAPAAE APAAEEAAPA EAAPAAEAPA AEEAAPAEAA PAEEAAPATE GAN           293

SEQ ID NO: 55            moltype = AA   length = 210
FEATURE                  Location/Qualifiers
source                   1..210
                         mol_type = protein
                         organism = Methylophilus methylotrophus
SEQUENCE: 55
MALTQMALDS LDFDATIALA EKVAPHVDIL EIGTPCIKHN GIKLLETLRA KFPNNKILVD    60
LKTMDAGEYE SEPFYKAGAD ICVVLGVSDI GTIKGVIKAA NKYGKKAQVD LISVEDKVAR   120
TKEVAAAGAH IIGIHTGLDQ QAAGQTPFAD LAAVAGLNLG VDISVAGGVK AATAAQVRDA   180
GATIIVAGAA IYGAADPAAA AAEITAIAHA                                    210

SEQ ID NO: 56            moltype = AA   length = 184
FEATURE                  Location/Qualifiers
source                   1..184
                         mol_type = protein
                         note = PB1
                         organism = Bacillus methanolicus
SEQUENCE: 56
MLTTEFLSEI VKELNSSVNQ IADEEAEALV NGILQSKKVF VAGAGRSGFM AKSFAMRMMH    60
MGIDAYVVGE TVTPNYEKED ILIIGSGSGE TKGLVSMAQK AKSIGGTIAA VTINPESTIG   120
QLADIVIKMP GSPKDKSEAR ETIQPMGSLF EQTLLLFYDA VILRFMEKKG LDTKTMYGRH   180
ANLE                                                                184

SEQ ID NO: 57            moltype = AA   length = 199
FEATURE                  Location/Qualifiers
source                   1..199
                         mol_type = protein
                         organism = Mycobacterium gastri
SEQUENCE: 57
MTQAAEADGA VKVVGDDITN NLSLVRDEVA DTAAKVDPEQ VAVLARQIVQ PGRVFVAGAG    60
RSGLVLRMAA MRLMHFGLTV HVAGDTTTPA ISAGDLLLVA SGSGTTSGVV KSAETAKKAG   120
ARIAAFTTNP DSPLAGLADA VVIIPAAQKT DHGSHISRQY AGSLFEQVLF VVTEAVFQSL   180
WDHTEVEAEE LWTRHANLE                                                199

SEQ ID NO: 58            moltype = AA   length = 181
FEATURE                  Location/Qualifiers
source                   1..181
                         mol_type = protein
                         note = KT
                         organism = Methylobacillus flagellatus
SEQUENCE: 58
MNKYQELVVN KLTNVINNTA EGYDDKILSM VDAAGRTFLG GAGRSLLVSR FFAMRLVHAG    60
YQVSMVGEVV TPSIQAGDLF IVISGSGSTE TLMPLVRKAK SQGAKVIVIS MKAQSPMAEL   120
ADLVVPIGGN DAHAFDKTHG MPMGTIFELS TLWFLEATIA KLIDQKGLTE EGMRAIHANL   180
E                                                                   181

SEQ ID NO: 59            moltype = AA   length = 185
FEATURE                  Location/Qualifiers
source                   1..185
                         mol_type = protein
                         organism = Bacillus subtilis
SEQUENCE: 59
MKTTEYVAEI LNELHNSAAY ISNEEADQLA DHILSSHQIF TAGAGRSGLM AKSFAMRLMH    60
MGFNAHIVGE ILTPPLAEGD LVIIGSGSGE TKSLIHTAAK AKSLHGIVAA LTINPESSIG   120
KQADLIIRMP GSPKDQSNGS YKTIQPMGSL FEQTLLLFYD AVILKLMEKK GLDSETMFTH   180
HANLE                                                               185

SEQ ID NO: 60            moltype = AA   length = 178
FEATURE                  Location/Qualifiers
```

```
source                  1..178
                        mol_type = protein
                        organism = Methylophilus methylotrophus
SEQUENCE: 60
MDHQQFILDN LKRILDVTDK SKAAELLKLV DEAGSTFIGG AGRSLLVSRF FAMRLVHSGY    60
SVYMIGEVVT PAIKKGDLLI LVSGSGGTAT LLPFVKKAKE VGAKLVVISM KKTSAMADVA   120
DLVIQIGQDD SFPLVKGMPM GGQFELSTLV FLEGAISELI HAKGLTEEGM RALHANLE     178

SEQ ID NO: 61           moltype = AA   length = 185
FEATURE                 Location/Qualifiers
source                  1..185
                        mol_type = protein
                        note = MGA3
                        organism = Bacillus methanolicus
SEQUENCE: 61
MGKLFEEKTI KTEQIFSGRV VKLQVDDVEL PNGQTSKREI VRHPGAVAVI AITNENKIVM    60
VEQYRKPLEK SIVEIPAGKL EKGEDPRVTA LRELEEETGY ECEQMEWLIS FATSPGFADE   120
IIHLYVAKGL SKKENAAGLD EDEFVDLIEL TLDEALQYIK EKRIYDSKTV IAVQYLQLQE   180
ALKHK                                                              185

SEQ ID NO: 62           moltype = AA   length = 207
FEATURE                 Location/Qualifiers
source                  1..207
                        mol_type = protein
                        organism = Mycobacterium gastri
SEQUENCE: 62
MKLQVAIDLL STEAALELAG KVAEYVDIIE LGTPLIEAEG LSVITAVKKA HPDKIVFADM    60
KTMDAGELEA DIAFKAGADL VTVLGSADDS TIAGAVKAAQ AHNKGVVVDL IGIEDKATRA   120
QEVRALGAKF VEMHAGLDEQ AKPGFDLNGL LAAGEKARVP FSVAGGVKVA TIPAVQKAGA   180
EVAVAGGAIY GAADPAAAAK ELRAAIA                                      207

SEQ ID NO: 63           moltype = AA   length = 198
FEATURE                 Location/Qualifiers
source                  1..198
                        mol_type = protein
                        organism = Methylobacillus flagellatus
SEQUENCE: 63
MTAMRNAEVS RNTLETKIAV AINLDGTGIS RLNSGVGFFD HMLDQIARHG MMDISVECQG    60
DLHIDAHHTV EDVGIALGQA FSKALGDKKG IRRYAHAYVP LDEALSRVVL DISGRPGLEF   120
NVEFTRARIG EFDVDLVSEF FQGFVNHAAI TLHIDNLRGK NAHHQAETIF KAFGRALRAA   180
VELDPRMVGI MPSTKGSL                                                198

SEQ ID NO: 64           moltype = AA   length = 228
FEATURE                 Location/Qualifiers
source                  1..228
                        mol_type = protein
                        organism = Aminomonas aminovorus
SEQUENCE: 64
MAKPLVQMAL DSLDFDQTVA LATTVAPHVD ILEIGTPCIK YNGIKLLETL RAKFPNNKIL    60
VDLKTMDAGF YEAEPPFFKAG ADIVTVLGTA DIGTIKGVID VANKYGKKAQ VDLINVVDKA  120
ARTKEVAKLG AHIIGVHTGL DQQAAGQTPF ADLGLVSGLN LGVDISVAGG VKSTTAKQVV   180
DAGATIVVAG AAIYGAADPA AAAEISAAA KGTQSSGGVF GWLKKLFS                 228

SEQ ID NO: 65           moltype = AA   length = 209
FEATURE                 Location/Qualifiers
source                  1..209
                        mol_type = protein
                        note = 239
                        organism = Amycolatopsis methanolica
SEQUENCE: 65
MELQVALDVL DLPAALTLAR QVAEHVDILE LGTPLVKSAG IAAVTAVKAA HPDKQVFVDL    60
KTADAGELEA ALAFEAGADL VTVMGAADDD TVRGAVAAGR KYGKKVVADM ITVTDNRVQR   120
IREVAKLGVA FVEIHAGLDE QARPGYTIDT LLRDGREAGV PFSIAGGIKA DTITAVRDAG   180
ATVAVAGGAI YNAPDPATAA RELKHHATH                                    209

SEQ ID NO: 66           moltype = AA   length = 211
FEATURE                 Location/Qualifiers
source                  1..211
                        mol_type = protein
                        note = GHH01
                        organism = Geobacillus sp.
SEQUENCE: 66
MELQLALDLV NIPEAKQLVK EVEEYVDIVE IGTPVIINEG LRAVKEIKQE FPHLKVLADL    60
KIMDAAAYEV MKASEAGADI ITILGVAEDL SIKGAVEEAK KQGKKILVDM IGVKNLEERA   120
KEVDGFGVDY ICVHTGYDLQ AVGKNSLEDL ATIKRVVKNA KTAIAGGIKL NTLPEVIKAK   180
PDLIIVGGGI TGQEDKRAVA AEMKKMIQQG E                                 211

SEQ ID NO: 67           moltype = AA   length = 211
FEATURE                 Location/Qualifiers
```

```
source                  1..211
                        mol_type = protein
                        note = M10EXG
                        organism = Geobacillus sp.
SEQUENCE: 67
MELQLALDLV NIPEAKKLVK EVEEYVDIVE IGTPAIINEG LRAVKEIKEE FPHLKVLADL    60
KIMDAAAYEV MKASEAGADI ITILGVAEDL SIKGAVEEAK KQGKKILVDM IGVKNLEERA   120
KEVDEFGVDY ICVHTGYDLQ AVGKNSLEDL ATIKRVVKNA KTAIAGGIKL NTLPEVIKAK   180
PDLIIVGGGI TNQEDKRAVA AEMKKMIQQG E                                   211

SEQ ID NO: 68           moltype = AA  length = 211
FEATURE                 Location/Qualifiers
source                  1..211
                        mol_type = protein
                        note = Y4.1MC1
                        organism = Geobacillus sp.
SEQUENCE: 68
MELQLALDLV NIPEAKKLVK EVEEYVDIVE IGTPVIINEG LRAVKEIKEE FPHLKVLADL    60
KIMDAAAYEV MKASEAGADI ITILGVAEDL SIKGAVEEAK KQGKKILVDM IGVKNLEERA   120
KEVDEFGVDY ICVHTGYDLQ AVGKNSLEDL ATIKRVVKNA KTAIAGGIKL NTLPEVIKAK   180
PDLIIVGGGI TNQEDKRAVA AEMKKMIQQG E                                   211

SEQ ID NO: 69           moltype = AA  length = 215
FEATURE                 Location/Qualifiers
source                  1..215
                        mol_type = protein
                        note = NG80-2 HPS
                        organism = Geobacillus thermodenitrificans
SEQUENCE: 69
MYIQLALDRM DINQAIQITQ QVEEYIDWIE VGTSLIKEFG IKSIEAIKRA FPGKMIVADT    60
KTMDNAVYEC NLCFEAGADV MTVMGVAPLM TVEACLKEAS IRGKKVMIDL LNTNESVRQQ   120
LLQYKEAIFC IHVSKDEQEF AQQHKNFNFA HFHRPTGCNL AVAGGISAAT MKQIQPLHPS   180
IVIIGSAITR AEHPERAARE LRQLVRNRGI DDASN                               215

SEQ ID NO: 70           moltype = AA  length = 209
FEATURE                 Location/Qualifiers
source                  1..209
                        mol_type = protein
                        organism = Methylomonas aminofaciens
SEQUENCE: 70
MALTQMALDS LDFDATVALA EKVAPHVDIL EIGTPCIKHN GIKLLETLRA KFPNNKILVD    60
LKTMDAGFYE AEPFYKAGAD ITTVLGVADL GTIKGVIDAA NKYGKKAQID LINVGDKAAR   120
TKEVAKLGAH IIGVHTGLDQ QAAGQTPFAD LATVTGLNLG LEVSVAGGVK PATVAQVKDA   180
GATIIVAGAA IYGAADPAAA AAEITGLAK                                      209

SEQ ID NO: 71           moltype = AA  length = 221
FEATURE                 Location/Qualifiers
source                  1..221
                        mol_type = protein
                        note = SIP3-4
                        organism = Methylovorus glucosetrophus
SEQUENCE: 71
MALDSLDFDA TVALATKVAP HVDILEIGTP CIKYNGIKLL QTLRAKFPNN KILVDLKTMD    60
AGYYEAEPFY KAGADICTVL GTADIGTIKG VIDVANKYGK EAQIDLINVA DKAARTKEVA   120
KLGAHIIGVH TGLDQQAAGQ TPFADLGLVS SLNLGVKVSV AGGIKPATVK QVVDAGANIV   180
VAGAAIYGAA DPAAAAAEIS GLAKGSTSSG GVFGWLKKLF S                        221

SEQ ID NO: 72           moltype = AA  length = 221
FEATURE                 Location/Qualifiers
source                  1..221
                        mol_type = protein
                        note = MP688
                        organism = Methylovorus sp.
SEQUENCE: 72
MALDSLDFDA TVALATKVAP HVDILEIGTP CIKYNGIKLL QTLRAKFPNN KILVDLKTMD    60
AGYYEAEPFY KAGADICTVL GTADIGTIKG VIDVANKYGK EAQIDLINVA DKAARTKEVA   120
KLGAHIIGVH TGLDQQAAGQ TPFADLGLVS SLNLGVKVSV AGGIKPATVK QVVDAGANIV   180
VAGAAIYGAA DPAAAAAEIS GLAKGSTSSG GVFGWLKKLF S                        221

SEQ ID NO: 73           moltype = AA  length = 195
FEATURE                 Location/Qualifiers
source                  1..195
                        mol_type = protein
                        note = 239
                        organism = Amycolatopsis methanolica
SEQUENCE: 73
MTKSLSRKLD ADHFLDATRA VVGEVDKVRA GVDSPSWIRA AELLLEAPHV FTIGTGRSGL    60
ALQMAAMRFM HLGLATHVVG ETTAPAIGAR DVLVAASGSG KTARVVRAAQ TARDQGADVI   120
ALTTAADSPL AKLATEVLIV PAADKQDFDG NTSVQYAGSL FEQSVLLITD ALFHTLWKTG   180
```

```
GSQARELWRR HANLE                                                                           195

SEQ ID NO: 74           moltype = AA  length = 185
FEATURE                 Location/Qualifiers
source                  1..185
                        mol_type = protein
                        note = GHH01
                        organism = Geobacillus sp.
SEQUENCE: 74
MQATQYLGEI IKELNRTADL IAAGEAEKLV NEILKAKKIF VAGAGRSGFM SKSFAMRMMH    60
MGLDAYVVGE TITPNLEQDD ILIIGSGSGE TRSLVSMAEK AKSLGATVAL VTIFPESTIG  120
QLADITVKLP GSPKDQSDNG YKTIQPMGSL FEQTLLLFYD AIILRCMEKK GLDSNTMFKR  180
HANLE                                                              185

SEQ ID NO: 75           moltype = AA  length = 187
FEATURE                 Location/Qualifiers
source                  1..187
                        mol_type = protein
                        note = Y4.1MC1
                        organism = Geobacillus sp.
SEQUENCE: 75
MMMQTTQYLG EILQELNRTA DFIADEEAEK LVNGILQAKK IFVAGAGRSG FMSKSFAMRM    60
MHMGLDAYVV GETITPNLEQ DDILIIGSGS GETRSLVSMA EKAKSLGATI ALVTIFPAST  120
IGKLADITVK LPGSPKDQAD NGYKTIQPMG SLFEQTLLLF YDAVILRCME KKGLDSNTMF  180
KRHANLE                                                            187

SEQ ID NO: 76           moltype = AA  length = 183
FEATURE                 Location/Qualifiers
source                  1..183
                        mol_type = protein
                        note = NG80-2
                        organism = Geobacillus thermodenitrificans
SEQUENCE: 76
MMHPIEVIFS EIEQVFAEFD HMSIECVAMR LAKAKRIFVA GEGRSGFMGK AFAMRLMHLG    60
ATVYAVGETV TPSLQSGDTL IAISGSGVTK QTVWIAEKAK QLGCEVIAVT TDLSSALANI  120
ASLTVHIPAA TKYRRGHETQ SKQPLGSLFD QCTHLILDAI CLQYANNQQV EHQKAFQRHS  180
NLE                                                                183

SEQ ID NO: 77           moltype = AA  length = 181
FEATURE                 Location/Qualifiers
source                  1..181
                        mol_type = protein
                        note = PHI
                        organism = Methylomonas aminofaciens
SEQUENCE: 77
MNKYQELVVS KLTNVINNTA EGYDDKILSL VDAAGRTFIG GAGRSLLVSR FFAMRLVHAG    60
YQVSMVGEVV TPSIQAGDLF IVISGSGSTE TLMPLVKKAK SQGAKIIVIS MKAQSPMAEL  120
ADLVVPVGGN DANAFDKTHG MPMGTIFELS TLWFLEATIA KLVDQKGLTE EGMRAIHANL  180
E                                                                  181

SEQ ID NO: 78           moltype = AA  length = 178
FEATURE                 Location/Qualifiers
source                  1..178
                        mol_type = protein
                        note = SIP3-4
                        organism = Methylovorus glucosetrophus
SEQUENCE: 78
MDHQQFILDK LSGILNVTDK TKGAELLKLV EAAGRTFIGG AGRSLLVSRF FAMRLVHAGY    60
NVSMVGEVVT PAIKSGDLLI LVSGSGGTET LLPFVKKAKS LGAKLVVISM KKTSPMADAA  120
DLVIQIGQDD SFPLTKGMPM GSQFELSTLI FLEGVISELI HAKGLTEEGM RAIHANLE    178

SEQ ID NO: 79           moltype = AA  length = 178
FEATURE                 Location/Qualifiers
source                  1..178
                        mol_type = protein
                        note = MP688
                        organism = Methylovorus sp.
SEQUENCE: 79
MDHQQFILDK LSGILNVTDK TKGAELLKLV EAAGRTFIGG AGRSLLVSRF FAMRLVHAGY    60
NVSMVGEVVT PAIKSGDLLI LVSGSGGTET LLPFVKKAKS LGAKLVVISM KKTSPMADAA  120
DLVIQIGQDD SFPLTKGMPM GSQFELSTLI FLEGVISELI HAKGLTEEGM RAIHANLE    178

SEQ ID NO: 80           moltype = AA  length = 185
FEATURE                 Location/Qualifiers
source                  1..185
                        mol_type = protein
                        note = PB1
                        organism = Bacillus methanolicus
SEQUENCE: 80
```

```
MGKLFEEKTI KTEQIFSGRV VKLQVDDVEL PNGQTSKREI VRHPGAVAVI AVTNENKIVM    60
VEQYRKPLEK SIVEIPAGKL EKGEDPRITA LRELEEETGY QCEQMEWLIS FATSPGFADE   120
IIHLYVAKGL SKKENAAGLD EDEFVDLIEL TLEEALQYIK EQRIYDSKTV IAVQYLQLQE   180
ALKNK                                                              185

SEQ ID NO: 81           moltype = AA  length = 730
FEATURE                 Location/Qualifiers
source                  1..730
                        mol_type = protein
                        note = strain JC1 DSM 3803
                        organism = Mycobacter sp.
SEQUENCE: 81
MRPPEADEPK GRNRDSDSRC DPCRAQFDTV GVELDNRGPA CRGHRPGAGR GCVEKVGNGH    60
PGTAMSLAPA AYLLFQKLMR HDPRDPDWVG GDRFILSPGH SSVTLYIQLF LAGYGLELED   120
LKSFRTWGSL TPGHPEYKHT KGVEITTGPL GQGLASSVGF AYSQRRMRGL LDPDAAPGTS   180
PFDHTIWVIA SDGDLQEGVT SEASSLAGHQ ELGNLVVVYD ENHISIEDDT DISFTEDVLG   240
RYESYGWHVQ RVDWTRTGEY REDVEELFAA LLARRRKPRS RPSFVRTIIG YPAPKKQNTG   300
KIHGSALGAE EVAAVKEVLG FDPAKSFDVD PAILAHARAA IDRGAAARSE WDESFQSWQA   360
ANPDAAALLR RIEARQLPDG VDAVLPVFEA GKDVSTRAAS GKVLNALGPV LPELWGGSAD   420
LAESNNTTIE GSPSFIPVSR SANAWKGNPY GRVLHFGIRE QLPRSIVNGI SLHGPTRAFS   480
GTFLIFSDYQ RPAIRLSALM GVPSVYVWSH DSIGLGEDGP THQPVEQLST LRAIPGLDVV   540
GPGDANEVGI AWKTILENHE NPAGVVLTRQ NIPTFARGEG AAEGDTFASA AGVAKGGYVL   600
AEASRDGATV PAQVLLIATG SEVQLAVQAR EALQAEGIPT RVISMPCVEW FNKQDAAYRE   660
SVLPAAVTAR VSVEAGLALG WKEFVGDAGR SVSLEHFGAS ADYKRLFQEF GITADAVVAA   720
AKDSITAAGN                                                         730

SEQ ID NO: 82           moltype = AA  length = 710
FEATURE                 Location/Qualifiers
source                  1..710
                        mol_type = protein
                        note = DL-1
                        organism = Ogataea parapolymorpha
SEQUENCE: 82
MSMRIPKAAS VNDEQHQRII KYGRALVLDI VEQYGGGHPG SAMGAMAIGI ALWKYTLKYA    60
PNDPNYFNRD RFVLSNGHVC LFQYIFQHLY GLKSMTMAQL KSYHSNDFHS LCPGHPEIEH   120
DAVEVTTGPL GQGISNSVGL AIATKNLAAT YNKPGFDIIT NKVYCMVGDA CLQEGPALES   180
ISLAGHMGLD NLIVLYDNNQ VCCDGSVDIA NTEDISAKFK ACNWNVIEVE NASEDVATIV   240
KALEYAQAEK HRPTLINCRT VIGSGAAFEN HCAAHGSALG QDVRELKIK YGMNPAQKFY   300
IPQDVYDFFK EKPAEGDKLV AEWKSLVAKY VKEYPEEGQE FLARVRGELP KNWKSFLPQQ   360
EFTGDAPTRA AARELVRALG QNCKSVLAGC ADLSVSVNLQ WPGVKYFMDP TLSTQCGLSG   420
DYSGRYIEYG IREHAMCAIA NGLAAYNKGT FLPITSTFFM FYLYAAPAIR MAGLQELKAI   480
HIGTHDSINE GENGPTHQPV ETPALFRAMP NIYYMRPVDS AEVFGLFQKA VELPFSSILS   540
LSRNEVLQYP GQSSAEKAQR GGYILEDAEN AEVQIIGVGA EMEFAYKAAK ILGRKFRTRV   600
LSIPCTRLFD EQSIGYRRSV LRKDGRQVPT VVVDGHVAFG WERYATASYC MNTYGKSLPP   660
EVIYEYFGYN PATIAKKVES YVRACQRDPL LLHDFLDLKE KPKHDKVNKL             710

SEQ ID NO: 83           moltype = AA  length = 706
FEATURE                 Location/Qualifiers
source                  1..706
                        mol_type = protein
                        organism = Candida boidinii
SEQUENCE: 83
MALAKAASIN DDIHDLTMRA FRCYVLDLVE QYEGGHPGSA MGMVAMGIAL WKYTMKYSTN    60
DPTWFNRDRF VLSNGHVCLF QYLFQHLSGL KSMTEKQLKS YHSSDYHSKC PGHPEIENEA   120
VEVTTGPLGQ GISNSVGLAI ASKNLGALYN KPGYEVVNNT TYCIVGDACL QEGPALESIS   180
FAGHLGLDNL VVIYDNNQVC CDGSVDIANT EDISAKFRAC NWNVIEVEDG ARDVATIVKA   240
LELAGAEKNR PTLINVRTII GTDSAFQNHC AAHGSALGEE GIRELKIKYG FNPSQKFHFP   300
QEVYDFFSDI PAKGDEYVSN WNKLVSSYVK EFPELGAEFQ SRVKGELPKN WKSLLPNNLP   360
NEDTATRTSA RAMVRALAKD VPNVIAGSAD LSVSVNLPWP GSKYFENPQL ATQCGLAGDY   420
SGRYVEFGIR EHCMCAIANG LAAFNKGTFL PITSSFYMFY LYAAPALRMA ALQELKAIHI   480
ATHDSIGAGE DGPTHQPIAQ SALWRAMPNF YYMRPGDASE VRGLFEKAVE LPLSTLFSLS   540
RHEVPQYPGK SSIELAKRGG YVFEDAKDAD IQLIGAGSEL EQAVKTARIL RSRGLKVRIL   600
SPPCQRLFDE QSVGYRRSVL QRGKVPTVVI EAYVAYGWER YATAGYTMNT FGKSLPVEDV   660
YEYFGFNPSE ISKKIEGYVR AVKANPDLLY EFIDLTEKPK HDQNHL                 706

SEQ ID NO: 84           moltype = AA  length = 325
FEATURE                 Location/Qualifiers
source                  1..325
                        mol_type = protein
                        note = 239
                        organism = Amycolatopsis methanolica
SEQUENCE: 84
MSALNKIART MVSNRRGILA ADESIGTMSS RLEQVGVEPT EENRRVYREL IVTTPRLADS    60
ISGVILADET FRQKLSDGRT FPQYLDDIGV LAGIKVDTGA KPLAGAPGEK VTEGLDGLRE   120
RVAEYVRLGA TFAKWRAVIT IGENTPTDRA VRANVHALAR YAGLCQEGGL VPIVEPEVLM   180
DGAHSLTRCR EVTTFVLQVL FAELDVMEVE LDGIVLKPNM VVAGADSPEQ PSVEEVARAT   240
VETLRATVPE SVPGIAFLSG GQRPEVATAH LGAMQSLDPL PWELTYSFGR ALVGPALETW   300
RGDNSKWTAA QDALSERAVA NAAAR                                        325
```

```
SEQ ID NO: 85              moltype = AA  length = 284
FEATURE                    Location/Qualifiers
source                     1..284
                           mol_type = protein
                           note = MGA3
                           organism = Bacillus methanolicus
SEQUENCE: 85
MPLVSMKDML NHGKENGYAV GQFNINNLEF GQAILQAAEE EKSPVIIGVS VGAANYMGGF     60
KLIVDMVKSL MDSYNVTVPV AIHLDHGPSL EKCVQAIHAG FTSVMIDGSH LPLEENIELT    120
KRVVEIAHSV GVSVEAELGR IGGQEDDVVA ESFYAIPSEC EQLVRETGVD CFAPALGSVH    180
GPYKGEPKLG FDRMEEIMKL TGVPLVLHGG TGIPTKDIQK AISLGTAKIN VNTESQIAAT    240
KAVREVLNND AKLFDPRKFL APAREAIKET IKGKMREFGS SGKA                     284

SEQ ID NO: 86              moltype = AA  length = 284
FEATURE                    Location/Qualifiers
source                     1..284
                           mol_type = protein
                           note = PB1
                           organism = Bacillus methanolicus
SEQUENCE: 86
MPLVSMKDML NRGKENGYAV GQFNINNLEF GQAILQAAEE EKSPVIIGVS VGAANYMGGF     60
KLIVDMVKSL MDAYNVTVPV AIHLDHGPSL EKCVQAIHAG FTSVMIDGSH LPLEENIELT    120
KRVVEIAHAV GVSVEAELGR IGGQEDDVVA ESFYAVPSEC EQLVRETGVD CFAPALGSVH    180
GPYKGEPNLG FDRMKEIMEL TGVPLVLHGG TGIPTKDIQK AISLGTAKIN VNTESQIAAT    240
KAVREVLNND AKLFDPRKFL TPAREAIKET IKGKMREFGS SGKA                     284

SEQ ID NO: 87              moltype = AA  length = 287
FEATURE                    Location/Qualifiers
source                     1..287
                           mol_type = protein
                           note = NG80-2
                           organism = Geobacillus thermodenitrificans
SEQUENCE: 87
MPLVSMKEML NEALRGKYAV GQFNINNLEW TQAILAAAEE EKSPVILGVS EGAARYMGGF     60
KTVVNMVKGL MEDMNITVPV AIHLDHGSSF EKCKAAIDAG FTSVMIDASH HPFEENVRIT    120
SQVVEYAHAR GVSVEAELGI VGGQEDDVIG EGVIYADPKE CEELVKRTGI DCLAPALGSV    180
HGPYKGEPKL GFAEMEQIRD LTGIPLVLHG GTGIPTEQIQ RAISLGTSKI NVNTENQIAF    240
TKVVRELLAK DANVYDPRKI IGPGRDAIKA TVIGKMREFG SSGKAAQ                  287

SEQ ID NO: 88              moltype = AA  length = 295
FEATURE                    Location/Qualifiers
source                     1..295
                           mol_type = protein
                           note = NG80-2
                           organism = Geobacillus thermodenitrificans
SEQUENCE: 88
MPLVSMKEML QCALQGNYAV GHFNVNNLEF AQAILLGAEE EEAPVILAVS PGYIGHLGGL     60
RTAAAMVKEL VKEYRITVPV ALHLDHGSSY EQCLEAMEAG FTSVMIDASH FPLEENISMT    120
KKVVEAARFF GVSVEAEVGR IGGQEDDVVV DEAEAMYAIP EECERLVKET GVDCLAPALG    180
SVHGPYKGKP KLGFAQMEQI QRLTGVPLVL HGGTGIPLED IRRAISLGTA KINVNTENQL    240
AFTRGVRSLL NENNGLYDPR KYLGAGREEV KQTVRQKIRE FGSVGKAKEG VLSSL         295

SEQ ID NO: 89              moltype = AA  length = 344
FEATURE                    Location/Qualifiers
source                     1..344
                           mol_type = protein
                           organism = Methylophilus methylotrophus
SEQUENCE: 89
MALISLRQLL DHAAEHSYGY PAFNINNMEQ ILSIMKAADE VDSAVILQAS AGARGYAGES     60
FLRKMVEAAI EQYPHIPVCM HQDHGTSPKI CQMAIRSGFS SVMMDGSLKE DHKTPASYDY    120
NVDVTRRVVE FAHAVGVSVE GELGVLGSLE TGMAGEEDGV GAEGKLDESQ LLTDPPDEAAA   180
FVEATKVDAL AIAIGTSHGA YKFTRPPSAD TLSIERIREI HAKIPNTHLV MHGSSSVPQS    240
LLEQIRHYGG NIKETYGVPV SQIVEGIKNG VRKVNIDTDI RLAMTAAIRA HLAEYPEQFD    300
PRQYFKEATI AAQHLCKERF EAFGSAGQAS KIKVVPLEKM AAIY                     344

SEQ ID NO: 90              moltype = AA  length = 285
FEATURE                    Location/Qualifiers
source                     1..285
                           mol_type = protein
                           note = MGA3
                           organism = Bacillus methanolicus
SEQUENCE: 90
MPLVSMTEML NKAKAEGYAV GQFNLNNLEF TQAILLAAEE EKSPVILGVS EGARYMGGF      60
KTVVNMVKGL MEDYKITVPV AIHLDHGSSF EKCKEVIDAG FTSVMIDASH HPFEENVEVT    120
KKVVEYAHAR GVSVEAELGT VGGQEDDVIA DGVIYADPKE CEELVKRTGI DCLAPALGSV    180
HGPYKGEPNL GFKEMEEIGR ITGVPLVLHG GTGIPTKDIQ RAISLGTAKI NVNTENQIAS    240
AKKVREVLAE NPNMYDPRKY LGPARDAIKE TVIGKMREFG SSGKA                    285

SEQ ID NO: 91              moltype = AA  length = 8
```

| FEATURE | Location/Qualifiers |
|---|---|
| REGION | 1..8 |
| | note = linker |
| source | 1..8 |
| | mol_type = protein |
| | organism = synthetic construct |

SEQUENCE: 91
GGSGSGGS                    8

What is claimed is:

1. A fusion protein which converts methanol to a ketose phosphate, the fusion protein comprising:
(1a) a first region comprising methanol dehydrogenase or an enzymatically active portion thereof, and (1b) a second region comprising 3-hexulose-6-phosphate dehydrogenase or an enzymatically active portion thereof;
wherein the fusion protein comprises one or more linker amino acid sequence(s) positioned between two or more of the first and second regions of the fusion protein and
wherein any of the methanol dehydrogenase, or the 3-hexulose-6-phosphate dehydrogenase is a bacterial sequence,
and
wherein the fusion protein has a structure as follows:
1a-L$^1$-1b or 1b-L$^1$-1a;
wherein L$^1$ is selected from (-) (a covalent bond) and a linker amino acid sequence.

2. The fusion protein of claim 1, wherein
one or more of the methanol dehydrogenase, or the 3-hexulose-6-phosphate dehydrogenase or enzymatically active portions thereof are from Bacillus sequences.

3. The fusion protein of claim 1 wherein the methanol dehydrogenase (MeDH) or an enzymatically active portion thereof is from Bacillus methanolicus MGA3 MeDH (SEQ ID NO:1; 3EIJ77596.1); Bacillus methanolicus C1 MeDH (SEQ ID NO:13; AAA22593.1); Bacillus methanolicus PB1 MeDH (SEQ ID NO:14; EIJ77618.1); Bacillus methanolicus PB1 MeDH (SEQ ID NO:15; EIJ78790.1); Bacillus methanolicus MGA3 MeDH (SEQ ID NO:16; EIJ80770.1); Bacillus methanolicus PB1 MeDH (SEQ ID NO:17; EIJ78397.1); Bacillus methanolicus MGA3 MeDH (SEQ ID NO:18; EIJ83020.1); Lysinibacillus fusiformis MeDH (SEQ ID NO:19; EFI69743.1); Bacillus coagulans 36D1 MeDH (SEQ ID NO:20; YP_004860127.1); Lysinibacillus sphaericus MeDH (SEQ ID NO:21; YP_001699778.1); Bacillus azotoformans LMG 9581 MeDH (SEQ ID NO:22; ZP_11313277.1); Burkholderia thailandensis E264 MeDH (SEQ ID NO:23; ZP_05587334.1); Cupriavidus necator N-1 MeDH (SEQ ID NO:24; YP_004681552.1); uncultured organism MeDH (SEQ ID NO:25; AGF87161); Geobacter bemidjiensis Bem MeDH (SEQ ID NO:26; YP_002138168.1); Carboxydothermus hydrogenoformans Z-2901 MeDH (SEQ ID NO:27; YP_359772.1); Actinobacillus succinogenes 130Z MeDH (SEQ ID NO:28; YP_001343716.1); Acinetobacter baumannii Naval-82 MeDH (SEQ ID NO:29; ZP_16224338.1); Clostridium pasteurianum DSM 525 MeDH (SEQ ID NO: 30; AAC45651.1); Methanosarcina mazei Tuc01 MeDH (SEQ ID NO:31; YP_007491369.1); Desulfovibrio vulgaris str. 'Miyazaki F' MeDH (SEQ ID NO:32; YP_002434746); Desulfovibrio africanus str. Walvis Bay MeDH (SEQ ID NO:33; YP_005052855); Clostridium perfringens str. 13 MeDH (SEQ ID NO:34; NP_561852.1); Vibrio campbellii ATCC BAA-1116 MeDH (SEQ ID NO:35; YP_001447544); Desulfotomaculum reducens MI-1 MeDH (SEQ ID NO:36; YP_001113612.1); Desulfovibrio vulgaris str. Hildenborough MeDH (SEQ ID NO:37; YP_011618); Photobacterium profundum 3TCK MeDH (SEQ ID NO:38; ZP_01220157.1); Geobacillus sp. Y4.1MC1 MeDH (SEQ ID NO: 39; YP_003990729.1); Desulfovibrio fructosovorans JJ MeDH (SEQ ID NO:40; ZP_07335453.1); Shewanella oneidensis MR-1 MeDH (SEQ ID NO:41; NP_717107); Sebaldella termitidis ATCC 33386 MeDH (SEQ ID NO:42; YP_003310546.1); Paenibacillus peoriae KCTC 3763 MeDH (SEQ ID NO:43; ZP_10241531.1); Klebsiella pneumoniae subsp. pneumoniae MGH 78578 MeDH (SEQ ID NO:44; YP_001337153.1); Escherichia coli MeDH (SEQ ID NO:45; YP_026233.1); Clostridium perfringens ATCC 13124 MeDH (SEQ ID NO:46; YP_694908); Ralstonia eutropha H16 MeDH (SEQ ID NO:47; YP_725376.1); Thermoanaerobacter sp. X514 MeDH (SEQ ID NO:48; YP_001663549); human gut metagenome MeDH (SEQ ID NO:49; EKC54576); or Geobacillus themodenitrificans NG80-2 MeDH (SEQ ID NO:50; YP_001126968.1).

4. The fusion protein of claim 3 wherein the methanol dehydrogenase or an enzymatically active portion thereof is a polypeptide having 95% or greater, 96% or greater, 97% or greater, 98% or greater, or 99% or greater identity to Bacillus methanolicus MGA3MeDH (SEQ ID NO:1; 3EIJ77596.1) or to any other MeDH according to claim 3.

5. The fusion protein of claim 1 wherein the region comprising 3-hexulose-6-phosphate dehydrogenase or an enzymatically active portion thereof is from Bacillus methanolicus MGA3 HPS (SEQ ID NO: 3; AAR39392.1); Bacillus methanolicus PB1 HPS (SEQ ID NO: 51; EIJ81375.1); Methylobacillus flagellatus HPS (SEQ ID NO: 52; YP_544362.1; WP_011478618.1); Bacillus subtilis HPS (SEQ ID NO: 53; NP_388228.1); Methylophilus methylotrophus HPS (SEQ ID NO: 54; WP_018986666.1); or Methylophilus methylotrophus ATCC 53528 HPS (SEQ ID NO: 55; WP_018985298.1).

6. The fusion protein of claim 5 wherein 3-hexulose-6-phosphate dehydrogenase or an enzymatically active portion thereof is a polypeptide having 95% or greater, 96% or greater, 97% or greater, 98% or greater, or 99% or greater identity to Bacillus methanolicus MGA3 HPS (SEQ ID NO: 4; AAR39393.1) or to any other HPS according to claim 5.

7. The fusion protein of claim 1 having one linker amino acid sequence.

8. The fusion protein of claim 7 wherein the one linker amino acid sequence comprises one or more amino acids selected from the group consisting of glycine, alanine, serine, and threonine.

9. The fusion protein of claim 7, wherein the one or two linker amino acid sequence has a length in the range of 1-50 amino acid residues, or 1-20 amino acid residues.

10. The fusion protein of claim 7 wherein the one linker amino acid sequence is $[(GGS)_x(GS)_y(GGS)_z]_n$ where x is 1-6, y is 1-6, z is 0-3, and n is 1-4.

11. The fusion protein of claim 1, wherein one or more of the methanol dehydrogenase, or the 3-hexulose-6-phosphate dehydrogenase, or enzymatically active portions thereof, are from *Bacillus methanolicus* MGA3 or *Bacillus methanolicus* PB1.

12. The fusion protein of claim 7 wherein the one linker amino acid sequence is $[(GGS)_x(GS)_y(GGS)_z]_n$ where x is 1-3, y is 1-3, z is 1-2, and n is 1-2.

* * * * *